US011778195B2

(12) United States Patent
Ruefenacht et al.

(10) Patent No.: US 11,778,195 B2
(45) Date of Patent: Oct. 3, 2023

(54) FAST, HIGH QUALITY OPTICAL FLOW ESTIMATION FROM CODED VIDEO

(71) Applicant: Kakadu R & D Pty Ltd., Redfern (AU)

(72) Inventors: Dominic Patric Ruefenacht, Randwick (AU); David Scott Taubman, Redfern (AU)

(73) Assignee: Kakadu R & D Pty Ltd., Redfern (AU)

( * ) Notice: Subject to any disclaimer, the term of this patent is extended or adjusted under 35 U.S.C. 154(b) by 0 days.

(21) Appl. No.: 16/030,205

(22) Filed: Jul. 9, 2018

(65) Prior Publication Data

US 2019/0124337 A1    Apr. 25, 2019

(30) Foreign Application Priority Data

Jul. 7, 2017    (AU) .................................. 2017902676

(51) Int. Cl.
| | |
|---|---|
| *H04N 19/14* | (2014.01) |
| *H04N 19/119* | (2014.01) |
| *H04N 19/513* | (2014.01) |
| *H04N 19/139* | (2014.01) |
| *H04N 19/85* | (2014.01) |
| *H04N 19/587* | (2014.01) |
| *H04N 19/56* | (2014.01) |

(52) U.S. Cl.
CPC .......... *H04N 19/14* (2014.11); *H04N 19/119* (2014.11); *H04N 19/139* (2014.11); *H04N 19/521* (2014.11); *H04N 19/56* (2014.11); *H04N 19/587* (2014.11); *H04N 19/85* (2014.11)

(58) Field of Classification Search
CPC ..... H04N 19/14; H04N 19/139; H04N 19/521
See application file for complete search history.

(56) References Cited

U.S. PATENT DOCUMENTS

| | | | | |
|---|---|---|---|---|
| 6,625,216 | B1 * | 9/2003 | Zhu ......................... | G06T 7/238 375/240.16 |
| 7,760,911 | B2 * | 7/2010 | Xiao .................... | H04N 19/543 382/107 |
| 7,796,191 | B1 * | 9/2010 | Vojkovich ............... | G06T 3/403 348/448 |
| 9,300,906 | B2 * | 3/2016 | Kokaram ............... | H04N 19/59 |
| 10,354,394 | B2 * | 7/2019 | Choudhury ........ | H04N 21/2343 |
| 10,467,768 | B2 * | 11/2019 | Xu ........................ | G06V 10/454 |
| 2006/0233253 | A1 * | 10/2006 | Shi ....................... | H04N 19/139 375/240.16 |
| 2007/0092122 | A1 * | 4/2007 | Xiao .................... | H04N 19/543 382/128 |

(Continued)

OTHER PUBLICATIONS

Bailer, C. et al., Flow Fields: Dense Correspondence Fields for Highly Accurate Large Displacement Optical Flow Estimation. IEEE Int Conf Comput Vis. 2015 (9 pages).

(Continued)

*Primary Examiner* — Boubacar Abdou Tchoussou
(74) *Attorney, Agent, or Firm* — Ballard Spahr LLP

(57) ABSTRACT

An interpolation method for coded motion information available to a video coder, comprising the steps of incorporating edge information derived from coded video frames to perform an edge-sensitive interpolation of coded motion vectors ("seeds") in order to obtain a dense motion description.

22 Claims, 25 Drawing Sheets

(56) References Cited

U.S. PATENT DOCUMENTS

| | | | | |
|---|---|---|---|---|
| 2009/0174812 A1* | 7/2009 | Hong | .................... | H04N 19/537 |
| | | | | 348/441 |
| 2014/0294320 A1* | 10/2014 | Kokaram | ............. | H04N 19/577 |
| | | | | 382/300 |
| 2015/0365696 A1* | 12/2015 | Garud | .................... | H04N 19/53 |
| | | | | 375/240.08 |
| 2018/0082429 A1* | 3/2018 | Choudhury | ............. | G06T 7/207 |
| 2018/0176574 A1* | 6/2018 | Tang | ..................... | G06T 3/4023 |
| 2018/0204076 A1* | 7/2018 | Tripathi | ............... | G06K 9/4647 |
| 2018/0293454 A1* | 10/2018 | Xu | .......................... | G06V 20/49 |
| 2018/0324465 A1* | 11/2018 | Aydin | ....................... | G06T 5/20 |
| 2020/0012940 A1* | 1/2020 | Liu | ...................... | H04N 7/0135 |

OTHER PUBLICATIONS

Chen, Q. and Koltun, V., Full Flow: Optical Flow Estimation by Global Optimization Over Regular Grids. Comput Vis Pattern Recognit. 2016 (9 pages).

Jeong, S. et al., Motion-Compensated Frame Interpolation Based on Multihypothesis Motion Estimation and Texture Optimization. IEEE Trans Image Process. 2013; 22(11):4497-509.

Lu, Q. et al., Motion-Compensated Frame Interpolation with Multiframe Based Occlusion Handling. J Disp Technol. 2016; 12(1):45-54.

Revaud, J. et al., EpicFlow: Edge-Preserving Interpolation of Correspondences for Optical Flow. Comput Vis Pattern Recognit. 2015 (9 pages).

Rüfenacht, D. and Taubman, D., HEVC-EPIC: Edge-Preserving Interpolation of Coded HEVC Motion with Applications to Framerate Upsampling. Int Conf Multimed Expo. 2017 (6 pages).

Rüfenacht, D. and Taubman, D., HEVC-EPIC: Fast Optical Flow Estimation from Coded Video via Edge-Preserving Interpolation. IEEE Trans Image Process. 2018; 28(6):3100-13.

Rüfenacht, D. and Taubman, D., Temporally Consistent High Frame-Rate Upsampling with Motion Sparsification. IEEE Int Work Multimed Signal Process. 2016 (6 pages).

Rüfenacht, D. and Taubmen, D., Leveraging Decoded HEVC Motion for Fast, High Quality Optical Flow Estimation. IEEE Int Workshop Multimed Signal Process. 2017 (6 pages).

Rüfenacht, D. et al., Higher-Order Motion Models for Temporal Frame Interpolation with Applications to Video Coding. Pict Coding Symp. 2016 (5 pages).

Sullivan, G.J., et al., Overview of the High Efficiency Video Coding (HEVC) Standard. IEEE Trans Circuits Syst Video Technol. 2012; 22(12):1649-68.

* cited by examiner

FAST, HIGH QUALITY OPTICAL FLOW ESTIMATION FROM CODED VIDEO

1. FIELD OF THE INVENTION

The present invention relates to an apparatus and a method for obtaining a high quality, dense motion description (also known as optical flow) from video sequences, and particularly, but not exclusively, to an apparatus and a method for obtaining a high quality, dense motion description from video sequences that have been encoded using motion-compensated prediction.

BACKGROUND OF THE INVENTION

Innovations in motion modelling have strongly contributed to the ever-increasing compression performance of video coders. One of the main parts of a video coder is the so-called motion-compensated prediction, whereby certain target frames are predicted from already decoded reference frames. This is done by partitioning the target frame into a set of non-overlapping blocks, each of which gets a motion vector assigned; the resulting block motion field can be efficiently coded, but cannot in general be interpreted as a good representation of the underlying scene motion. However, a more physical representation of the scene motion is useful in a large variety of applications, including but not limited to scene analysis, video analytics, and temporal frame interpolation (or frame-rate upsampling). We hereinafter refer to such applications as video processing tasks.

The following properties of decoded block motion fields "as-is" make them ill-suited for video processing tasks:
1. Artificial discontinuities are created at block boundaries;
2. Block motion is unable to accurately describe boundaries around moving objects, where the motion vectors on either side can vary drastically;
3. For each block, the encoder can decide to not code any motion vector, and instead simply code the texture information of the block. This so-called "Intra"-prediction leads to "holes" in the block motion field
4. In existing standardized video codecs, blocks only describe translational motion.

For these reasons, video processing tasks commonly involve re-estimation of motion as an important step, even though the processed video is usually derived from a coded representation that includes motion information. For example, high-quality framerate upsampling schemes require computationally expensive motion fields ([1],[2]), and/or employ time-consuming texture optimization steps [3] in order to fix up artefacts due to motion errors; in both cases, the lack of fast, high quality motion estimation results in the fact that existing framerate upsampling schemes are not able to run in real-time. Note that the numerals in square brackets relate to references which are listed at the end of this specification under the heading "References".

In [4], a compelling way of estimating optical flow is described, which is successfully employed by several top-performing optical flow algorithms ([4]-[6]). First, a sparse set of motion vectors (also referred to as correspondences in the literature), hereinafter referred to as "motion seeds" or "seeds", are estimated, followed by an edge-preserving interpolation strategy (called EPIC) to obtain a dense flow. EPIC-based optical flow estimators provide an excellent trade-off between motion field quality and computational complexity. However, they are still far away from running in real-time, mainly due to the time-consuming estimation of motion seeds.

2. SUMMARY

In accordance with a first aspect, the present invention provides a method of estimating a dense motion field from a coded video signal, comprising the steps of creating motion vector seeds from coded block motion and employing an edge-sensitive interpolating strategy to drive the sparse-to-dense interpolation.

In an embodiment, the interpolated motion field is anchored at the frame where the coded block motion is available (i.e., the target frame). Seed locations are identified on the target frame, each carrying motion derived from the coded block motion; we note that motion can be derived for translational as well as for higher-order motion descriptions (e.g., affine, homography, projective, . . . ), as considered in JEM. Edge information is estimated on the target frame, which is then used to drive an edge-sensitive interpolation of the motion seeds to obtain a dense, piecewise-smooth motion field, anchored at the target frame, where large changes in motion are concentrated around object boundaries. In embodiments, edge information is derived from decoded target frame sample values. In some embodiments, the motion information consists of only one motion vector for each seed and each interpolated location, describing correspondences between the target frame at that location and a reference frame. In other embodiments, the motion information consists of multiple motion vectors at each seed location and each interpolated location, describing correspondences between the target frame and multiple reference frames.

In an embodiment, the interpolated motion field is anchored at a reference frame that is involved in the prediction of the target frame where the coded motion is available. The coded motion at the target frame is mapped to the reference frame, in order to establish seed locations and associated motion in the reference frame. Edge information is estimated on the reference frame, which is then used to drive an edge-sensitive interpolation of the motion seeds to obtain a dense, piecewise-smooth motion field, anchored at the reference frame, where large changes in motion are concentrated around object boundaries. In embodiments, edge information is derived from decoded reference frame sample values. In some embodiments, the motion information consists of a single motion vector at each seed and each interpolated location on the reference frame, describing correspondences between the reference frame and the target frame. In other embodiments, the motion information consists of multiple motion vectors at each seed location and each interpolated location, describing correspondences between said reference frame, said target frame and other frames.

In embodiments, large original blocks are sub-partitioned into multiple smaller blocks, each being assigned motion vectors from the original coded block motion; the resulting smaller blocks and their motion vectors are used to establish seed locations and the associated seed motion vectors for interpolation. In embodiments, weights are assigned to each seed, and these weights are used to modify the contribution made by each seed in the motion interpolation process. In some embodiments, these weights are proportional to the area of the block that is associated with the seed. In other embodiments, the weight is derived based on a motion confidence value, which assesses the motion compensated prediction performance within the block.

In embodiments where the interpolated motion description requires P>1 motion vectors at each interpolated location, seed locations for which fewer than P motion vectors are available from the decoded block motion field are augmented by synthesizing the missing motion vectors using a motion completion step. In some embodiments, higher-order motion models may be derived from the P motion vectors at each interpolated location.

In some embodiments, a variational optical flow step is used as a post-processing on the interpolated motion to iteratively reduce the motion compensated prediction error between pairs of frames described by the interpolated motion.

One embodiment of the invention, described in detail in the following section, entitled "HEVC-EPIC: Edge-Preserving Interpolation of Coded HEVC Motion with Applications to Frame Rate Upsampling" discloses a detail of one implementation, herein termed "HEVC-EPIC".

Advantageously, embodiments of the present invention show how motion information from coded video can be successfully leveraged in edge preserving interpolation schemes to produce high quality optical flow fields. In particular, the embodiments described in this document are advantageously able to achieve large improvements in computational throughput over EPIC-based optical flow schemes, which are already amongst the most computationally competitive optical flow algorithms.

Advantageously, embodiments enable estimating a dense motion field that is close to "apparent physical" motion.

Advantageously, embodiments are able to create motion fields that are competitive with state-of-the-art optical flow estimation schemes, while running an order of magnitude faster since they can "skip" the time-consuming estimation of seeds by leveraging the motion information that is available for any coded video sequence.

In accordance with a second aspect, the present invention provides an apparatus for estimating a dense motion field, comprising a processor arranged to implement a method in accordance with the first aspect of the invention.

In an embodiment, the apparatus may be employed to implement the dense motion field estimation for video processing tasks.

In an embodiment the apparatus comprises a decoder for decoding a video sequence.

In accordance with a third aspect, the present invention provides a method of estimating a dense motion field from a coded video signal, comprising the steps of creating motion vector seeds from coded motion and employing an edge sensitive interpolating strategy to drive the sparse-to-dense interpolation.

In an embodiment, seed locations are identified on the target frame, each carrying motion derived from the coded motion. Motion can be derived for translation as well as for higher order motion descriptions (e.g. affine, higher order homographies, projective) as well as coded block motion.

In accordance with a fourth aspect, the present invention provides and apparatus for estimating a dense motion field, comprising a processor arranged to implement a method in accordance with the third aspect of the invention.

In accordance with a fifth aspect, the present invention provides a computer program, comprising instructions for controlling a computer to implement a method in accordance with the first or third aspects of the invention.

In accordance with a sixth aspect, the present invention provides a computer readable medium, providing a computer program in accordance with the third aspect of the invention.

In accordance with a seventh aspect, the present invention provides a data signal, comprising a computer program in accordance with the fifth aspect of the invention.

3. BRIEF DESCRIPTION OF THE FIGURES

Features and the advantages of the present invention will become apparent from the following description of embodiments thereof, by way of example only, with reference to the accompanying drawings, in which.

Figure 8:
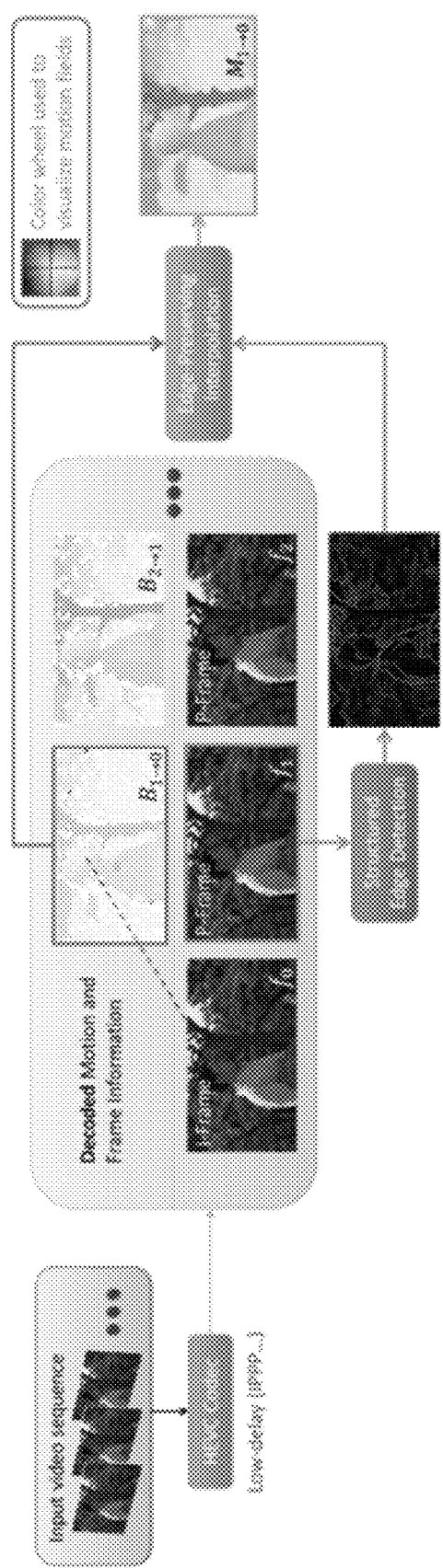

FIG. 8 is an overview of the proposed HEVC-EPIC method. An input video sequence is coded using HEVC low-delay mode (IPPP structure). For each P-frame $f_k$, a block motion field $B_{k \to k-1}$ is decoded, indicating the displacement between $f_k$ and $f_{k-1}$. We estimate edge information on the decoded frame $f_k$ using [15], which is used to guide the sparse-to-dense affine motion interpolation procedure to obtain a dense motion field $M_{k \to k-1}$ that is suitable for computer vision tasks.

Figure 9:
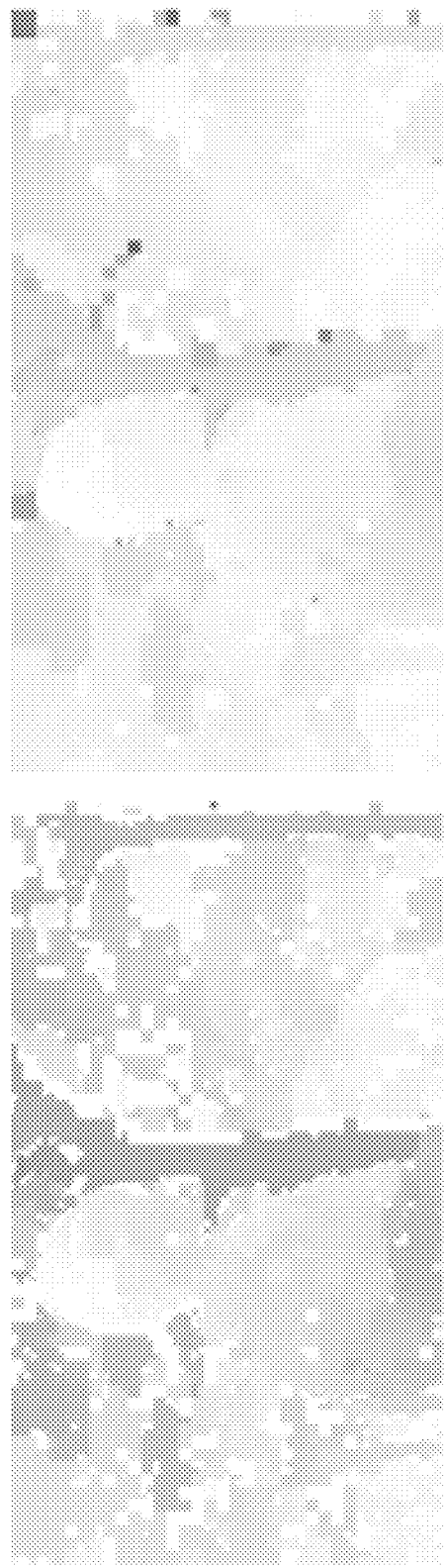

FIG. 9 illustrates decoded block motion for (a) HEVC, and (b) HEVC without Intra prediction. One can observe how around moving objects, HEVC resorts to Intra prediction (zero motion, white), whereas the forced Inter prediction results in non-physical motion vectors in such regions.

Figure 10:
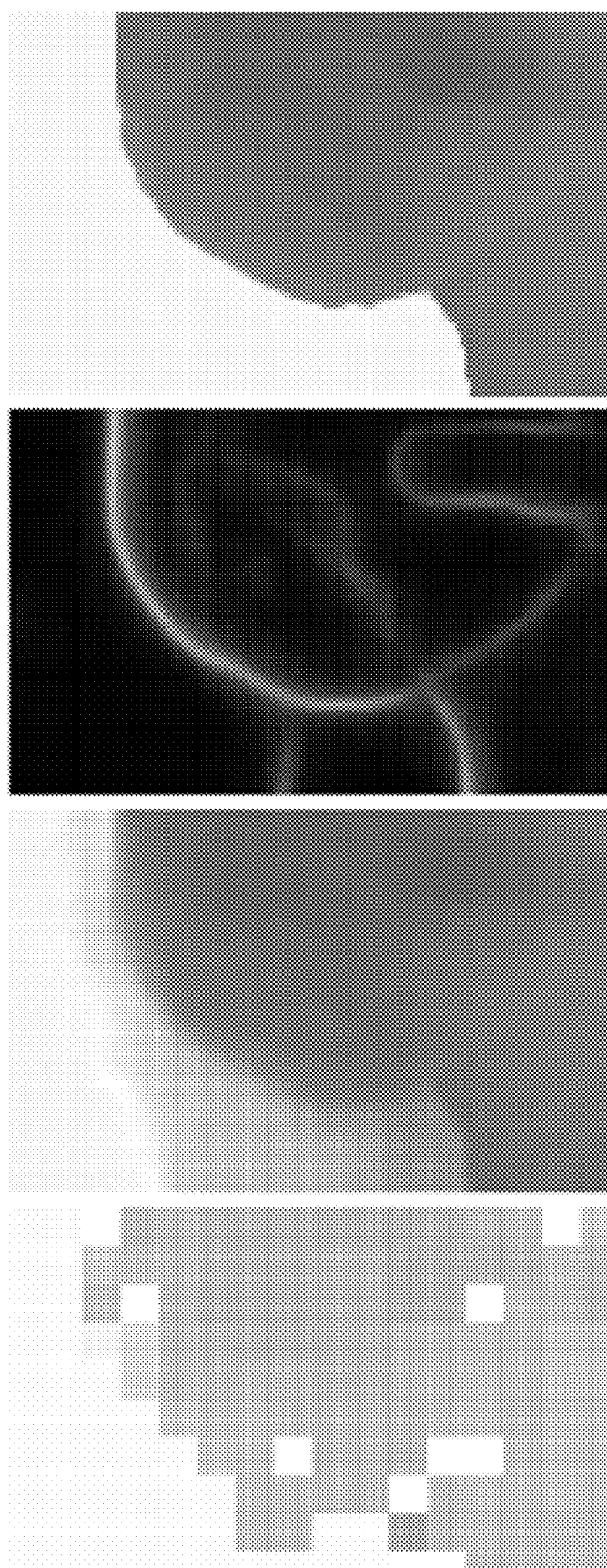

FIG. 10 illustrates Euclidean versus geodesic distance measure for interpolation. (a) shows decoded block motion; (b) shows the affine interpolated motion; (c) are the edges estimated using SED [15] on the decoded texture; (d) shows how motion boundaries are preserved using the proposed HEVC-EPIC, which uses an edge-preserving interpolation strategy.

Figure 11:

FIG. 11 shows visualizations of HEVC-EPIC motion fields. (a/d) show decoded block motion, (b/e) show the edge-aware, affine interpolated motion obtained by HEVC-EPIC, and (c/f) show the ground truth motion.

Figure 12:
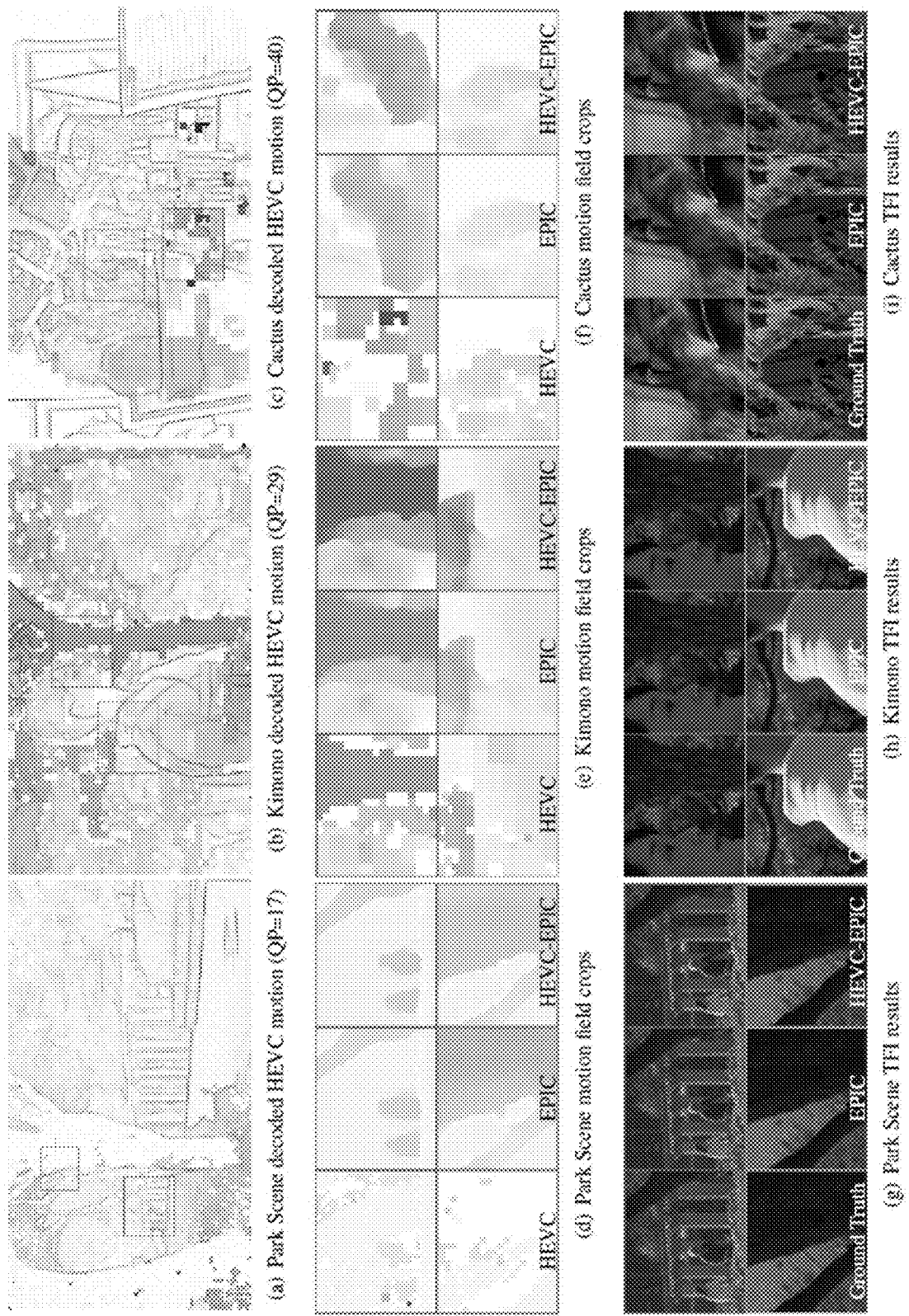

FIG. 12 shows Qualitative results of TFI performance. (a)-(c) show the decoded block motion for three different scenes, where we overlaid the estimated edge map; (d)-(f) each show crops of the decoded block motion (left), EPIC flow (middle), and proposed HEVC-EPIC (right); (g)-(i) each show the ground truth target frame, as well as the interpolated frame obtained using EPIC flow (middle), and HEVC-EPIC (right) as input motion for BAM-TFI.

Figure 13:
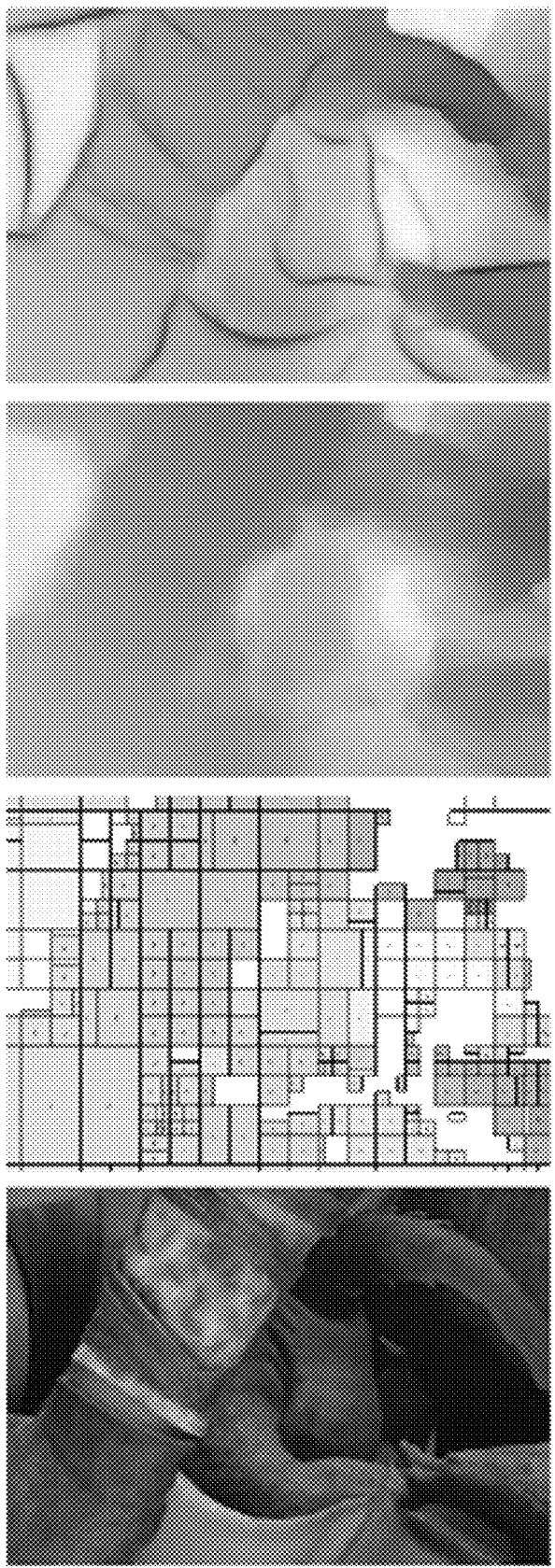

FIG. 13 shows a decoded frame, and (b) shows a (colour-coded) forward referencing block motion field $B_{k \to k+1}$, where white regions are regions without motion assignment. (c) shows the affine interpolated motion of (b), which is smooth across moving object boundaries. (e) shows the result of the proposed HEVC-EPIC, where we superimposed the edge information (estimated using SED [15] on $f_k$) that was used to guide the edge-preserving affine interpolation.

Figure 14:
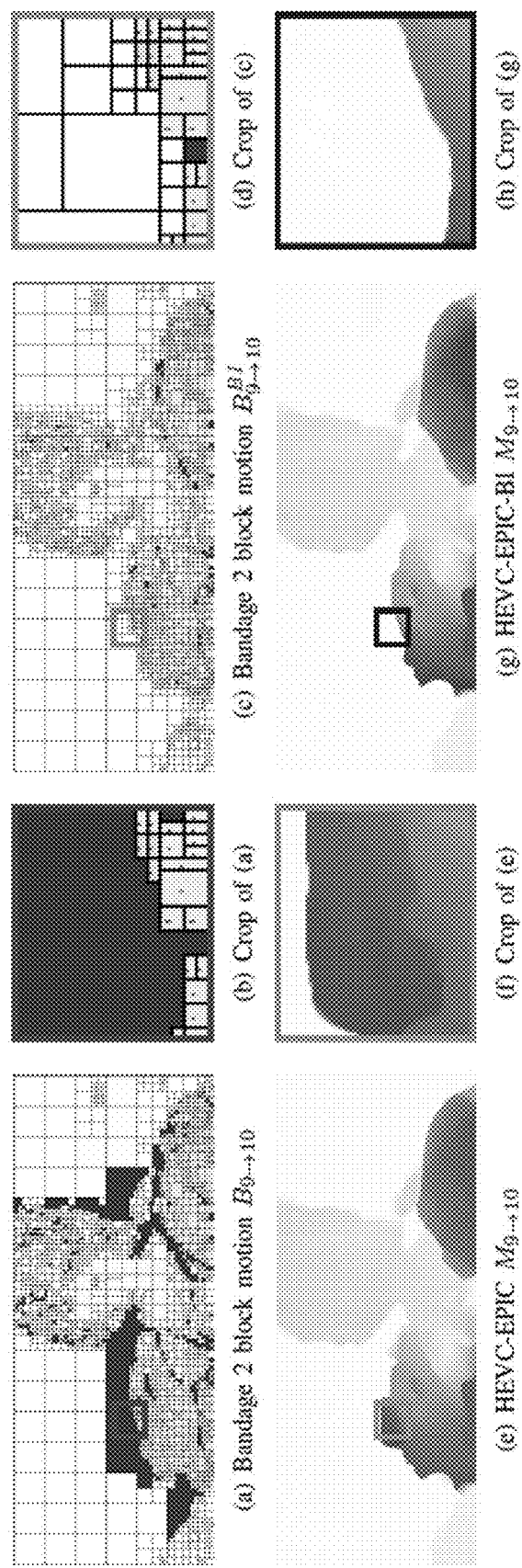

FIG. 14 illustrates bidirectional motion vector completion. (a) the decoded block motion $B_{9 \to 10}$, where blue regions correspond to blocks without motion information. (b) the bidirectionally completed block motion field $B_{9 \to 10}^{BI}$, where for each block where motion in $B_{9 \to 8}$ is available, its negative value was assigned. (c) and (d) are the motion fields produced by HE(-B). (e)-(h) show crops of (a)-(d).

Figure 15:
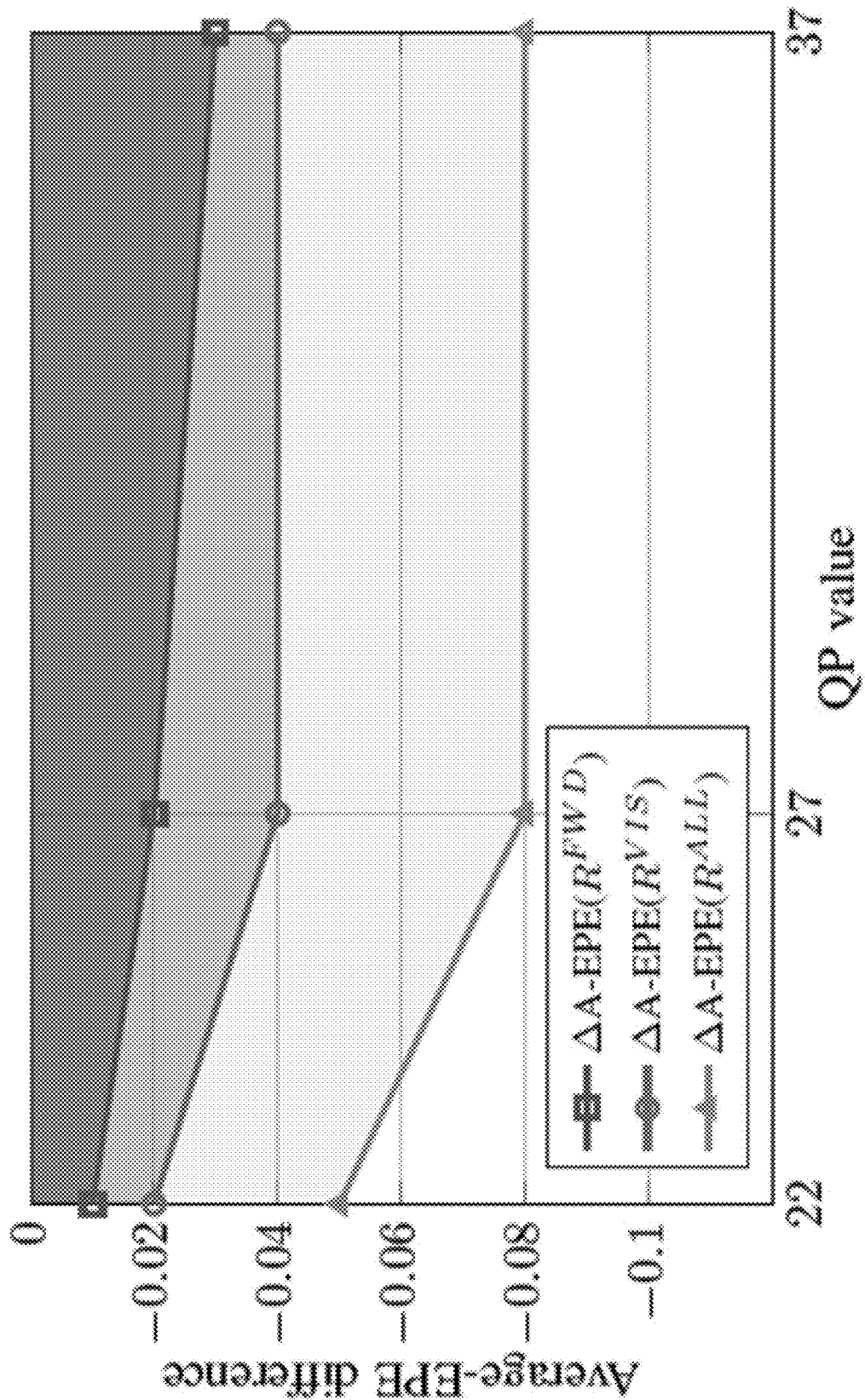

FIG. 15 shows overall average-EPE difference (100 motion fields) between HE-BI and HE ($\Delta$A-EPE), for three QP values. More negative numbers mean larger improvements of HE-BI over HE.

Figure 16:
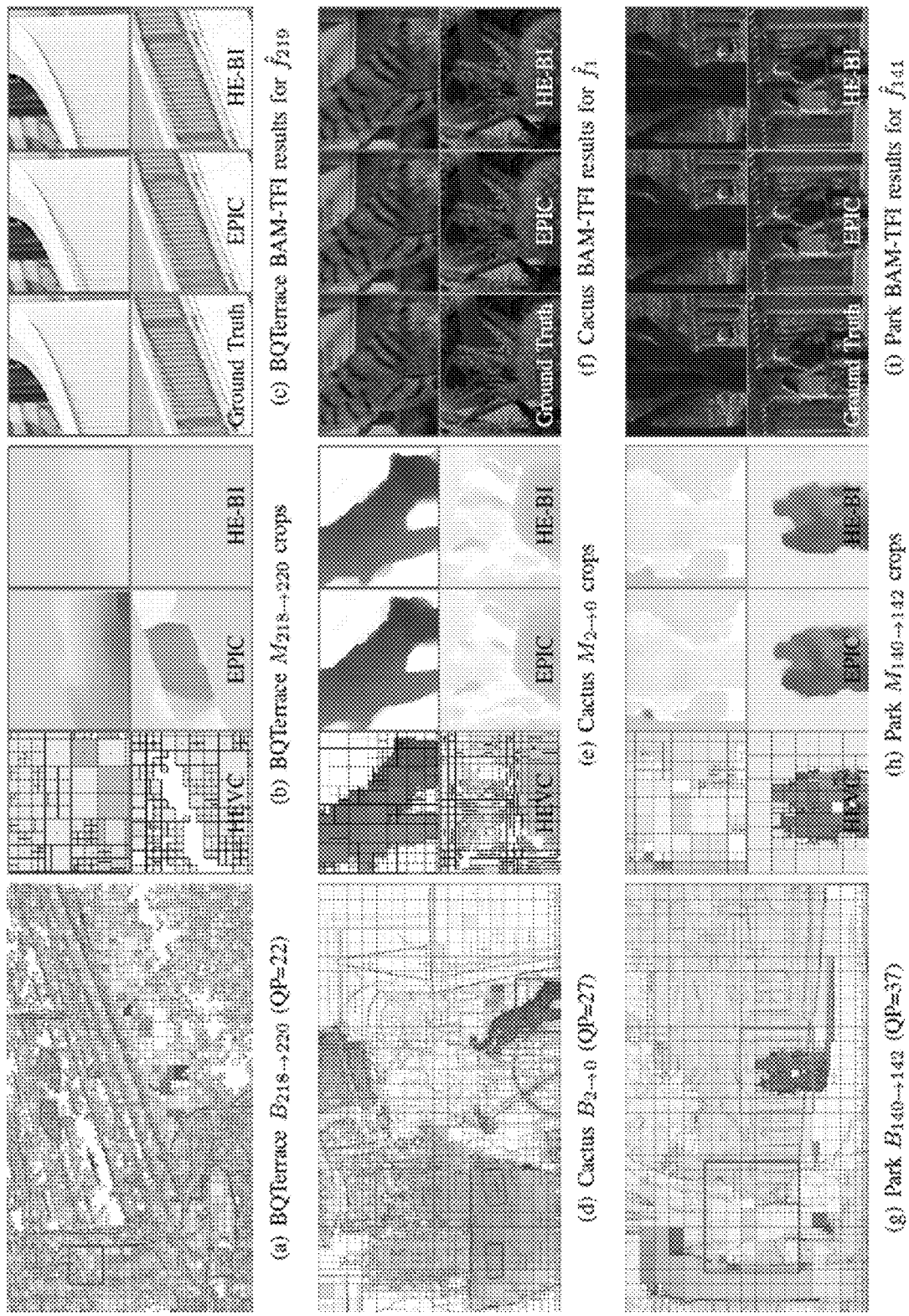

FIG. 16 illustrates TFI performance. (a/d/g) show the decoded block motion, where we overlaid the estimated edge map; (b/e/h) each show crops of the decoded block motion (left), EPIC flow (middle), and proposed HE-BI motion (right); (c/f/i) each show the ground truth target frame, as well as the interpolated frame obtained using EPIC flow (middle), and HE-BI (right) as input motion for BAM-TFI [2].

Figure 17:
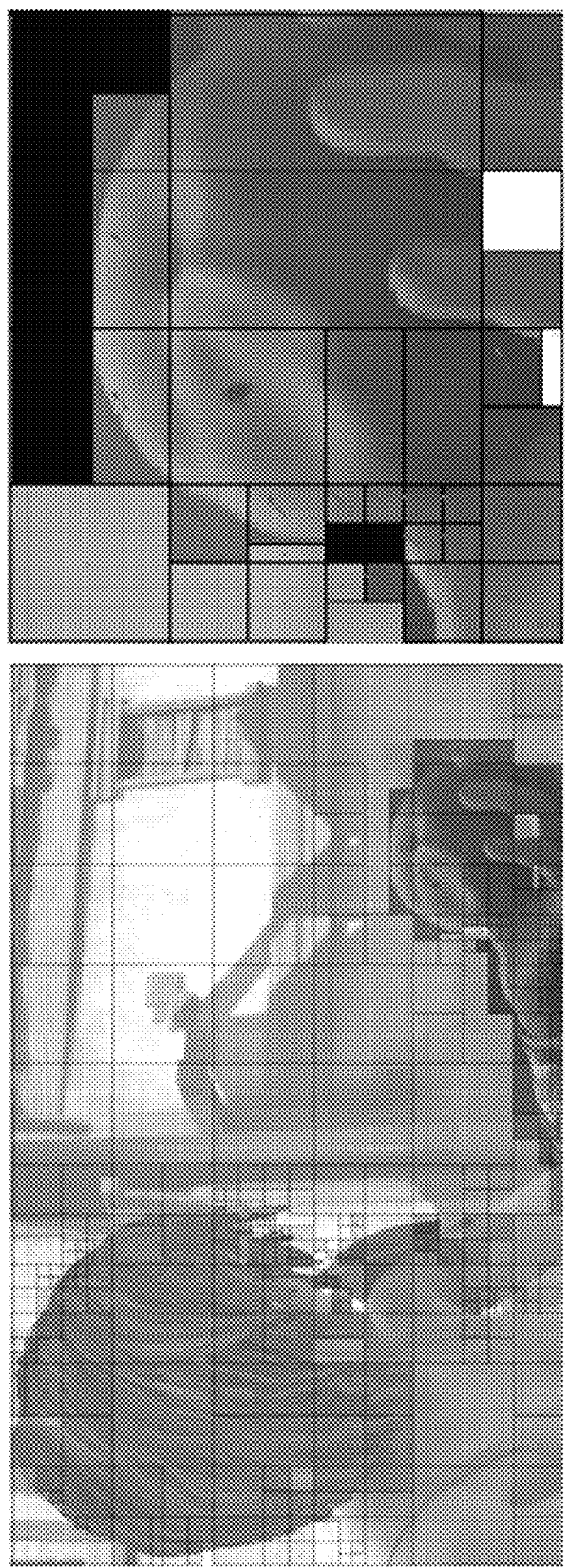

FIG. 17 illustrates problems with block motion for visual enhancement tasks. (a) shows a colour-coded motion field overlaid on the frame texture; (b) shows a crop of (a), where one can see how blocks are unable to describe the motion around moving objects. In addition, the white and black regions are "holes" in the motion field that arise because of Intra coding and uni-directionally predicted blocks from the other reference frame, respectively.

Figure 18:
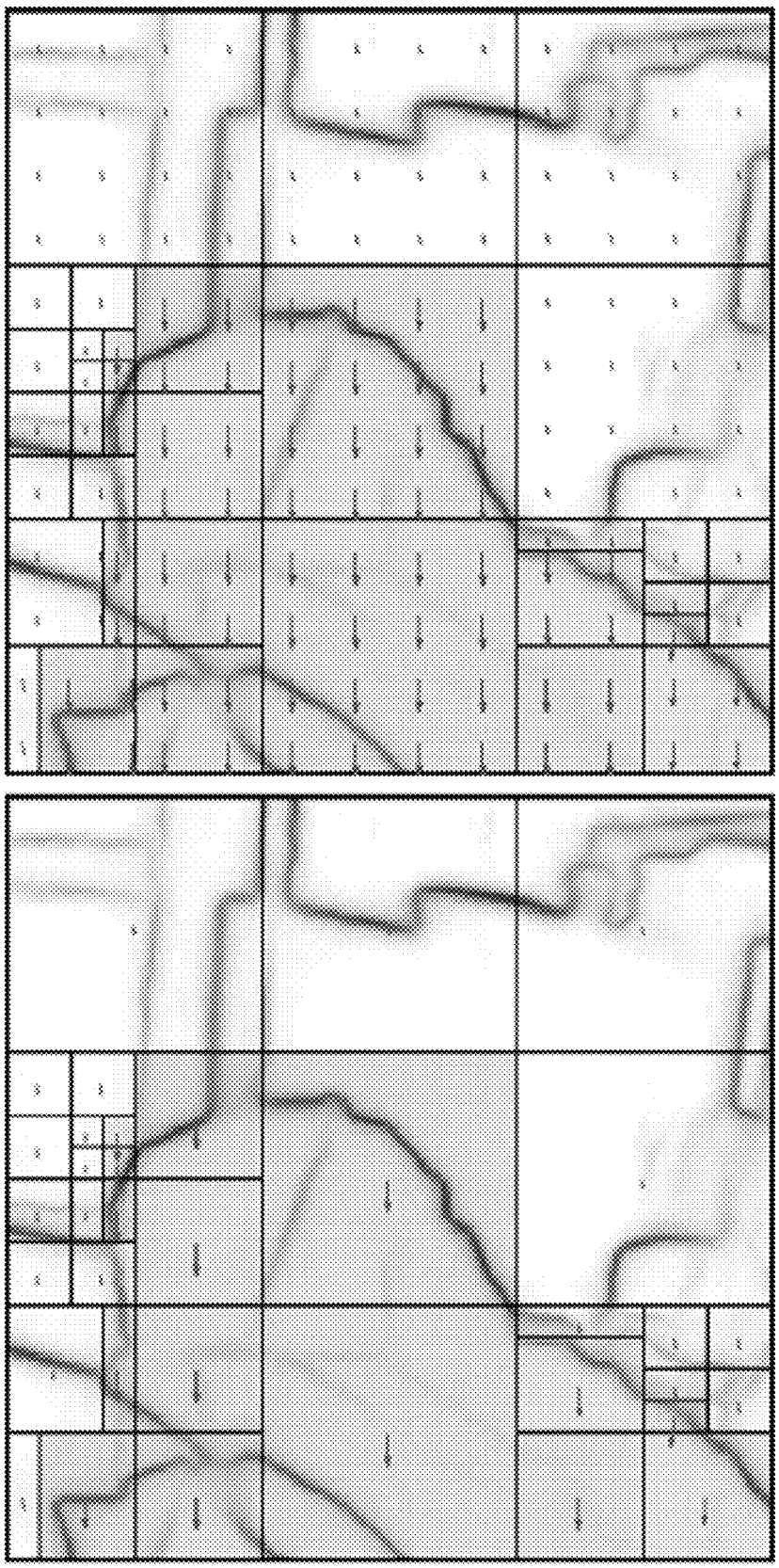

FIG. 18 illustrates different anchoring strategies for the decoded block motion vectors, which serve as seeds for the proposed HEVC-EPIC: (a) Each motion seed is anchored at the center of each block (HE); (b) Block motion sub-partitioning (BMS) implicitly distributes the weight for larger blocks.

Figure 19:
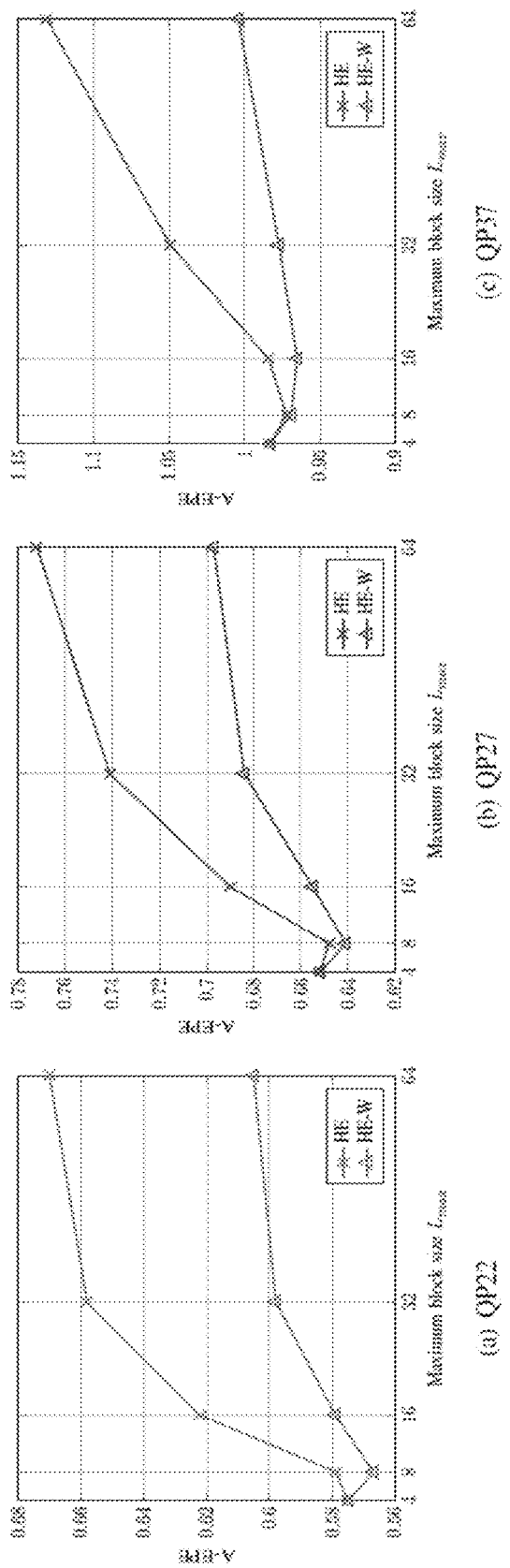

FIG. 19 shows average endpoint error (A-EPE) (100 motion fields) for HE-B, HE with block size proportional weighting (HE-BW), as well as additional weighting based on the prediction power of the block, without variational optimization. We show results for (a) QP22, (b) QP27, and (c) QP37, for varying maximum block sizes for the motion seed creation algorithm. Smaller numbers are better.

Figure 20:
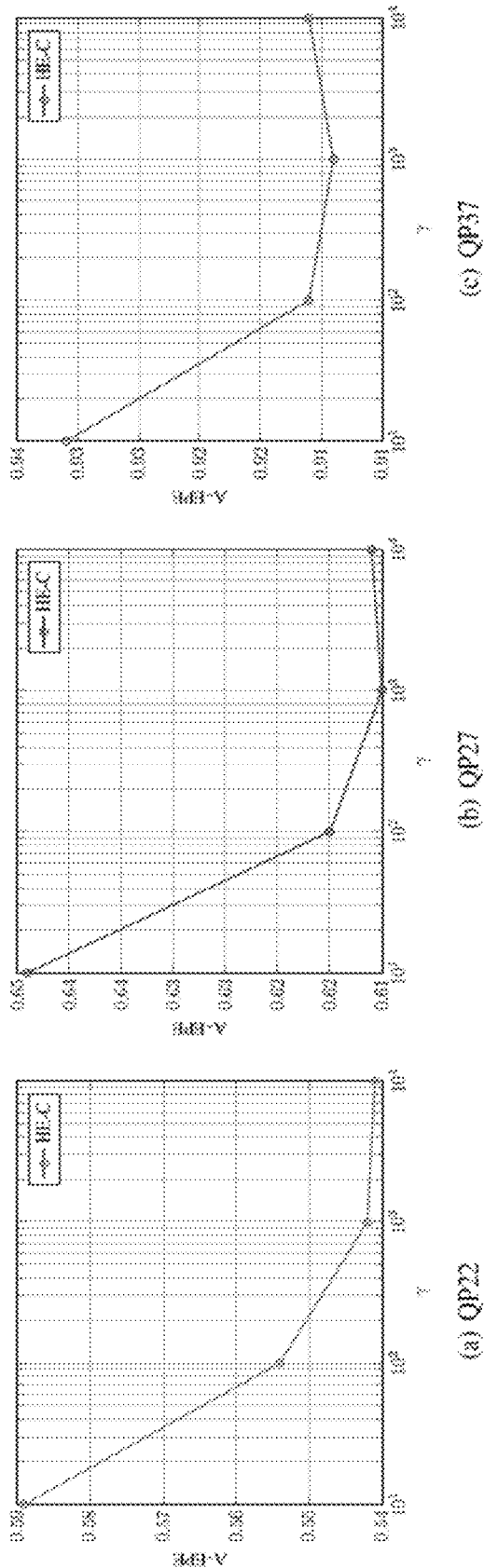

FIG. 20 shows the average endpoint error (A-EPE) (100 motion fields) at three QP values for HE-C for different values of $\gamma$, which controls the weight between the geodesic weight $g_n$ and the proposed motion confidence weight $h_n$. Smaller numbers are better.

Figure 21:
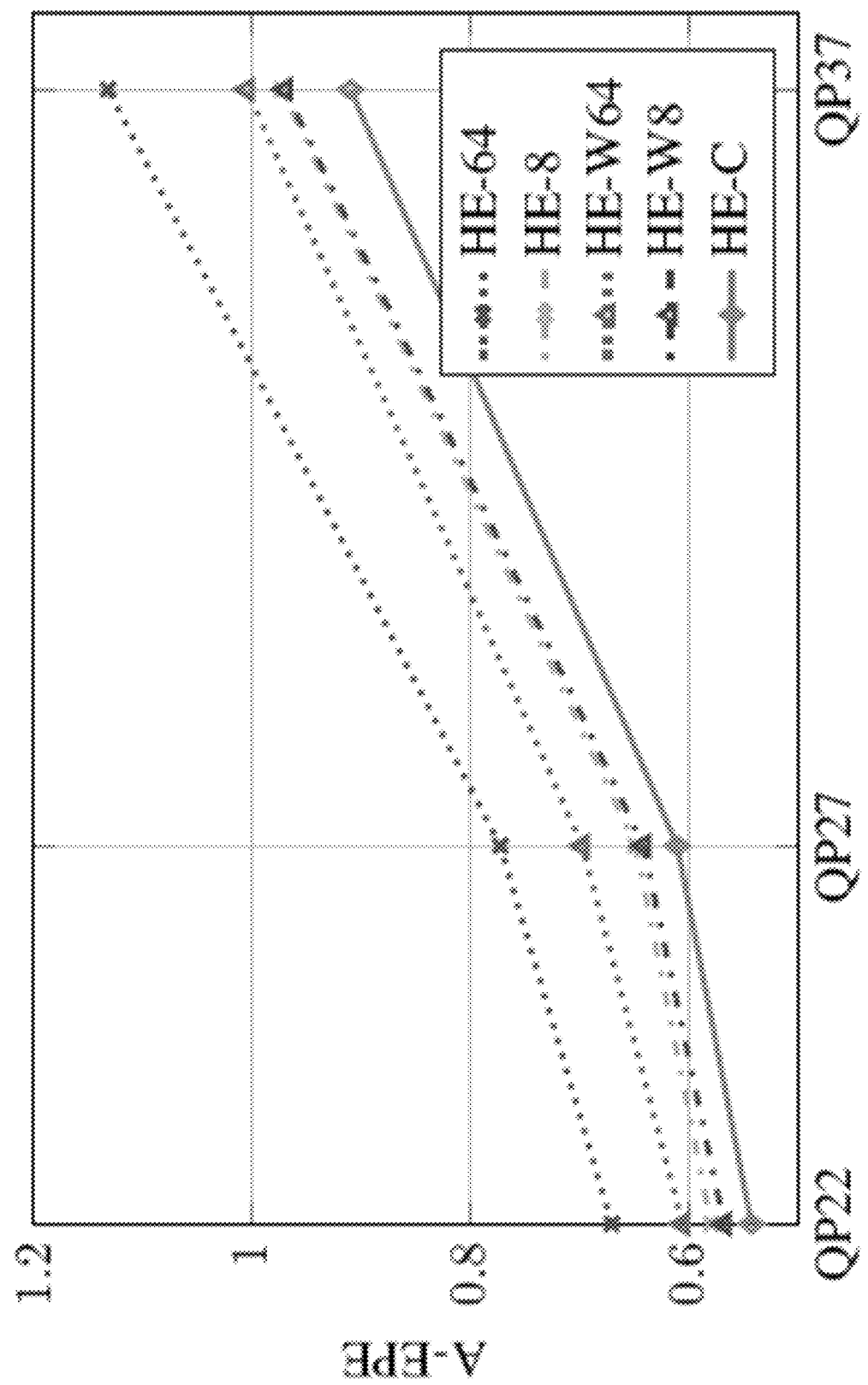

FIG. 21 shows average endpoint error (A-EPE) (100 motion fields) at three QP values for HEVC-EPIC (HE), HE with block-size proportional motion seed weighting (HE-W), as well as the proposed motion-confidence based weighting (HE-C); the number at the end of each method refers to the maximum block sub-partition size $L_{max}$ (for HE-C, all blocks are of size 4×4). To better see the impact of the different weighting strategies, the variational optimization has been turned off. Smaller numbers are better.

Figure 22:
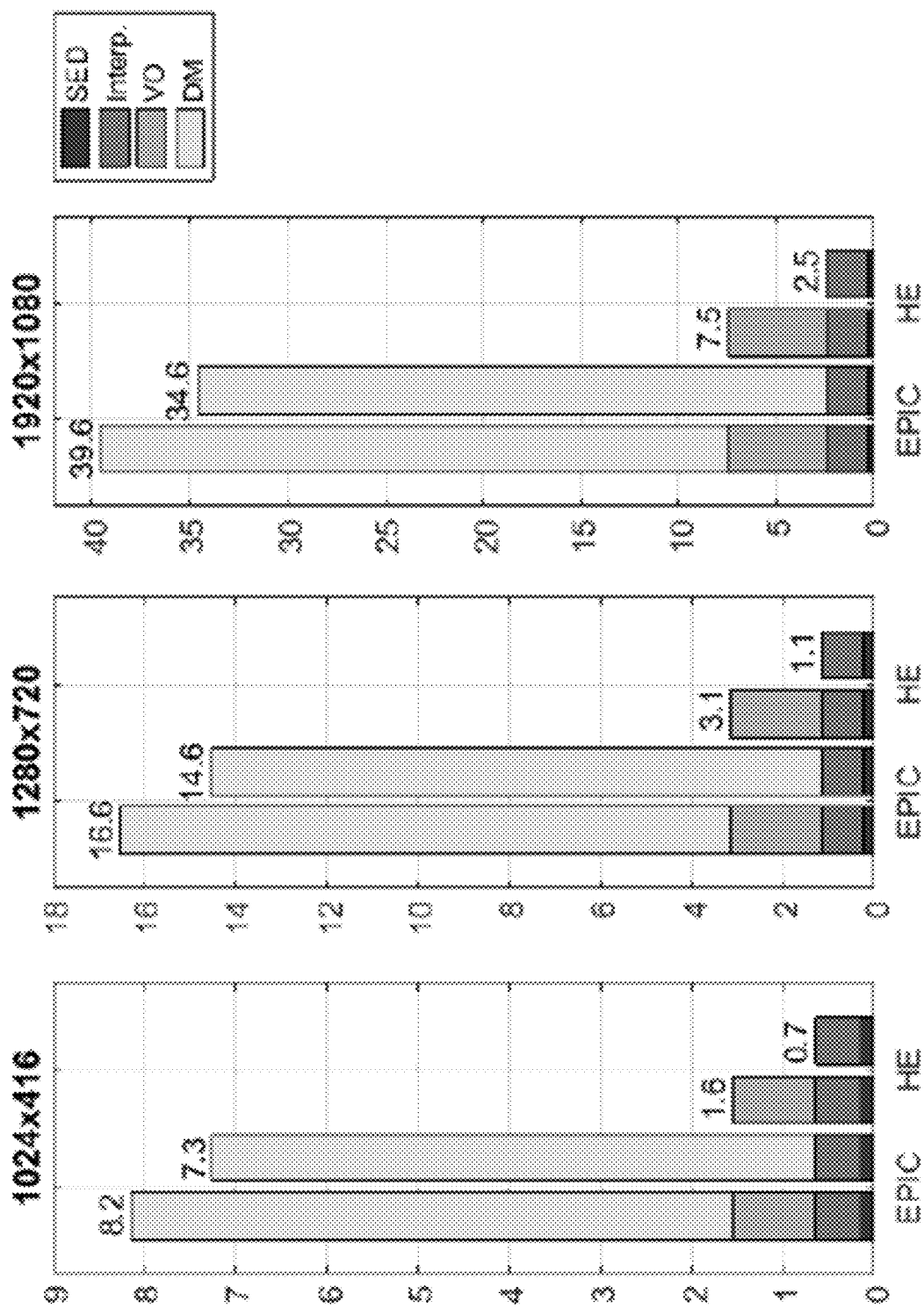

FIG. 22 shows a comparison of average timings (in seconds) between the original EPIC flow (with deep matching, search radius limited to 64 pixels) and the proposed HE, at different frame resolutions, on one CPU core at 3.2 Ghz. The timings are divided up into edge detection (SED), affine interpolation of seeds (Interp.), variational optimization (VO), and deep matching (DM). If VO is performed, the proposed HE is around 5 times faster that EPIC; with VO off, it runs 10-14 times faster, depending on the resolution.

Figure 23:
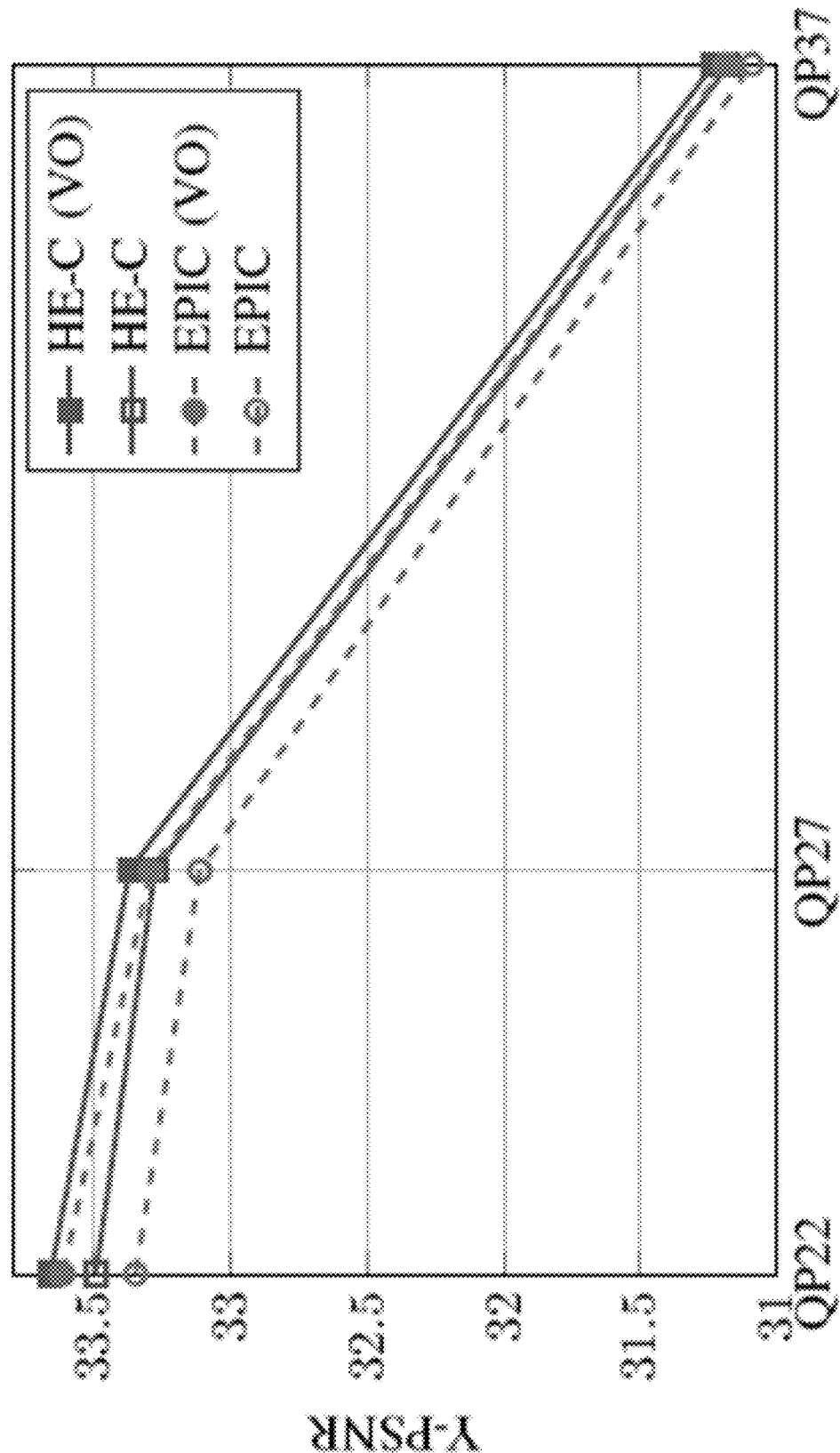

FIG. 23 shows evaluation of temporal frame interpolation (TFI) performance (in terms of average Y-PSNR on 110 interpolated frames, see Table II) of a state-of-the-art TFI scheme (BAM-TFI [2]) with different motion fields as input. We compare HE motion with the original EPIC flow [5], both with and without variational optimization (VO).

Figure 24:
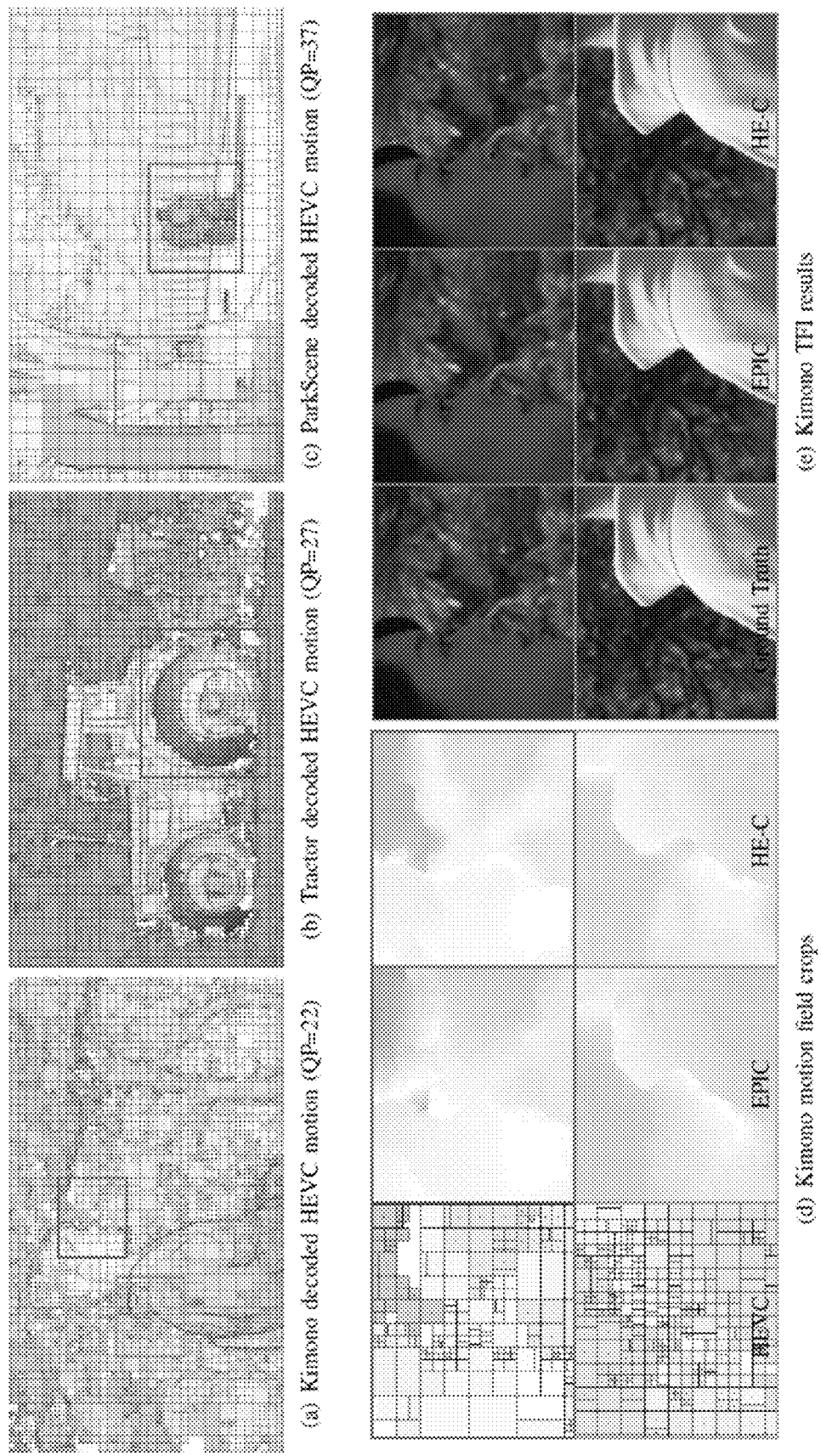
Figure 24:
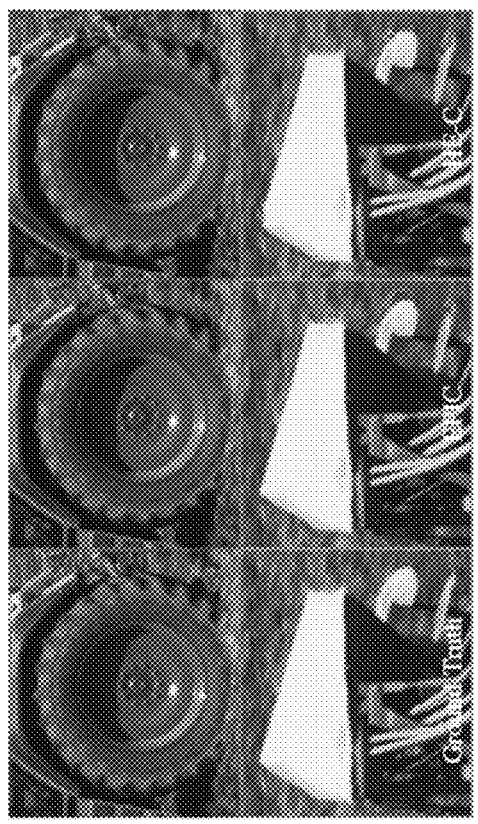
Figure 24:
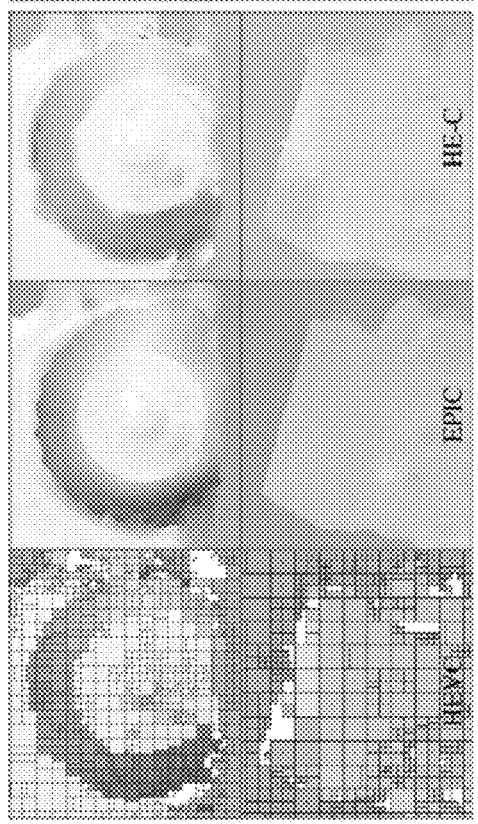
Figure 24:
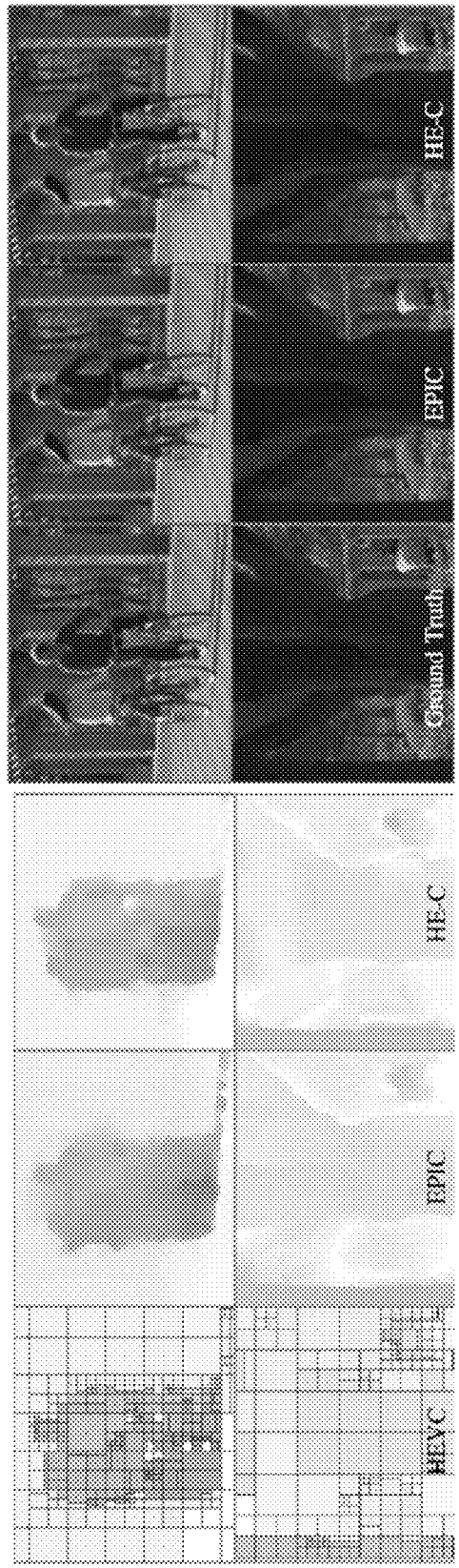

FIG. 24 shows use of HE motion as input to a framerate upsampling scheme (BAM-TFI [2]), and compared with the performance of EPIC motion; in these results, we disabled the variational optimization step. (a)-(c) show the decoded block motion for three different scenes, where we overlaid the estimated edge map; (d,f,h) each show crops of the decoded block motion (left), EPIC flow (middle), and proposed HEVC-EPIC (right); (e,g,i) each show the ground truth target frame, as well as the interpolated frame obtained using EPIC flow (middle), and proposed HE-C (right) as input motion for BAM-TFI.

4. DETAILED DESCRIPTION OF EMBODIMENTS

4.1. HEVC-EPIC

Overview

Figure 1:
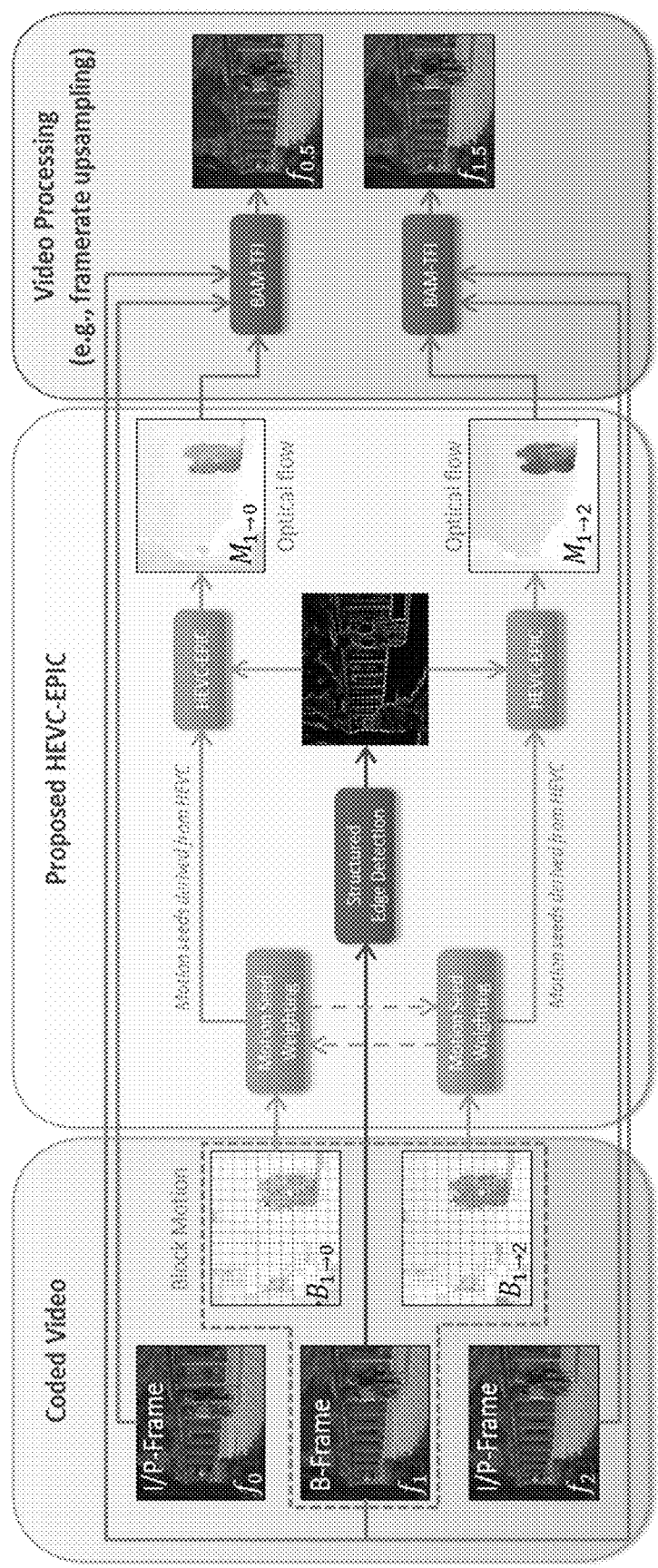
FIG. 1 is an illustration of the proposed method to estimate a high-quality motion field from decoded video, and one possible application of such motion.

FIG. 1 shows a high-level overview of the proposed method of this embodiment, known here as HEVC-EPIC (HE), and a possible application. While the name of the proposed method might suggest that it is specific to HEVC [8], the latest standardized video codec, we note here it can be applied to any form of video content that has been compressed by a block-based video compression system.

In summary, input to the method is a coded video sequence. Input to the method is a coded video sequence; in the example, we use an IBPB structure, and focus on a B-frame. For each B-frame $f_t$, block motion fields $B_{t \to t-1}$ and $B_{t \to t+1}$ are coded. We estimate edge information on the coded frame $f_t$ (purple path), which is used to guide the sparse-to-dense affine motion interpolation procedure to obtain dense motion fields $M_{t \to t-1}$ and $M_{t \to t+1}$ that can then be used for video processing tasks (blue box), such as temporal frame interpolation (TFI).

Figure 2:
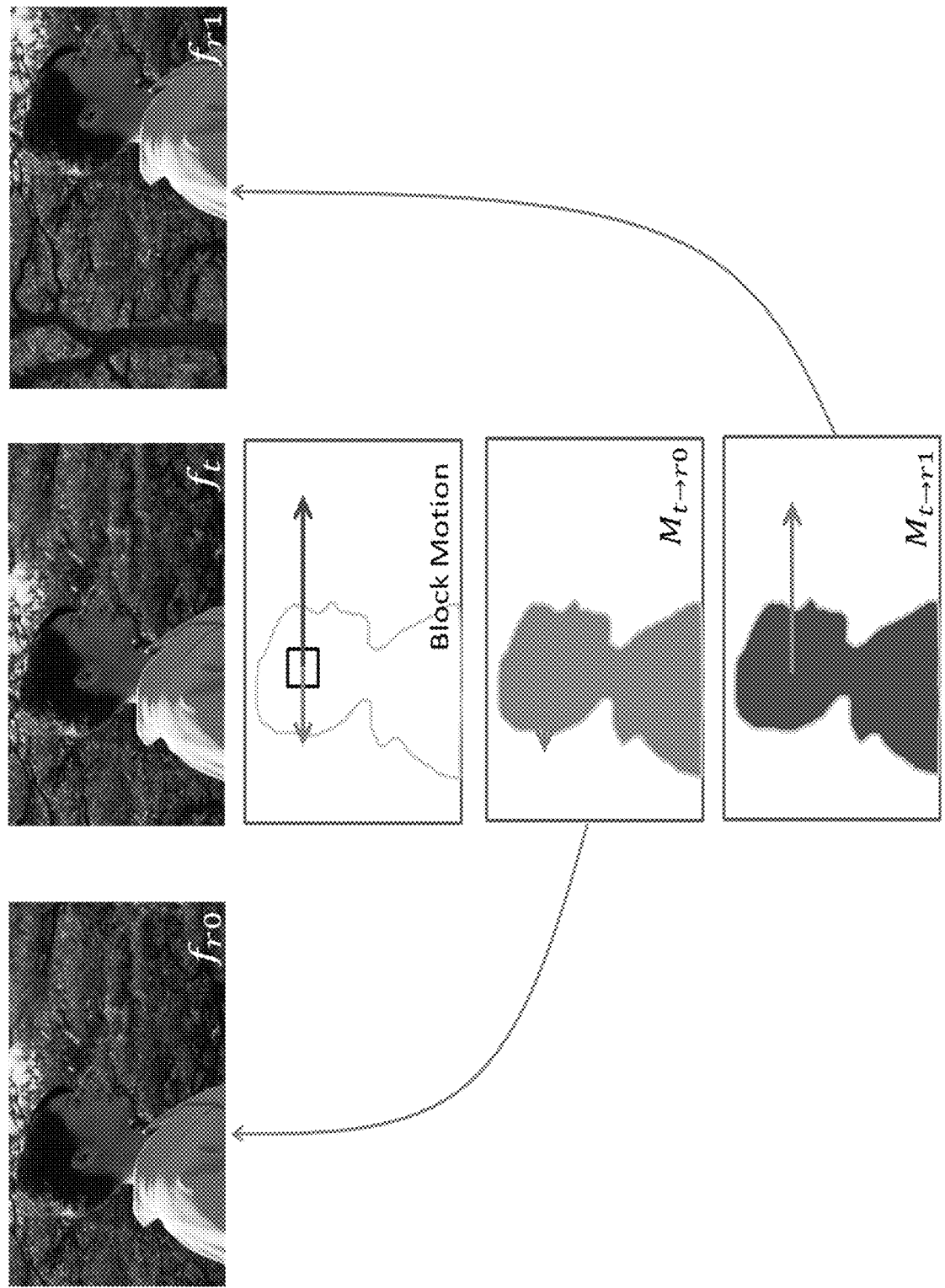
FIG. 2 is an illustration of HEVC-EPIC, to emphasize that motion descriptions are formed at the target frame.

In more detail, input to HE is decoded block motion from a decoded video sequence using the random-access profile, as well as the reconstructed frame texture data. While this is the most natural embodiment for many applications, in some embodiments original frame texture data might be available to be used instead of reconstructed frame texture data. For simplicity sake, we focus on an IBPB structure, and focus on the bidirectionally predicted B-frame. The generalization to other prediction structures and predicted frames within a prediction structure should be apparent to those skilled in the art. For each B-frame $f_t$, a backward and a forward block motion field, $B_{t \to t-1}$ and $B_{t \to t+1}$, is decoded. Each of these fields may involve "holes," where no original coded motion vectors are available for a given block, in one or both directions. In fact, the number of holes in the decoded block motion field increases in the case of B-frames, where in addition to intra-coded prediction blocks (PBs), unidirectionally predicted PBs lead to additional holes. As discussed below (in the section entitled "Leveraging Decoded HEVC Motion for Fast, High Quality Optical Flow Estimation"), a bidirectional motion vector completion (BMVC) can be applied whereby information from unidirectionally predicted PBs is negated in order to create a motion seed for the motion field that refers to the other reference frame. In practice, we find that this step is always beneficial, and hence it is applied in all variants of the proposed method. In FIG. 2, we illustrate the fact that motion descriptions are formed at the target frame. FIG. 2 is an illustration of HEVC-EPIC in the case of a B-frame. Motion seeds are derived from decoded block motion at the target frame, which are then input to an edge-sensitive interpolation scheme to obtain dense motion description(s) anchored at the target frame.

Rather than applying the same motion vector to the entire block, as is done during motion-compensated prediction in a video coder, we use the coded block motion vectors to create one or multiple motion "seeds" within each block for which coded motion information is available. We then use an edge-preserving, locally-weighted affine interpolator to create a dense motion field.

The resulting motion field is piecewise-smooth, with significant jumps concentrated around moving object boundaries; this is a much closer description of the underlying scene motion than the original block motion and can be used for a wide variety of video processing tasks, including framerate upsampling (see right-hand side of FIG. 1).

Edge-Sensitive Interpolation of Coded Motion

Here, we describe how a dense motion field that is sensitive to motion discontinuities can be obtained from a sparse set of coded motion vectors, referred to here as motion "seeds."

For the following discussion, we use K to denote the number of motion "seeds" that are derived from the decoded block motion field $B_{t \to j}$, where t refers to the target frame at which the block motion is anchored, and j is the corresponding reference (or source) frame. These K motion seeds drive an edge-preserving affine motion interpolation. In this process, interpolated motion u is derived at location s from a collection of nearest neighbours $\{u_n\}$ at locations $\{s_n\}$, where $n \in \{1, \ldots, N\}$.

The dense motion is obtained by interpolating each location s of the motion field $M_{t \to j}$ using a locally-weighted affine estimator, $$M_{t \to j} = A_s \bar{s}.$$

In the equation above, $A_s$ is a 2×3 matrix that describes the affine transform, and we used $\bar{s}$ to denote the homogeneous extension of s (i.e., $\bar{s} = (s_1, s_2, 1)^t$). While we need at least the three points $s_n$ in frame $f_t$ that are closest to s, more seeds are typically considered for increased robustness. Next, we compute the least-squares solution of the following overdetermined system $$A_s = \underset{A}{\mathrm{argmin}} \sum_{n=1}^{N} g_n \|A\bar{s}_n - u_n\|^2$$

where $g_n = d(s_n, s)^{-1}$ and $d(s_n, s)$ is a distance measure between the points $s_n$ and s. When N>3, the affine model puts more importance on fitting points $s_n$ that are "closer" to the location s of the point we seek to interpolate. An edge-sensitive distance measure is employed. FIG. 2 shows the impact on motion field quality that arises from using the edge-preserving distance measure from the well-known EPIC scheme [4].

It is desirable to modify the above formulation by replacing the distance-based coefficients $g_n$ with weighted coefficients $g_n^w$, where the weights used to convert $g_n$ to $g_n^w$ are based on block sizes and/or motion confidence values.

More detailed descriptions of the seeding and weighting strategies are provided in the ensuing sections.

Figure 3:
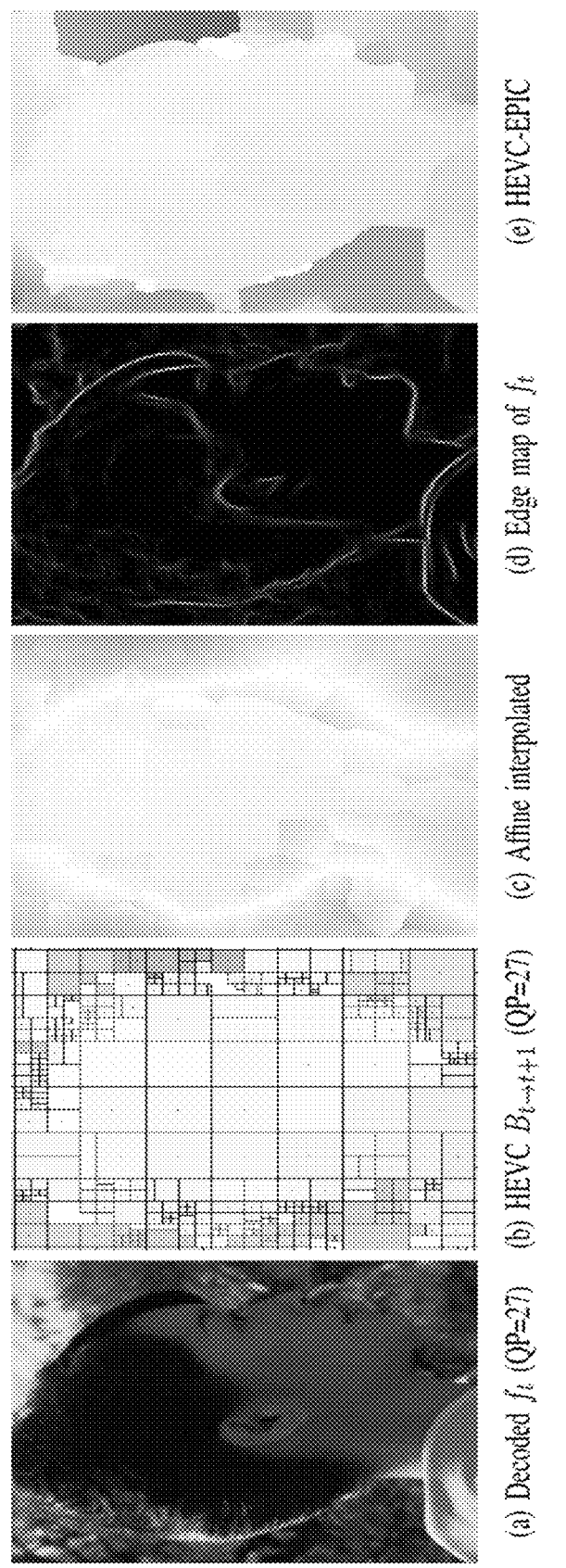
FIG. 3 is an illustration of the impact of the edge-preserving distance measure employed by the proposed method to preserve motion discontinuities in the interpolated motion field.

FIG. 3 is an illustration of the effect of the edge-preserving distance measure. (a) shows a coded frame, and (b) shows a (colour-coded) forward referencing block motion field $B_{t \to t+1}$, where white regions are regions without motion assignment. (c) shows the affine interpolated motion of (b), which is smooth across moving object boundaries. (d) shows the estimated edge probability map estimated on the coded frame $f_t$ which is used in (e) the proposed HEVC-EPIC to guide an edge-preserving affine interpolation.

4.2. Selection of Motion Seeds

From the block motion field $B_{t \to r}$, a first method to derive K motion seeds is to associate one seed vector $u_k$ with each block for which a motion vector is available. That is, K is the number of blocks in the coded motion field partition for target frame $f_t$, for which a coded motion vector is available, between $f_t$ and $f_r$.

Bidirectional Motion Vector Completion (BMVC)

As noted above, in many cases of interest $B_{t \to r}$ is one of two motion fields associated with a bi-directionally predicted target frame (B-frame) $f_t$. For B-frames, it is quite common for a block to have only one coded motion, pointing either to a previous frame or a later frame, but not both—this is particularly the case around moving objects, where parts of the local background are only visible in one of the two reference frames. As a result, many blocks in $B_{t \to r}$ may have no coded motion vector—we call these holes. A preferred motion seeding approach to the first one, identified above, is to fill these holes by a bidirectional motion vector completion (BMVC) step. The BMVC step can be applied in any block of a bi-directionally predicted target frame $f_t$ that has no coded motion vector in $B_{t \to r}$, but does have a coded motion vector v pointing to a different frame $f_p$. The completion step creates a seed vector $u_k$ for the block in question, that is obtained by scaling v by the ratio of the signed displacements between frames $f_t$ and $f_r$ and frames $f_t$ and $f_p$.

Block Motion Subpartitioning

In the foregoing approaches, the location $s_k$ of each seed $u_k$ is taken to be the centre of the corresponding motion prediction block. For large blocks, rather than putting all the weight of each seed on the centre of the prediction block, it is preferable to partition the block into smaller sub-blocks, creating one seed $u_k$ for each sub-block, located at the centre of the sub-block. The sub-block seed motion vectors are obtained simply by reproducing the original prediction block's motion vector. In preferred embodiments, blocks are sub-divided down to a size of $L_{max}$ in each dimension (horizontally and vertically), except where the dimension is already $L_{max}$ or smaller. A value of $L_{max}=8$ is preferred for most conditions, except at lower video qualities (higher QP), where $L_{max}=16$ can be preferable.

4.3. Weighting of Motion Seeds

In this section, we describe weighting strategies for deriving weighted seed coefficients $g_n^w$ from the distance-only coefficients $g_n$. A straightforward weighting approach is to set $g_n^w = h_n \cdot w_n \cdot g_n$, where $h_n$ and $w_n$ are the height and width of the motion block or sub-block corresponding to the seed vector $u_n$. For motion blocks that have been partitioned into sub-blocks, the dimensions in question are those of the sub-block. Partitioning tends to leave many sub-blocks with size $L_{max} \times L_{max}$, so that area-based weighting is less important when used in conjunction with motion block partitioning.

We now describe an approach for deriving weighted coefficients $g_n^w$ based on a measure of confidence in the seed motion $u_n$. In this approach, $g_n^w$ is formed as the weighted harmonic mean between the edge-distance based coefficients $g_n$ and a confidence-based coefficient $h_n$, as $$g_n^w = \frac{g_n \gamma h_n}{g_n + \gamma h_n}$$

where $\gamma$ is a tuning parameter that determines the relative significance of motion confidence and reciprocal edge-distance. In preferred embodiments, original motion prediction blocks are partitioned into 4×4 sub-blocks, assigning the original block motion to each sub-block as the seed vector $u_n$, after which the quantity $h_n$ is derived using a procedure based on frequency analysis. Writing $y_n$ and $x_n$ for the corresponding 4×4 sub-blocks in the target frame $f_t$ and reference frame $f_j$, respectively, and $\hat{y}_n(\omega_i)$ and $\hat{x}_n(\omega_i)$ for the 2D DFT coefficients corresponding to the four spatial frequencies $$\omega_1 = \left(\frac{\pi}{4}, 0\right), \omega_2 = \left(0, \frac{\pi}{4}\right), \omega_3 = \left(\frac{\pi}{4}, \frac{\pi}{4}\right) \text{ and } \omega_4 = \left(\frac{\pi}{4}, -\frac{\pi}{4}\right),$$

we evaluate $$\beta_{n,i} = \Im\left(\frac{\hat{y}_n(\omega_i) \cdot (\hat{x}_n(\omega_i))^*}{|\hat{y}_n(\omega_i)| \cdot |\hat{x}_n(\omega_i)|}\right)$$

where $\Im$ takes the imaginary part of its argument and $(\cdot)^*$ denotes complex conjugation. Next, we compute $$\sigma_{n,i}^2 = \frac{8\sigma^2}{|\hat{y}_n(\omega_i)|} + \frac{8\sigma^2}{|\hat{x}_n(\omega_i)|}$$

where $\sigma^2$ is an estimated texture noise variance that is derived from the quantization parameters (QP value) used to compress the original video frame data. Using these, we compute a 2×2 covariance matrix $C_n$ and 2×1 mean vector $\mu_n$ from $$C_n = \left(\sum_{i=1}^{4} \frac{\omega_i \omega_i^t}{\sigma_{n,i}^2}\right)^{-1} \text{ and } \mu_n = C_n \sum_{i=1}^{4} \frac{\omega_i \beta_{n,i}}{\sigma_{n,i}^2}$$

where $\omega^t$ denotes transposition of the 2×1 vector $\omega$. Finally, the motion confidence coefficient $h_n$ is computed from $$h_n = \frac{1}{tr(C_n + \mu_n \mu_n^t)}$$

where $tr(\cdot)$ denotes the matrix "trace" operator, which takes the sum of the top-left and bottom-right entries in the 2×2 matrices employed here. A derivation of the above relationships may be found in [11].

4.4. Mapped HEVC-EPIC

Figure 4:
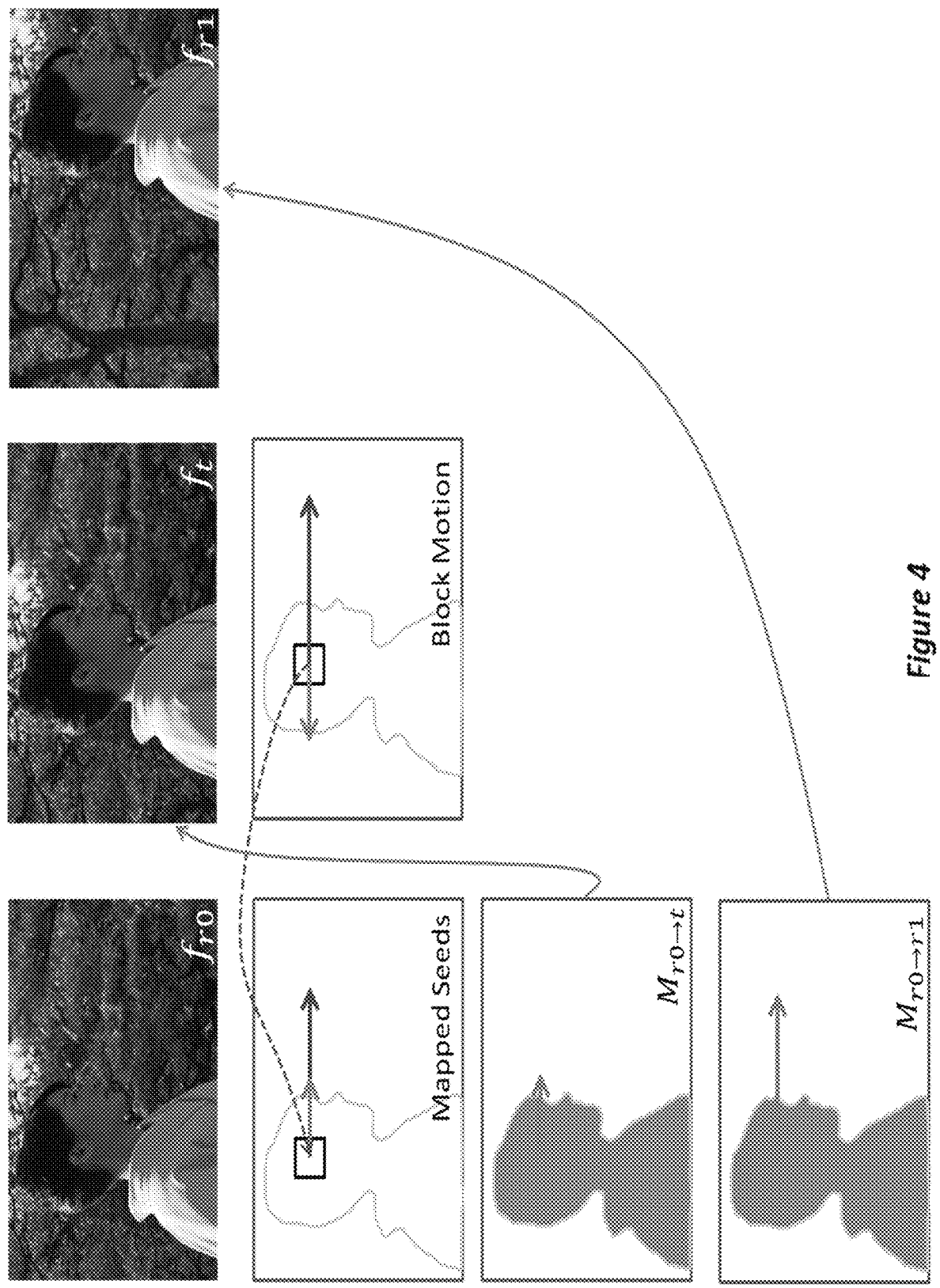
FIG. 4 is an illustration of mapped HEVC-EPIC, to emphasize that motion descriptions are formed at a reference frame.

In this section, we describe an embodiment of HEVC-EPIC, where the dense motion description is anchored at a different frame than where the original (block) motion description is anchored. FIG. 4 illustrates the fact that motion descriptions are formed at a reference frame. We refer to this embodiment as mapped HEVC-EPIC (M-HE).

FIG. 4 is an illustration of mapped HEVC-EPIC in the case of a B-frame. Motion seeds are derived from decoded block motion at the target frame. These seeds are then mapped to a reference frame ($f_{r_0}$ here), where they are used together with edge information derived at the reference frame to obtain dense motion descriptions from the reference frame to other frames involved in the prediction of the target frame.

In its simplest form, where we have one block motion field $B_{t \rightarrow r}$, where t refers to the target frame $f_t$ and r to the reference frame $f_r$ that serves as motion-compensation prediction reference, we first map all motion seeds derived from the block motion field to the reference frame, and perform the edge-sensitive interpolation at the reference frame $f_r$. This has the advantage that the quality of the reference frame can be expected to be higher than for the target frame, and hence one can expect to extract better edge information. In addition, a motion description between $f_r$ and $f_t$ may be derived without actually decoding the target frame texture.

In the case of bidirectionally predicted frames (i.e., B-frames), or whenever multiple prediction references are available so that more than one block motion field is coded for each target frame, M-HE has additional benefits. We focus here on the simplest case of a B-frame with two prediction references; extensions to more than two reference frames should be apparent to those skilled in the art. In the simple B-frame scenario, where the target frame $f_t$ is predicted from the reference frames $f_{r0}$ and $f_{r1}$, the following information is available to the decoder: 1) The prediction reference frames $f_{r0}$ and $f_{r1}$; and 2) block motion fields $B_{t \rightarrow r0}$ and $B_{t \rightarrow r1}$, containing the block displacement information from $f_t$ to reference frames $f_{r0}$ and $f_{r1}$, respectively.

Rather than estimating separate motion fields $M_{t \rightarrow r0}$ and $M_{t \rightarrow r1}$, i.e., motion fields anchored at the target frame to the respective reference frame as done in HEVC-EPIC, in mapped HEVC-EPIC, the aim is to obtain a collection of motion fields anchored at one of the reference frames, pointing to the other reference frame(s), as well as the target frame.

The main appeal of M-HE when P>1 block motion fields are available, is that the interpolated motion descriptions, all anchored at one of the reference frames, can be leveraged to derive a higher-order motion description, which can then be used for example to interpolate additional frames that follow this higher-order motion model, which are shown to be beneficial to improve the motion compensated prediction of frames [10].

4.5. Applications

The motion fields estimated with the present invention can be used in a wide range of video processing applications. Here, we describe a (non-exhaustive) list of some of these applications.

Framerate upsampling, also known as (motion compensated) temporal frame interpolation (TFI), is a common task that is applied in display technology to match the framerate of the video to the frequency of the display panel. In order to meet requirements of a practical TFI scheme used in displays (i.e., real-time), existing schemes employ basic motion estimation techniques that result in sub-optimal interpolated frames. The quality of such schemes can be improved by employing higher quality motion fields, as produced by the present invention.

In video editing and post-processing, framerate upsampling also plays an important role, for example to create (artistic) slow-motion effects by increasing the framerate of a video, or to adjust the duration of a certain clip to a desired length. In addition, motion information can be used to augment the video with additional objects, or selectively changing the appearance (colour, intensity, etc.) of specific (moving) objects, for which a high-quality motion description is also beneficial. While in this application, real-time is not a strict requirement, there still is a limit as to how long a video editor can be expected to wait until the desired effect is applied.

Another field of application is video analytics for search and retrieval (i.e., indexing) applications. For example, event detection and object tracking heavily rely on motion information. Such applications require analyzing potentially large sets of coded video data, where the present invention provides a way of extracting relevant high-quality motion information at a fraction of the time used by existing motion field estimators.

It is worth noting that in some applications, the block motion vectors that are interpolated might be available as original vectors from a block motion estimation scheme that forms part of a video encoder, in which case the step of decoding coded block motion is not required by the invention.

Apparatus implementing the methods and processes described above may be implemented using hardware, software, a combination of hardware, software and firmware. Where software is utilized, it may be provided on computer readable mediums, or transmitted as a data signal, or in any other way.

Processes in accordance with methods of the present invention may be implemented in coders or decoders for video processing or any image processing. Devices may include dedicated circuitry and, including processors and memory. It may comprise general purpose computers programmed with appropriate software. It may comprise devices which incorporate special purpose circuits, such as ASICs or other programmable hardware. It may comprise use of computing resources over networks, in the cloud, or any other computing architecture.

Figure 5:
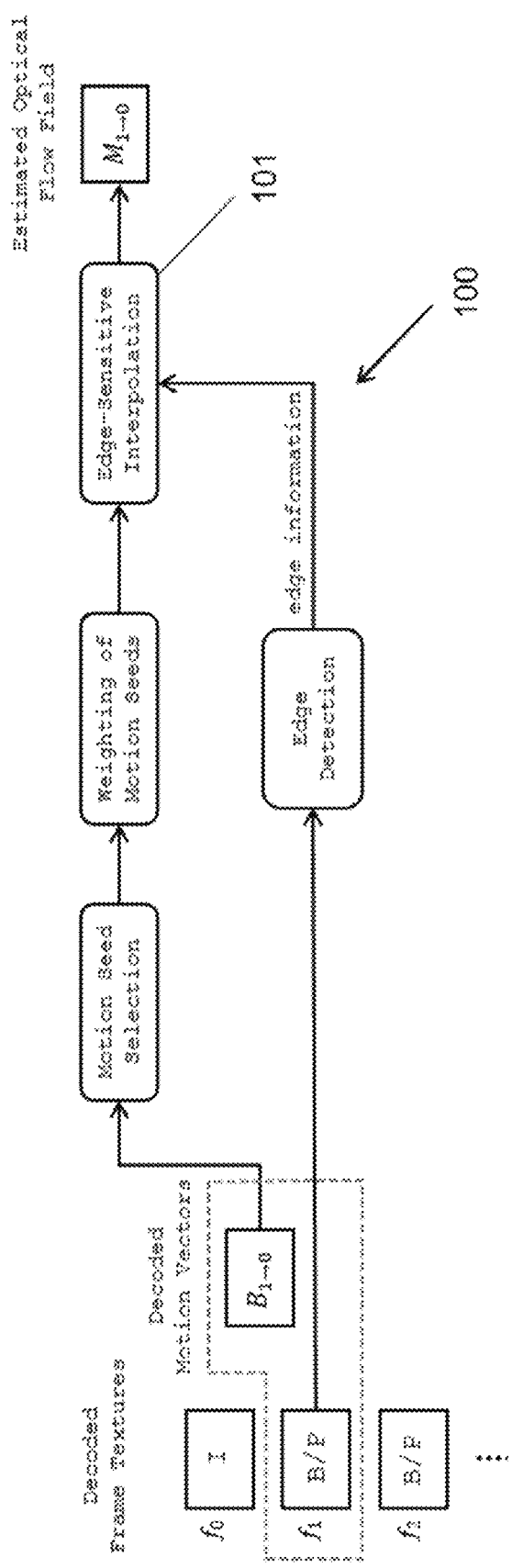
FIGS. 5, 6 and 7 are illustrations of decoders that employ the proposed HVEC-EPIC to estimate a dense, optical flow field.
Figure 6:
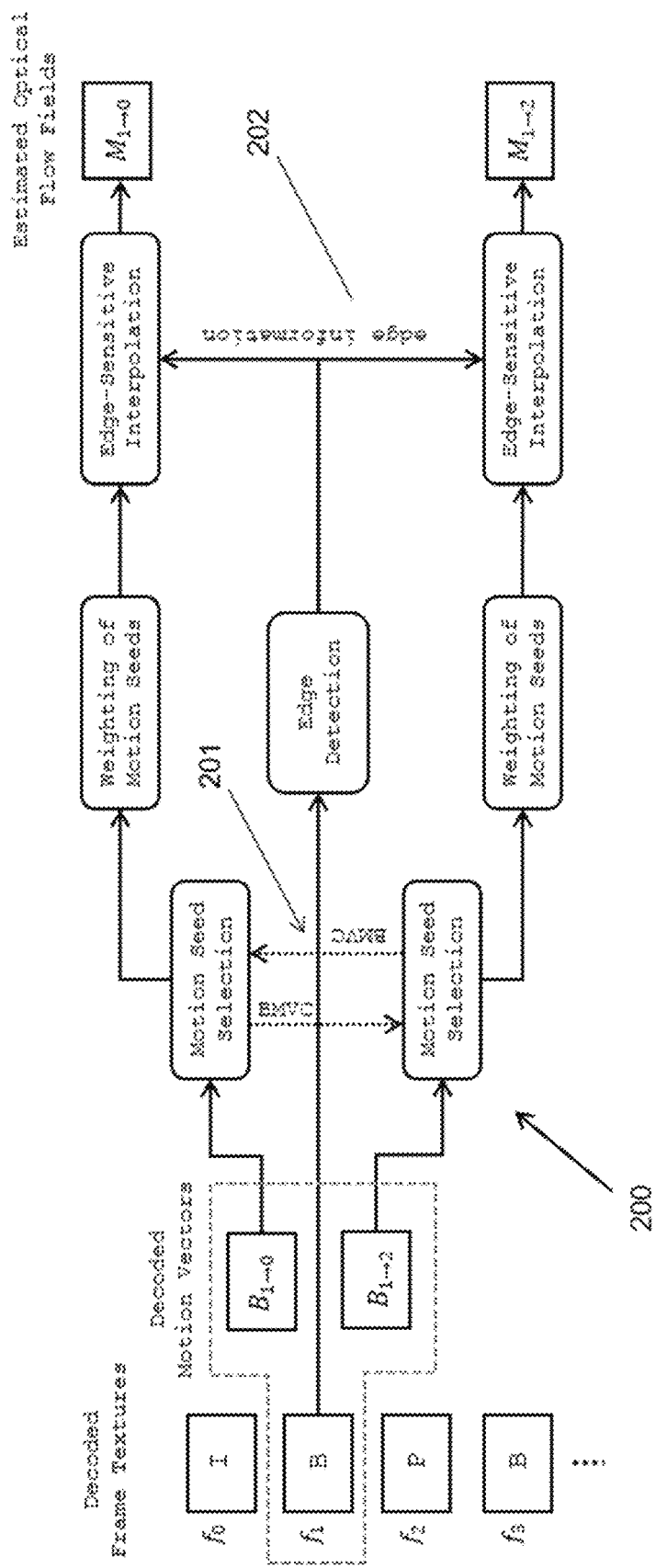
Figure 7:
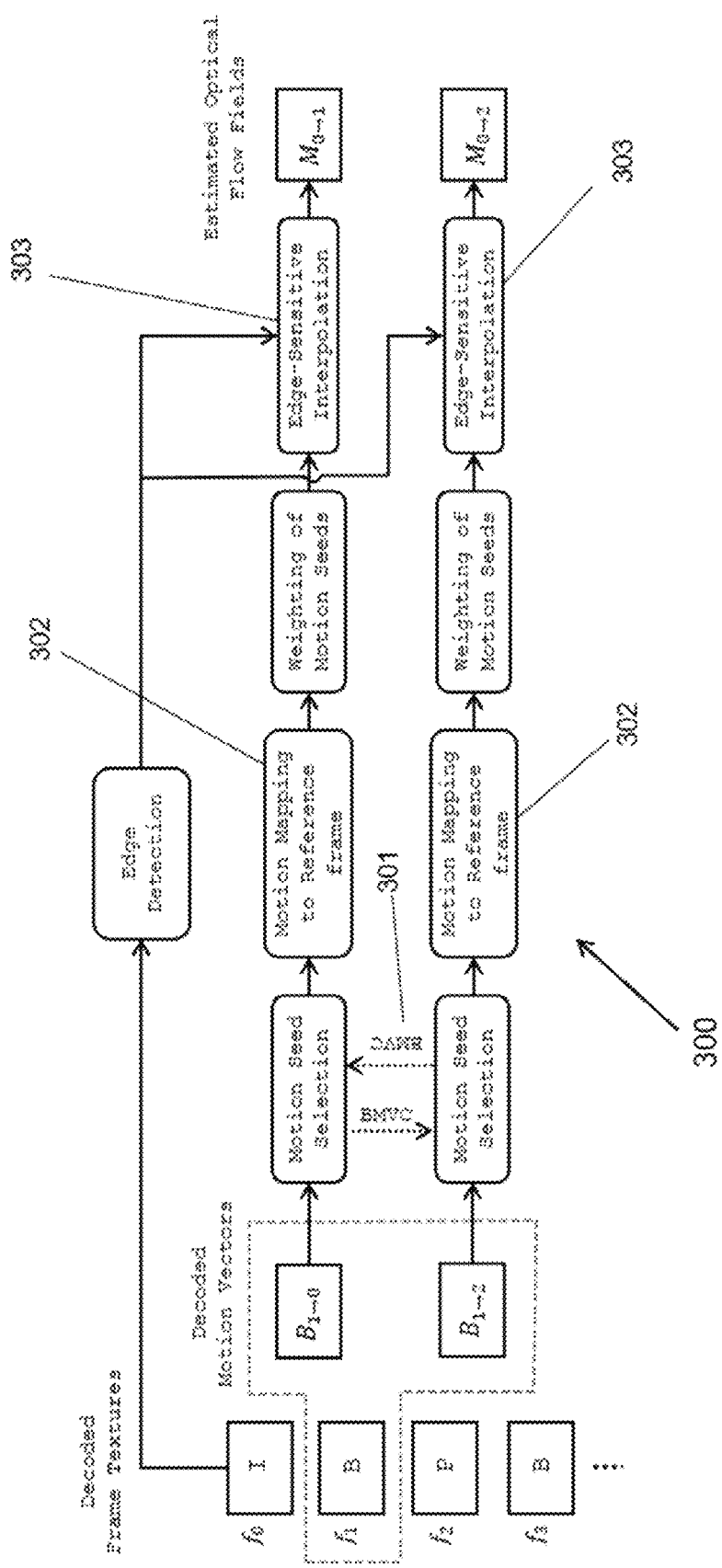

FIGS. 5, 6 and 7 show schematic block diagrams of decoders in accordance with embodiments.

FIG. 5 is an overview of a decoder 100 that employs the proposed HEVC-EPIC to estimate a dense, optical flow field, from one decoded motion field that is attached to either a P- or a B-frame. Edge information is estimated on the target frame, and used to drive an edge-sensitive interpolation 101 of (weighted) motion vectors, in order to obtain two dense optical flow fields, which describe the motion from the target frame to the two reference frames.

FIG. 6 is an overview of a decoder 200 that employs the proposed HEVC-EPIC to estimate a dense, optical flow field, from two (or more) decoded motion fields that are attached to a B-frame. Motion vector information can be exchanged between the two (or more motion fields) using a bidirectional motion vector completion step (BMVC) 201. Edge information is estimated on the target frame, and used to drive an edge-sensitive interpolation 202 of (weighted) motion vectors, in order to obtain a dense optical flow field, which describes the motion from the target frame to the reference frame.

FIG. 7 is an overview of a decoder 300 that employs the proposed HEVC-EPIC to estimate a dense, optical flow field, from two (or more) decoded motion fields that are attached to a B-frame. Motion vector information can be exchanged between the two (or more motion fields) using a bidirectional motion vector completion step (BMVC) 301. Next, the decoded (and potentially BMVC completed) motion vectors are mapped 302 to one of the reference frames that are used to predict the B-frame. Edge information is estimated on the same reference frame, and used to drive an edge-sensitive interpolation 303 of (weighted) motion vectors, in order to obtain two dense optical flow fields, which describe the motion from said reference frame to all other frames that are referenced by the B-frame.

The following sections provide further disclosure

HEVC-EPIC: Edge-Preserving Interpolation of Coded HEVC Motion with Applications to Framerate Upsampling We propose a method to obtain a high quality motion field from decoded HEVC motion. We use the block motion vectors to establish a sparse set of correspondences, and then employ an affine, edge-preserving interpolation of correspondences (EPIC) to obtain a dense optical flow. Experimental results on a variety of sequences coded at a range of QP values show that the proposed HEVC-EPIC is over five times as fast as the original EPIC flow, which uses a sophisticated correspondence estimator, while only slightly decreasing the flow accuracy. The proposed work opens the door to leveraging HEVC motion into video enhancement and analysis methods. To provide some evidence of what can be achieved, we show that when used as input to a framerate upsampling scheme, the average Y-PSNR of the interpolated frames obtained using HEVC-EPIC motion is slightly lower (0.2 dB) than when original EPIC flow is used, with hardly any visible differences.

Introduction

Motion estimation lies at the heart of modern video compression algorithms, and is one of the fundamental problems of computer vision. However, motion information is used for different purposes. In compression, it is used to exploit the temporal redundancy between frames, which plays an essential role in the reduction of the coding cost of video content. In computer vision, so-called optical flow estimation algorithms aim at estimating the "physical" flow between frames, which can then be used for a variety of video analysis and enhancement techniques. The aim of this paper is to build more meaningful motion from decoded "block" motion, and hence bridge two fields that traditionally are treated separately.

Most of the video content that is consumed is compressed content, for which (block) motion information has been estimated. However, this motion estimation is opportunistic and does not in general attempt to follow actual scene motion, in particular around moving objects. Focussing on the frame up-sampling task, Chen et al. [12] add spatial regularization to the motion estimation scheme on the encoder side, and then use the decoded motion to obtain temporally upsampled frames of higher quality. In order to be compliant with existing video codecs, Wu et al. [13] use decoded block motion directly to interpolate frames, and propose an iterative refinement technique to conceal inevitable interpolation errors in the target frame. Rather than fixing up texture information, Yang and Yang [14] instead propose to improve the decoded motion field by considering causal neighbour blocks as additional motion candidates, and select the one that has the smallest prediction residual; the resulting (block) motion field is then used as in-put for a traditional TFI method.

Our approach to obtain a high quality motion field from decoded (block) motion is inspired by the recent trend followed by several top-performing optical flow algorithms (e.g., [4, 5]), which first estimate a sparse set of reliable correspondences, and then employ an edge-preserving interpolation strategy [4] to compute a dense optical flow. In order to avoid the time-consuming part of finding correspondences, we propose to directly use the motion of each decoded block motion vector as a correspondence. We then use edge information, estimated on decoded texture using a structured edge detector [15], to guide the edge-preserving interpolation of correspondences (EPIC) algorithm [4] to obtain the final motion.

Not surprisingly, the use of decoded block motion as "seeds" for the sparse-to-dense interpolation significantly reduces the computational complexity of optical flow estimation. Much more surprising, however, is the quality of the motion flows that can be obtained in this way. Although the source HEVC motion field is block-based, containing holes and many opportunistic vectors, a convincing flow field can be recovered with remarkably high accuracy. To test the suitability of HEVC-EPIC motion for video analysis and enhancement methods, we use the estimated flow as input to a state-of-the-art framerate upsampling algorithm [1], and show that it is able to create high quality interpolated frames.

Overview

We start with a high-level overview of the proposed method, which is guided by FIG. 8. Input to the proposed method is decoded block motion from a standard HEVC codec in low-delay mode (IPPP structure), as well as the reconstructed frame texture data. More precisely, for each P-frame $f_k$, a block motion field $B_{k \to k-1}$ is decoded that contains motion vectors pointing to frame $f_{k-1}$. $B_{k \to k-1}$ is "opportunistic" in the sense that the encoder does not aim to find the "true" motion between the frames $f_k$ and $f_{k-1}$, but rather a motion vector that minimizes the number of bits to code the prediction error (see below) of the texture information at frame $f_k$. The decoded $B_{k \to k-1}$ exhibits a number of problems that make it ill-suited for video enhancement and analysis tasks (see FIG. 8). Firstly, it contains artificial discontinuities at block boundaries. In addition, blocks are unable to accurately describe object boundaries, which results in visibly disturbing artefacts if such motion is used for computer vision tasks. Lastly, the encoder can decide to disable temporal prediction for any block, and only use spatial prediction (i.e., Intra pre-diction), which leaves "holes" in the motion field; the Intra mode is selected often in regions around moving objects.

In this work, we propose a motion post-processing method to alleviate the above-mentioned issues. We get rid of artificial block boundaries and fill in blocks without motion information (i.e., Intra blocks) by smoothly interpolating between the motion vectors—anchored at the block center—of each block. In order to allow for discontinuous motion at object boundaries, we incorporate edge information in the form of an edge probability map [15] into the motion interpolation strategy; this successful strategy is used in a number of top-performing optical flow estimation algorithms [15]. In this paper, we focus on motion estimated for P-frames, and leave the interesting extension to incorporate B-frames for future work.

Motion-Compensated Prediction in Video Codecs

There is no explicit attempt in standardised video codecs to estimate the "physical" motion of the scene. Instead, the motion is chosen in an R-D optimal way. That is, the objective is to get the minimum distortion subject to an upper bound on the overall bit-rate; or, equivalently, to get the minimum bit-rate subject to an upper bound on overall distortion. Both objectives are equivalent to minimizing the unconstrained Lagrangian cost function $J=D+\lambda R$, where D is the overall distortion (typically measured as mean squared error), R is the overall bit-rate, and $\lambda>0$ determines the constraint for which the solution is optimal.

Finding the global minimum of J is infeasible, primarily because the rate term depends on choices made in neighbouring spatial and temporal blocks. Instead, existing video coders find the solution on a per-block basis. That is, for each block $K_l$, the block prediction mode $I_l$ (see end of this section) is found by minimizing the Lagrangian cost function [16]

$$J(K_l,I_l)=D_{rec}(K_l,I_l,u)+\lambda R(K_l,I_l,u). \quad (1)$$

A widely accepted strategy to find a solution for (1) is to first find the motion vectors for each block, and to consider the optimization of transform and coding modes as a second step. The motion is found using $$u_l = \underset{u \in U}{\mathrm{argmin}} E(K_l, u) + \lambda_{mv}\mathcal{R}_{mv}(K_l, u), \quad (2)$$

where $E(K_l, u)$ is the block distortion measure, computed as the sum of squared differences between the target block and the motion-compensated prediction of that block. Furthermore, U is the set of all possible partitions of the block $K_l$ that are allowed by the standard. For motion-compensated prediction, HEVC considers a large variety of block partitions, starting from 64 64, going all the way down to 8 4 pixels [8].

We now briefly present the two most commonly used prediction modes, which allows us to get some more in-sight into the opportunistic nature of the motion estimation performed in video codecs. These modes are intrapicture and interpicture prediction, commonly referred to as Intra and Inter, respectively. Intra prediction is performed exploiting only spatial redundancies. That is, $K_1$ is predicted from already decoded blocks of the same frame, and the distortion $D_{rec}(K_l,\text{Intra})$ is the squared prediction residual; $R(K_l,\text{Intra})$ is the rate obtained after entropy coding of the texture residual. In Inter prediction for P-frames (i.e., unidirectional prediction), an already decoded frame $f_a$ is used as prediction reference for motion-compensated prediction of the target frame $f_b$. For each block $K_l$, the distortion is $$D_{rec}(K_l,\text{Inter},u_l) \Sigma_{m \in K_l}(f_a[m+u_l]-f_b[m]^2), \quad (3)$$

and $R(K_l,\text{Inter},u_l)$ is the sum of the rates for the motion vectors, transform coefficients, and mode information. As a consequence, for any block $K_l$ where $J(K_l,\text{Intra})<(K_l,\text{Inter})$ in (1), no motion information will be communicated, leaving "holes" in the block motion field. The Intra mode is particularly useful in regions that are not visible in the reference frame(s); as illustrated in FIG. 9a, the Intra mode is often chosen around moving objects. To further illustrate the opportunistic nature of the motion, FIG. 9b, we show a motion field estimated where the Intra mode has been disabled, and hence only Inter prediction is used. One can see how there is "random" motion selected around moving objects, which is both expensive to code, as well as highly "non-physical".

Edge-Preserving Affine Interpolation Of Block Motion Vectors

The decoded block motion from HEVC provides a set of N motion vectors. In HEVC, the same motion vector is used for the whole block. In this work, we propose to use these N motion vectors as "seeds" to drive an edge-preserving affine interpolation; we refer to the resulting method as HEVC-EPIC. For each motion vector $u_{i \to j}^n$, $n \in \{1, N\}$, we construct correspondence pairs $x_i^n$, $x_j^n$ as follows; here, $x_i^n$ is the location of nth motion vector $u_{i \to j}^n$ in frame $f_i$. Then, its corresponding location in frame $f_1$ is simply $$x_j^n = x_i^n + u_{i \to j}^n. \quad (4)$$

We now describe how this sparse set of motion vectors can be interpolated to obtain a dense motion field. That is, for any integer pixel location m of a given frame $f_i$, we want to find a motion vector that maps the point to a corresponding location in frame $f_j$. We use an affine model to interpolate motion vectors, as it offers a good trade-off between complexity and ability to describe typical motion (e.g., translation, rotation, zoom, shear). That is, each location m of the motion field $\hat{M}_{i \to j}$ is interpolated using a weighted affine estimator, $$\hat{M}_{i \to j}[m] = A_m m + t_m, \quad (5)$$

to the distance measure $D(.,.)$—the point $x_i^s$ is to the location m we seek to interpolate, the more weight is put on fitting the affine model to match the correspondence pair ($x_i^s$, $x_j^s$).

We now provide more details into the choice of distance measure. FIG. 10*a* shows a crop of a decoded HEVC motion field, and FIG. 10*b* shows the corresponding affine interpolation, where each location m was interpolated according to (6), with Euclidean distance as distance measure $D(.,.)$. One can see how the motion is interpolated across object boundaries, which leads to wrong motion assignments around moving objects. In this work, we use the edge-aware geodesic distance measure proposed by Revaud et al. [14]. The idea is to find the cheapest path between two points, where the "cost" is measured by an edge probability map [15], computed on the texture of the frame. FIG. 10*c* shows an example edge probability map. In FIG. 10*d*, we show the dense motion field obtained by applying (6) with the edge-aware geodesic distance measure, where the motion boundaries are preserved.

TABLE 1

Average EPE values (lower is better) of the motion fields for different QP values. We compare the proposed HEVC-EPIC (HE) with the original EPIC flow [4], as well as HEVC-EPIC where we disabled the Intra prediction (HE-NoIntra).

| Sequence | QP = 17 | | | QP = 29 | | | QP = 40 | | |
| --- | --- | --- | --- | --- | --- | --- | --- | --- | --- |
| | HE-NoInfra | EPIC | HE | HE-NoInfra | EPIC | HE | HE-NoInfra | EPIC | HE |
| alley 1 | 0.21 (+0.00) | 0.23 (+0.02) | 0.21 | 0.40 (+0.05) | 0.33 (−0.02) | 0.35 | 0.72 (+0.00) | 0.66 (−0.06) | 0.72 |
| alley 2 | 0.23 (+0.02) | 0.21 (+0.00) | 0.21 | 0.40 (+0.06) | 0.33 (−0.01) | 0.34 | 0.84 (+0.04) | 0.78 (−0.02) | 0.80 |
| bamboo 1 | 0.26 (+0.00) | 0.26 (+0.00) | 0.26 | 0.32 (+0.01) | 0.31 (+0.00) | 0.31 | 0.51 (+0.01) | 0.49 (−0.01) | 0.50 |
| bamboo 2 | 0.32 (+0.03) | 0.30 (+0.01) | 0.29 | 0.38 (+0.05) | 0.33 (+0.00) | 0.33 | 0.47 (+0.02) | 0.43 (−0.02) | 0.45 |
| bandage 1 | 0.76 (+0.06) | 0.60 (−0.10) | 0.70 | 1.05 (+0.02) | 0.96 (−0.08) | 1.03 | 1.67 (−0.08) | 1.71 (−0.04) | 1.75 |
| bandage 2 | 0.42 (+0.14) | 0.26 (−0.03) | 0.28 | 0.65 (+0.21) | 0.37 (−0.07) | 0.44 | 1.15 (+0.27) | 0.80 (−0.08) | 0.88 |
| cave 4 | 4.76 (+0.45) | 3.69 (−0.62) | 4.31 | 5.62 (+0.20) | 4.31 (−1.11) | 5.42 | 8.46 (−0.08) | 7.17 (−1.37) | 8.54 |
| market 2 | 1.31 (+0.21) | 1.00 (−0.10) | 1.10 | 1.58 (+0.16) | 1.13 (−0.29) | 1.42 | 2.14 (+0.06) | 1.43 (−0.65) | 2.08 |
| shaman 2 | 0.16 (+0.00) | 0.15 (+0.00) | 0.15 | 0.29 (−0.01) | 0.30 (+0.00) | 0.30 | 0.69 (−0.01) | 0.61 (+0.01) | 0.60 |
| shaman 3 | 0.25 (+0.03) | 0.25 (+0.03) | 0.22 | 0.39 (+0.03) | 0.44 (+0.08) | 0.36 | 1.25 (−0.05) | 1.31 (+0.01) | 1.30 |
| Average EPE | 0.87 (+0.09) | 0.69 (−0.08) | 0.77 | 1.11 (+0.08) | 0.88 (−0.15) | 1.03 | 1.78 (+0.02) | 1.64 (−0.22) | 1.76 |

Where $A_m$ (2×2 matrix) and $t_m$ (2×1 vector) are parameters of the affine transform at pixel location m. In order to find these parameters, we need at least the three points $x_i^s$ in frame $f_i$ that are closest to m, and their corresponding locations $x_j^s$ in frame $f_j$. To add robustness to outliers, we use S>3 correspondences (we empirically set S=25), and compute the least-squares solution of the overdetermined system $$A_m, t_m = \underset{(A,t)}{\operatorname{argmin}} \sum_{s=1}^{S} e^{-D(x_i^s, m)} (A x_i^s + t - x_j^s), \quad (6)$$

where D(a, b) measures the distance between the points a and b. The implication of (6) is that the "closer"—according Experimental Results The experimental evaluation consists of two parts. First, we assess the accuracy of the estimated motion fields the pro-posed HEVC-EPIC produces. Motivated by the results, we then investigate the suitability of the motion fields obtained from decoded HEVC block motion for the application of TFI. In both experiments, we used the HEVC reference soft-ware HM 16.12 with the low-delay (P-frames) coding settings (IPPP . . . ), and a QP offset of 2 for P-frames.

Motion Field Quality

In this section, we evaluate the quality of the motion fields we obtain using HEVC-EPIC, and compare it to the recently proposed EPIC-flow scheme [4]; in addition, we also report results for HEVC-EPIC with disabled Intra prediction. We selected 11 consecutive frames from a number of sequences from the Sintel dataset [17]. This dataset contains highly challenging sequences where the 1-hop ground truth motion field is known, which allows us to evaluate the quality of the estimated motion fields. FIG. 11 shows decoded HEVC motion (the input to our method), the motion fields estimated by the proposed HEVC-EPIC, as well as the ground truth motion field. In FIG. 12, we provide further qualitative results, and compare HEVC-EPIC to the high quality results of EPIC flow. Table 1 reports the average endpoint-error (EPE) for different QP values. Using $\hat{u}=(\hat{u}, \hat{v})$ and $u=(u, v)$ to denote the estimated and the ground truth motion vector, respectively, the EPE for a motion vector $\hat{u}[m]$ at location m is computed as $$EPE[m]=\sqrt{(\hat{u}[m]-u[m])^2+(\hat{v}[m]-v[m])^2}. \quad (7)$$

The first thing to note is that quantization affects all three methods in a similar way. In general, the average EPE is in-creasing as the quantization step size increases, which can be explained by the fact that the decoded texture information contains more artefacts. This can mislead the edge detector which is used to guide the edge-preserving sparse-to-dense motion vector interpolation in all three methods.

TABLE 2

Average timings for EPIC flow [4], as well as the proposed HEVC-EPIC. The difference in timings is the time EPIC spends on finding the sparse set of correspondences.

| Resolution | EPIC | HEVC-EPIC | Speedup |
|---|---|---|---|
| 1024 × 416 | 8.2 s | 1.6 s | 5:1× |
| 1280 × 720 | 16.6 s | 3.2 s | 5:2× |
| 1920 × 1080 | 39.6 s | 7.5 s | 5:3× |

Furthermore, the block size used in HEVC in general increases, meaning that there are fewer decoded motion vectors.

In Table 2, we report average processing times for different resolutions. One can see how HEVC-EPIC is significantly faster than EPIC flow, as it "skips" the expensive feature matching stage by recycling the decoded motion vectors. On average, HEVC-EPIC is around five times as fast as the original EPIC.

Application: Temporal Frame Interpolation (TFI)

In this section, we turn our attention to a common application that benefits from high quality motion, namely temporal frame interpolation (TFI). We use the so-called "BAM-TFI" scheme reported in [1], because it is specifically designed to use piecewise-smooth motion fields with discontinuities at moving object boundaries. [1] reports excellent performance for this scheme, in comparison to other state-of-the-art TFI methods.

Experimental Setup We selected 21 frames from a number of challenging sequences from the Sintel (1024×416) [17] dataset, as well as commonly used 720 p and 1080 p natural test sequences containing a variety of motion activities (e.g., translation, rotation, zoom, . . . ). For each sequence, we dropped every second (odd) frame, and then used motion fields estimated using EPIC flow and the proposed HEVC-EPIC as [1] to interpolate the odd frames, resulting in a total of 10 interpolated frames per sequence.

Quantitative Results We quantitatively evaluate how well BAM-TFI works with motion fields estimated using HEVC-EPIC, and compare it to the original EPIC flow.

Table 3 gives per-sequence results for six natural test sequences, as well as the average performance on the 10 Sintel sequences listed in Table 1. On average, HEVC-EPIC performs slightly worse than EPIC flow (0.2 dB), with closest performance to EPIC at the medium (QP=29) bitrate.

Qualitative Results We further provide qualitative results of the TFI performance, which perhaps is more significant than quantitative results. In FIG. 12, we show results for three sequences, decoded at different QP values. The first row of the figure shows the decoded block motion field, overlaid with the edge information that was estimated on the decoded texture using SED [6]. The second row shows crops of the de-coded block motion field, the motion field estimated using EPIC flow, as well as the proposed HEVC-EPIC. One can see

TABLE 3

Y-PSNR comparison of TFI performance for different QP values. We compare the proposed HEVC-EPIC (HE) with the original EPIC optical flow estimator [4].

| | QP = 17 | | QP = 29 | | QP = 40 | |
|---|---|---|---|---|---|---|
| Sequence | EPIC | HE | EPIC | HE | EPIC | HE |
| Mobcal | 33.03 | 33.01 | 32.51 | 32.40 | 29.93 | 29.04 |
| Stockholm | 32.97 | 33.44 | 32.85 | 32.72 | 29.67 | 29.58 |
| Cactus | 31.20 | 30.61 | 30.69 | 30.41 | 28.43 | 28.19 |
| ParkScene | 35.94 | 35.35 | 33.80 | 33.72 | 29.27 | 29.22 |
| Kimono1 | 31.57 | 30.98 | 31.15 | 31.30 | 29.34 | 29.51 |
| BQTerrace | 31.85 | 32.07 | 32.37 | 32.74 | 30.53 | 30.44 |
| Average Natural | 32.76 | 32.58 | 32.23 | 32.22 | 29.53 | 29.33 |
| Average Sintel† | 30.13 | 29.91 | 29.41 | 29.21 | 27.18 | 26.90 |

†Average of all sequences presented in Table 1 (100 frames per QP value).

that the obtained motion fields from HEVC-EPIC are very similar to the ones estimated using a state-of-the-art optical flow estimator. The last row of the figure shows crops of the target frame; for each sequence, we show from left to right the uncompressed reference frame, followed by the interpolated frames, where we used motion estimated from EPIC flow and using motion from the proposed HEVC-EPIC, respectively, as input motion to BAM-TFI [1]. As can be seen, BAM-TFI with HEVC-EPIC motion produces very similar results to BAM-TFI with EPIC flow as input, which serves as evidence of the suitability of the motion produced by HEVC-EPIC for video enhancement tasks.

Conclusions and Future Work

In this paper, we propose HEVC-EPIC, a method to obtain high quality motion from decoded HEVC motion. We use the decoded "block" motion vectors as "seeds" for a locally affine, edge-preserving sparse-to-dense interpolation procedure. Extensive tests at different QP values on a number of challenging sequences show that the resulting method is able to produce motion fields that are close—in terms of average endpoint error—to what a state-of-the-art optical flow estimator produces. By "recycling" the motion vectors estimated at the encoder side, we can significantly reduce the motion estimation time at the decoder. The obtained motion information can be beneficial for a variety of video enhancement and analysis tasks. In this work, we focus on the application of framerate upsampling. Experiments on a large number of challenging synthetic and natural sequences show that the interpolation performance is very close to the one using motion estimated using a state-of-the-art optical flow estimator. In this work, we focused on motion estimated using the low-delay profile of HEVC, which uses P-frames for all but the key frames. The next step will be to apply the same frame-work to a hierarchical B-frame structure, which is commonly used in video compression.

Leveraging Decoded HEVC Motion for Fast, High Quality Optical Flow Estimation We propose a method of "improving" the quality of decoded HEVC motion fields attached to B-frames, in order to make them more suitable for video analysis and enhancement tasks. We use decoded HEVC motion vectors as a sparse set of motion "seeds", which guide an edge-preserving affine interpolation of coded motion (HEVC-EPIC) in order to obtain a much more physical representation of the scene motion. We further propose HEVC-EPIC-BI, which adds a bidirectional motion completion step that leverages the fact that regions which are occluded in one direction are usually visible in the other. The use of decoded motion allows us to avoid the time-consuming estimation of "seeds". Experiments on a large variety of synthetic sequences show that compared to a state-of-the-art "seed-based" optical flow estimator, the computational complexity can be reduced by 80%, while incurring no increase at in average EPE at higher bit-rates, and a slight increase of 0.09 at low bit-rates.

Introduction

All existing standardized video codecs, including the latest standardized video codec HEVC [8], exploit temporal redundancies between frames by partitioning so-called "target" frames into a set of disjoint blocks, each of which (potentially) gets one or multiple motion vectors assigned in order to drive a motion-compensated prediction (MCP) from already decoded reference frames. More precisely, for each block, weighted combinations of both the forward and backward block motion are used to form a prediction of the target frame block. This results in opportunistic block motion fields, which do not necessarily reflect "physical" scene motion between the frames. In particular, artificial motion discontinuities are introduced at block boundaries. Furthermore, blocks are unable to represent motion in the vicinity of moving object boundaries. Lastly, the opportunistic motion estimation employed in HEVC may result in no motion at all being communicated for some blocks, where spatial prediction is used instead.

For a variety of video analysis and enhancement tasks, a more physical representation of the underlying scene motion can be highly beneficial. For example, in the case of temporal frame interpolation (TFI), we have shown how such physical motion can be used to improve the quality of the interpolated frames compared to block-based TFI schemes [2]; furthermore, it opens the door to a meaningful incorporation of higher-order motion models [10], which can further improve the prediction quality.

In computer vision, considerable progress has been made in the estimation of "optical flow" (OF) fields, both in in-creasing the quality of optical flow estimation [18], [5], [6], as well as reducing the computational complexity [19], [4], [20]. Nonetheless, high-quality OF methods are still quite far away from running in real-time on high-resolution content. A number of top-performing optical flow algorithms (e.g., [5], [4]), which we call "seed-based" OF, first estimate a sparse set of correspondences between the two frames where motion is to be estimated; these motion "seeds" are then interpolated using an edge-preserving interpolation strategy, called "EPIC" [14]. In the original EPIC method, the correspondences are found using deep matching [21], which accounts for the majority of the overall motion estimation time. In order to avoid the time-consuming estimation of correspondences, we proposed in [7] to use decoded motion vectors as "seeds" for the edge-preserving interpolation strategy (EPIC) [4]; we call the resulting method HEVC-EPIC (HE). These initial explorations were limited to unidirectionally predicted P-frames.

Motivated by these initial results, this paper continues our explorations of improving decoded HEVC motion for the widely used bidirectionally predicted frames. In particular, We extend HEVC-EPIC to work with bidirectionally predicted B-frames;

We propose HEVC-EPIC-BI (see below), which leverages bidirectional motion information to improve the quality of both the forward and backward motion fields.

To give some indication of the applicability of HE-BI motion for video enhancement tasks, we use HE-BI motion as input to a state-of-the-art temporal frame interpolation method [1], which was developed for the use of high quality motion fields. The quality of the interpolated frames using the proposed HE-BI motion is on par with what EPIC flow [4] is able to produce, while running over five times as fast.

Edge-Preserving Affine Interpolation of Block Motion Vectors

We start with a brief overview of the general idea behind the proposed HEVC-EPIC scheme, which aims at improving the motion field quality of decoded block motion fields; this overview is guided by FIG. 1. Following the assumption that motion boundaries are a subset of object boundaries in an image, we use the structured edge detector proposed in [15] to estimate an edge probability map of the target frame. We consider the decoded motion vectors, anchored at the center of each block, as "seeds" for an edge-preserving affine interpolation method called EPIC [4]; the resulting dense motion field is devoid of artificial block boundaries, and contains sharp motion transitions around moving objects, which is a much more "physical" representation of the underlying scene motion than the decoded block motion.

In our initial proposal of HEVC-EPIC [7], we considered motion coded for unidirectionally predicted P-frames. For such frames, each block is either temporally predicted, which is called "Inter" prediction, or predicted using only spatial information of the target frame (so-called "Intra" prediction). In this work, we generalize [7] to bidirectionally predicted B-frames. For ease of explanation, we focus on an IBPB structure, where each B-frame $f_k$ is predicted from its immediate temporal neighbours $f_{k-1}$ and $f_{k+1}$; extensions to more general B-frame structures (e.g., hierarchical B-Frames [22]) can readily be obtained. In such a B-frame structure, each "Inter" predicted block is either bidirectionally predicted, or predicted only from either the previous ($f_{k-1}$) or future ($f_{k+1}$) reference frame.

Before we show how motion information from both motion fields can be leveraged in order to improve the quality of the proposed method in Sect. III, we find give an overview of HEVC-EPIC method.

A. HEVC-EPIC (HE)

We now provide a description of how the decoded block motion vectors can be interpolated in order to obtain a dense motion field, which preserves motion discontinuities. We use $B_{k \to j}$ to denote a decoded block motion field, which for each "Inter" block in the "target" frame $f_k$ has a motion vector pointing to "reference" frames $f_j$, where we use $j=k-1$ or $j=k+1$ to refer to the previous or future reference frame, respectively. For the following discussion, let us use $N_j$ to denote the number of motion vectors that are present in $B_{k \to j}$. As mentioned earlier, we propose to use these $N_j$ motion vectors as "seeds" to drive an edge-preserving affine motion interpolation. For each motion vector $u_{k \to j}^n$, $n \in \{1, N_j\}$, we construct pixel correspondences $(x_k^n, x_j^n)$ as follows; here, $x_k^n$ is the location of nth motion vector $u_{k \to j}^n$ in frame $f_k$. Its corresponding location in frame $f_j$ is $$x_j^n = x_k^n + u_{k \to j}^n. \quad (1)$$

In order to obtain a dense motion field from this sparse set of motion vectors, each location m of the motion field $\hat{M}_{k \to j}$ is interpolated using a locally-weighted affine estimator, $$\hat{M}_{k \to j}[m] = A_m m + t_m, \quad (2)$$

where $A_m$ (2×2 matrix accounting for rotation, zoom, shear) and $t_m$ (2×1 vector accounting for translation) are parameters of the affine transform at pixel location m. Note that at least three points $x_i^s$ in frame $f_i$ that are closest to m, and their corresponding locations $x_j^s$ in frame $f_j$, are required. In order to increase the robustness to outliers, however, S>3 correspondences can be used; in this work, we empirically set S=100, and note that the method is not overly sensitive to the choice of S. Next, we compute the least-squares solution of the following overdetermined system $$A_m, t_m = \underset{(A,t)}{\operatorname{argmin}} \sum_{S=1}^{S} e^{-D(x_k^S, m)} (A x_k^s + t - x_j^s), \quad (3)$$

where D(a; b) is a distance measure between the points a and b. Note how the affine model puts more importance on fitting points $x_k^s$ that are "closer" to the location m of the point we seek to interpolate Next, we show the impact of the edge-aware distance measure. FIG. 13b shows a crop of a decoded HEVC block motion field, and FIG. 13c shows the corresponding affine interpolation; that is, each location m was interpolated according to (3), with Euclidean distance as distance measure D(. ; .). The resulting dense motion field is overly smooth; in particular, around motion discontinuities, foreground and background motion is averaged together, leading to non-physical motion. We use the edge-aware distance measure proposed by Revaud et al. [4], which imposes a large weight for paths that cross edges in the image. More precisely, the "cost" is measured by an edge probability map, estimated on the texture of the frame using a structured edge detector (SED) [15]. FIG. 13d shows the dense motion field obtained by applying (3) with the edge-aware distance measure, where we overlaid the edge probability map (black); one can see how the motion boundaries are much better preserved, resulting in a more "physical" representation of the underlying scene flow. In the following, we present a simple method of leveraging the bidirectional information to improve the input for HEVC-EPIC, which is particularly useful in occluded regions.

Bidirectional Motion Completion (HE-BI)

In occluded regions, which arise on the leading side of moving objects, no reliable motion can be estimated, as there will not be a correspondence in the corresponding reference frame. However, it is quite likely that such regions are visible in the other reference frame. In such regions, HEVC will presumably switch to unidirectional prediction. In FIG. 14a/b, all the blue regions correspond to regions where no forward motion is available; note how most of the blue blocks are around object boundaries, which are not visible in the future reference frame, and hence should not be predicted from that frame.

However, since we want to create a motion field as close to the ground truth as possible, we are interested in getting motion information in occluded regions as well. We therefore assign each block where no motion is available for $B_{k \to j}$ the negative of the motion in $B_{k \to p}$. That is, $$B_{k \to k+1}^{BI}[n] | B_{k \to k+1}[n] = \emptyset = -B_{k \to k-1}[n], \text{ and}$$

$$B_{k \to k-1}^{BI}[n] | B_{k \to k-1}[n] = \emptyset = -B_{k \to k+1}[n]. \quad (4)$$

This can be seen as assuming a constant motion velocity in occluded regions. We refer to HEVC-EPIC that uses these "augmented" block motion vectors as HEVC-EPIC-BI (HEBI). FIG. 14c/d shows an example of such a bidirectionally completed motion field. The impact on motion field quality when input to HEVC-EPIC can be appreciated in FIG. 14e/f, where around the dragon's head (cropped rectangle), foreground motion is "spilled" into the (occluded) background region in the original HE. In HE-BI, where the motion in the occluded region has been completed according to (4), this region is correctly interpolated, as evidenced in FIG. 14g/h.

Experimental Validation

In this section, we evaluate the quality of the proposed HEVC-EPIC-BI (HE-BI) in an IBPB structure, with a QP offset of 2 for B-frames. We first provide a thorough experimental validation of the quality of the motion fields produced by HE-BI. Motivated by these results, we show below the applicability of HE-BI motion for temporal frame interpolation.

TABLE 4

AVERAGE EPE OF FORWARD MOTION FIELDS (A-EPE($R^{ALL}$)). WE COMPARE HE-BI (SEE SECT. III) TO ORIGINAL HEVC BLOCK MOTION, AS WELL AS WITH THE ORIGINAL EPIC FLOW [8]. WE ALSO SHOW OVERALL AVERAGES IN VISIBLE (A-EPE($R^{VIS}$)) AND IN ALL REGIONS WHERE $B_{k \to K+1}$ CONTAINS MOTION (A-EPE($R^{FWD}$)); HEVC RESULTS ARE GREY FOR UNFAIR COMPARISONS.

| | QP = 22 | | | QP = 27 | | | QP = 37 | | |
|---|---|---|---|---|---|---|---|---|---|
| Sequence | HEVC | EPIC | HE-BI | HEVC | EPIC | HE-BI | HEVC | EPIC | HE-BI |
| alley_1 | 0.49 (+0.28) | 0.23 (+0.02) | 0.21 | 0.51 (+0.26) | 0.26 (+0.01) | 0.25 | 0.78 (+0.29) | 0.45 (−0.04) | 0.49 |
| alley_2 | 0.42 (+0.20) | 0.22 (+0.00) | 0.22 | 0.48 (+0.23) | 0.26 (+0.01) | 0.25 | 0.73 (+0.32) | 0.40 (−0.01) | 0.41 |
| bamboo 1 | 0.43 (+0.17) | 0.27 (+0.01) | 0.26 | 0.45 (+0.17) | 0.28 (+0.00) | 0.28 | 0.56 (+0.21) | 0.35 (+0.00) | 0.35 |
| bamboo 2 | 0.48 (+0.18) | 0.37 (+0.07) | 0.30 | 0.45 (+0.11) | 0.38 (+0.04) | 0.34 | 0.50 (+0.13) | 0.41 (+0.04) | 0.37 |

TABLE 4-continued

AVERAGE EPE OF FORWARD MOTION FIELDS (A-EPE($R^{ALL}$)). WE COMPARE HE-BI (SEE SECT. III) TO ORIGINAL HEVC BLOCK MOTION, AS WELL AS WITH THE ORIGINAL EPIC FLOW [8]. WE ALSO SHOW OVERALL AVERAGES IN VISIBLE (A-EPE($R^{VIS}$)) AND IN ALL REGIONS WHERE $B_{k \to k+1}$ CONTAINS MOTION (A-EPE($R^{FWD}$)); HEVC RESULTS ARE GREY FOR UNFAIR COMPARISONS.

| | QP = 22 | | | QP = 27 | | | QP = 37 | | |
|---|---|---|---|---|---|---|---|---|---|
| Sequence | HEVC | EPIC | HE-BI | HEVC | EPIC | HE-BI | HEVC | EPIC | HE-BI |
| bandage_1 | 1.16 (+0.45) | 0.66 (−0.05) | 0.71 | 1.30 (+0.41) | 0.80 (−0.09) | 0.89 | 1.82 (+0.44) | 1.27 (−0.11) | 1.38 |
| bandage_2 | 0.65 (+0.33) | 0.26 (−0.06) | 0.32 | 0.71 (+0.39) | 0.31 (−0.01) | 0.32 | 0.98 (+0.37) | 0.56 (−0.05) | 0.61 |
| shaman_2 | 0.35 (+0.16) | 0.19 (+0.00) | 0.19 | 0.40 (+0.15) | 0.24 (−0.01) | 0.25 | 0.64 (+0.21) | 0.45 (+0.02) | 0.43 |
| shaman_3 | 0.42 (+0.23) | 0.20 (+0.01) | 0.19 | 0.51 (+0.29) | 0.22 (+0.00) | 0.22 | 0.90 (+0.37) | 0.50 (−0.03) | 0.53 |
| temple_2 | 1.09 (+0.36) | 0.72 (−0.01) | 0.73 | 1.23 (+0.39) | 0.80 (−0.04) | 0.84 | 1.87 (+0.44) | 1.14 (−0.29) | 1.43 |
| market_2 | 1.43 (+0.49) | 0.98 (+0.04) | 0.94 | 1.40 (+0.35) | 1.01 (−0.04) | 1.05 | 1.58 (−0.08) | 1.24 (−0.42) | 1.66 |
| A-EPE($R^{ALL}$) | 0.83 (+0.26) | 0.41 (+0.00) | 0.41 | 0.74 (+0.27) | 0.46 (−0.01) | 0.47 | 1.04 (+0.27) | 0.68 (−0.09) | 0.77 |
| A-EPE($R^{VIS}$) | 0.58 (+0.28) | 0.30 (−0.02) | 0.32 | 0.63 (+0.29) | 0.34 (−0.03) | 0.37 | 0.90 (+0.25) | 0.56 (−0.09) | 0.65 |
| A-EPE($R^{FWD}$) | 0.48 (+0.21) | 0.27 (+0.00) | 0.27 | 0.56 (+0.22) | 0.32 (−0.02) | 0.34 | 0.92 (+0.26) | 0.57 (−0.09) | 0.66 |

A. Motion Field Quality

Since the motion field is not known for natural sequences, we use the popular Sintel dataset [17], which consists of a number of highly challenging computer-generated sequences, for which 1-hop forward ground truth motion is known. Therefore, while the proposed scheme estimates both forward and backward motion fields $M_{k \to k+1}$ and $M_{k \to k-1}$, respectively, which are useful for interpolating extra frames and other tasks, we only measure the quality of the forward motion fields $M_{k \to k+1}$. More precisely, we code the first 21 frames of a number of sequences from the Sintel dataset using HEVC in an IBPB structure, and report results in terms of end-point-error (EPE) of HE-BI on the resulting 10 forward motion fields. The EPE at location m is computed as $$EPE[m] = \sqrt{(\hat{M}_u[x] - M_u[x])^2 + (\hat{M}_v[x] - M_v[x])^2} \quad (5)$$

where $\hat{M} = (\hat{M}_u, \hat{M}_v)$ and $M = (M_u, M_v)$ denote the estimated and the ground truth motion fields, respectively. We compute an average EPE in region $R^{type}$, as $$A - EPE(R^{type}) = \frac{\sum m R^{type}[m] \cdot EPE[m]}{\sum m R^{type}[m]} \quad (6)$$

We define three types of regions; the first one is non-zero only at locations m where HEVC blocks have a forward motion vector, i.e., $R^{FWD}[m]=1$ iff $B_{k \to k+1}[m] \neq \emptyset$. The second region, $R^{VIS}$, is non-zero in all regions that are visible in both $f_k$ and $f_{k+1}$; we take this information from the occlusion masks provided by the Sintel dataset. The last region is the whole domain of the image, i.e., $R^{ALL}[m]=1$. We show per-sequence results for $R^{FWD}$, which is the fairest comparison with HEVC block motion. For $R^{VIS}$ and $R^{ALL}$, we show the overall A-EPE (i.e., 100 frames).

HE compared to HEVC and original EPIC flow: Table 4 reports the average end-point error (EPE) for three different QP values. Not surprisingly, the A-EPE of HE-BI is significantly lower than for HEVC block motion, especially at high to medium bitrates. Perhaps more surprisingly, the performance of HE-BI is very close to the original EPIC flow algorithm [4]. We reiterate the fact that EPIC employs much more sophisticated correspondences, which are the time-consuming part of this optical flow estimator; on the tested Sintel sequences (1024×416), HE-BI is over five times as fast as the original EPIC algorithm; more details on computational complexity can be found below. There is a slight drop in performance at lower bitrates, where we observe that the decoded motion blocks are generally quite large. This means that there are fewer seeds available for HE-BI, whereas there will be many more features used by the original EPIC flow algorithm. We plan to address this shortcoming in future work by investigating alternate ways of generating motion seeds from decoded HEVC motion.

HE versus HE-BI: In FIG. 15, we show the difference of the average EPE between HE and HE-BI (see above, and FIG. 14), averaged over all sequences reported in Table I. In the figure, larger negative values mean bigger improvement of HE-BI over HE.

Our two main observations are:
1) The improvement of HE-BI becomes more apparent at higher QP values, where there are fewer motion vectors available;
2) The biggest improvements can be seen when the EPE is computed over the whole image, i.e., $\Delta A$-EPE($R^{ALL}$) (green curve).

The second point is because occluded regions are where the bidirectional completion is most helpful, and these regions are implicitly or explicitly excluded in $\Delta A$-EPE ($R^{FWD}$) (blue curve) and $\Delta A$-EPE($R^{VIS}$) (red curve), respectively.

B. Computational Complexity

In Table 5, we report the average timings for the motion estimation of the proposed HE-BI, and compare it to EPIC flow [4]; we report timings at three different resolutions. One can see that EPIC flow spends most of the time finding correspondences using deepmatching (DM) [21]. As mentioned earlier, the appeal of HEVC-EPIC(-BI) is that it avoids the time-consuming finding of correspondences by "recycling" decoded block motion. We note here that we limited the search radius of DM to 64 pixels (so as to match the one used by HEVC), which significantly reduces the computational complexity of DM. Even so, as can be seen in the table, the proposed HE-BI runs over five times as fast as EPIC flow.

TABLE 5

AVERAGE TIMINGS FOR EPIC FLOW [4], AS WELL
AS THE PROPOSED HEVC-EPIC. WE SPLIT THE RESULTS
UP IN DEEPMATCHING (DM), EDGE DETECTION (SED),
AND EDGE-AWARE INTERPOLATION (INTERP.).

| Resolution | DM | SED | Interp. | EPIC flow | HE-BI |
|---|---|---|---|---|---|
| 1024 × 416 | 6.6 s | 0.25 s | 1.35 s | 8.2 s | 1.6 s |
| 1280 × 720 | 13.5 s | 0.35 s | 2.75 s | 16.6 s | 3.1 s |
| 1920 × 1080 | 32.1 s | 0.45 s | 7.05 s | 39.6 s | 7.5 s |

C. Application: Temporal Frame Interpolation (TFI)

In order to show the applicability of the proposed HE-BI motion for video enhancement, we use the motion as input for our recently proposed BAM-TFI scheme [1]. For this experiment, we drop every odd frame, and then encode

TABLE 6

TFI performance comparison (Y-PSNR) or BAM-TFI [2] with proposed
HE-BI motion and the original EPIC flow [8] as input.

| | | | QP-22 | | QP-27 | | QP-37 | |
|---|---|---|---|---|---|---|---|---|
| | Sequence | Frames | EPIC flow | HE-BI | EPIC flow | HE-BI | EPIC flow | HE-BI |
| 720 p | Shields | 390-410 | 34.18 (+0.00) | 34.18 | 33.62 (−0.02) | 33.64 | 30.54 (−0.01) | 30.54 |
| | Stockholm | 460-480 | 33.69 (−0.00) | 33.69 | 33.37 (−0.00) | 33.37 | 30.38 (−0.01) | 30.40 |
| | Parkrun | 130-150 | 29.41 (−0.00) | 29.41 | 29 01 (−0.00) | 29.01 | 26.20 (−0.00) | 26.20 |
| 1080 p | BQTerrace | 200-220 | 32.32 (−0.68) | 33.00 | 32.59 (−0.46) | 33.05 | 31.59 (+0.03) | 31.56 |
| | Cactus | 001-021 | 32.81 (+0.42) | 32.40 | 32.56 (+0.35) | 32.21 | 30.67 (+0.24) | 30.43 |
| | ParkScene | 136-156 | 35.49 (+0.28) | 35.20 | 34.58 (+0.21) | 34.37 | 31.35 (+0.17) | 31.18 |
| | Station 2 | 020-040 | 38.85 (+0.03) | 38 82 | 38.25 (+0.10) | 38.15 | 35.08 (+0.05) | 35.03 |
| | Average | — | 33.82 (+0.00) | 33.82 | 33.43 (+0.03) | 33.40 | 30.83 (+0.07) | 30.76 | the resulting subsampled sequence using HEVC in an IBPB structure. The resulting 2-hop block motion is then input to HE-BI, and the output dense motion is used as input motion field to our recently proposed BAM-TFI scheme [1]. Table 6 shows the average Y-PSNR for seven standard test sequences (20 interpolated frames each). We observe that at high bit-rates, HE-BI motion performs on par with EPIC motion, whereas at lower bitrates, the Y-PSNR difference slightly increases in favour of EPIC flow; as we have seen in Sect. IV-A, the larger block sizes typically observed at higher QP values result in a lack of seeds for HE-BI. One way of increasing the number of seeds would be to split large blocks up into smaller ones.

The Y-PSNR difference does not have a big impact on the visual quality of the interpolated frames, as evidenced by the qualitative results in FIG. 16. In some cases, as for example for BQTerrace (see FIG. 16c), deepmatching appears to be struggling with the repetitive patterns, which results in erroneous motion and hence visually disturbing artefacts in the interpolated frames. Note how the frame obtained using HE-BI is devoid of these errors.

Conclusions and Future Work

This work continues our exploration of obtaining more meaningful motion from decoded HEVC block motion. We consider the case of bidirectional motion attached to B-frames in an IBPB structure. Observing that motion boundaries form a subset of object boundaries, we estimate structured edge information on the decoded target frame. Next, we use the decoded motion vectors as seeds to drive an edge-preserving affine motion interpolation to obtain a dense motion field that is much closer to "physical" motion. In occluded regions, we leverage motion information from the other flow direction in order to "complete" the motion field, which results in further improvement of the motion field quality. When used as input to a framerate upsampling scheme, the HE-BI motion produces results that are very close to what state-of-the-art optical flow motion produces, indicating the applicability of HE-BI motion for video enhancement tasks.

In its current implementation, each motion vector is considered as one seed. In future work, we will investigate various seed weighting strategies in order to further improve the results, in particular at lower bitrates.

HEVC-EPIC: Fast Optical Flow Estimation From Coded Video Via Edge-Preserving Interpolation This section presents a method leveraging coded motion information to obtain a fast, high quality motion field estimation. The method is inspired by a recent trend followed by a number of top-performing optical flow estimation schemes that first estimate a sparse set of features between two frames, and then use an edge-preserving interpolation scheme (EPIC) to obtain a piecewise-smooth motion field that respects moving object boundaries. In order to skip the time-consuming estimation of features, we propose to directly derive motion seeds from decoded HEVC block motion; we call the resulting scheme "HEVC-EPIC". We propose motion seed weighting strategies that account for the fact that some motion seeds are less reliable than others. Experiments on a large variety of challenging sequences and various bit-rates show that HEVC-EPIC runs significantly faster than EPIC flow, while producing motion fields that have a slightly lower average endpoint error (A-EPE). HEVC-EPIC opens the door of seamlessly integrating HEVC motion into video analysis and enhancement tasks. When employed as input to a framerate upsampling scheme, the average Y-PSNR of the interpolated frames using HEVC-EPIC motion slightly outperforms EPIC flow across the tested bit-rates, while running an order of magnitude faster.

Introduction

MOTION ESTIMATION is one of the fundamental problems of computer vision, and lies at the heart of modern video compression algorithms. In compression systems, motion is estimated in order to be able to exploit the temporal redundancy between frames, which plays an essential role in the reduction of the coding cost of video content. In computer vision, on the other hand, the aim is to estimate the "physical" flow between frames, which can then be used for a variety of video analysis and enhancement techniques.

In this paper, we propose a method that aims at building more meaningful motion from decoded "block" motion, and hence bridging two fields that traditionally are treated separately.

All existing standardized video codecs, including the latest standardized video codec HEVC [8], exploit temporal redundancies between frames by partitioning so-called "target" frames into a set of disjoint blocks, each of which (potentially) gets one or multiple motion vectors assigned in order to drive a motion-compensated prediction (MCP) from already decoded reference frames. More precisely, for each block, a weighted combination of both the forward and backward block motion is used to form a prediction of the target frame block. The resulting block motion fields do not necessarily reflect "physical" scene motion between the frames. In particular, artificial motion discontinuities are introduced at block boundaries. In addition, blocks are unable to represent motion in the vicinity of moving object boundaries. Finally, the "opportunistic" motion estimation employed in HEVC may result in the selection of motion vectors that have no physical meaning, or in no motion at all being communicated for some blocks, where spatial prediction is used instead.

For a variety of video analysis and enhancement tasks, a more physical representation of the underlying scene motion can be highly beneficial. For example, in the case of temporal frame interpolation (TFI), we have shown in [1] how such physical motion can be used to improve the quality of the interpolated frames compared to "block-based" TFI schemes [23], [2]. The TFI scheme presented in [1] uses reasoning about moving object boundaries to identify the foreground object at motion boundaries. However, optical flow (OF) estimation algorithms that preserve motion discontinuities are still quite far away from running in real-time, especially on high resolution video.

A recent trend followed by several top-performing optical flow algorithms (e.g., [4], [5]) is to first estimate a sparse set of motion "seeds", and then employ an edge-preserving interpolation strategy (EPIC) [4] to compute a dense optical flow. In such schemes, the estimation of the motion seeds is the time-consuming step. Inspired by these methods, we explored the suitability of coded motion vectors as seeds for EPIC [7], and coin the term HEVC-EPIC for a motion estimation scheme that derives its seeds from HEVC motion vectors (see FIG. 1). We emphasize that the appeal of HEVC-EPIC lies in skipping the time consuming process of estimating seeds, allowing order of magnitude increases in throughput when generating optical flow fields from coded data. Furthermore, it is worth pointing out that while we focus in this paper on video coded using HEVC, the ideas presented in this paper can be applied to any hybrid video compression scheme.

In our initial explorations of HEVC-EPIC on (unidirectionally predicted) P-frames [7], and its extension to B-frames (bidirectional prediction) in [9], one motion seed is assigned for each decoded block that contains motion information, irrespective of the prediction block (PB) size. A key observation in these earlier works is that compared to EPIC flow (i.e., EPIC with deep matches [24] as motion seeds), the performance decreased at lower bit-rates, where PBs tend to be larger. This can lead to relatively few motion seeds created at low bit-rates, where PB sizes tend to be large. In this work, we propose to sub-partition large blocks and create a motion seed for each sub-block; this at the same time increases the importance of larger blocks, and distributes the weight across the PB.

Furthermore, we explore explicit ways of weighting motion seeds. In addition to heuristic weighting schemes, we pro-pose an analytical model to establish a "motion-confidence based weighting" scheme. We show that by incorporating the "prediction quality" of motion seeds into the EPIC scheme, the resulting motion field quality of HEVC-EPIC is on par with EPIC flow at lower bit-rates, and even slightly better at medium to high bit-rates.

The present paper also provides a more comprehensive evaluation of the suitability of HEVC-EPIC motion for video enhancement methods, we use the estimated flow as input to a state-of-the-art framerate upsampling algorithm [2], and show that it is able to create high quality interpolated frames. Remarkably, the proposed HEVC-EPIC algorithm leads to slightly higher interpolated frame quality than EPIC flow, while offering an order of magnitude improvement in speed.

Related Work

A. Seed-Based (Sparse-to-Dense) Optical Flow Estimation

A popular way of increasing the maximum displacement that can be estimated in variational optical flow methods [25] is to use a coarse-to-fine approach [26], [27]; however, such methods get stuck in local minima and fail to estimate large displacements. Recently, feature matching techniques that are robust to large displacements and motion discontinuities have been integrated into the variational approach [24], [28]; the downside of these methods is that the errors induced by overlapping motion layers at coarser levels are propagated to finer scales. To avoid this problem, Revaud et al. [4] propose to perform sparse feature matching at the finest scale only, and then use an edge-preserving interpolation strategy (EPIC) to obtain a dense flow that is piecewise-smooth with discontinuous jumps around moving objects. Several works have since investigated the use of other feature-matching strategies to find "better" seeds for EPIC [5], [6]. In this paper, we investigate weighting strategies to use decoded HEVC block motion as seeds for EPIC, which has the advantage that we can skip the time-consuming estimation of seeds.

B. Framerate Upconversion in Video Codecs

As mentioned, one application for HEVC-EPIC is framerate upconversion (FRUC). Various ways of incorporating framerate upconversion (FRUC) into video codecs have been explored. Chen et al. [12] add spatial regularization to the motion estimation scheme on the encoder side, and then use the decoded motion to obtain temporally upsampled frames of higher quality. Li et al. [29] incorporate a FRUC mode into HEVC, where specific PBs are predicted using FRUC, and the prediction residual is then coded using HEVC. In contrast to our work, this method aims at improving the compression performance, whereas our work focusses on obtaining high quality motion fields that, amongst other applications, can be used on the decoding side to perform FRUC. In order to be compliant with existing video codecs, Wu et al. [13] use decoded block motion directly to interpolate frames, and propose an iterative refinement technique to conceal inevitable interpolation errors in the target frame. Rather than fixing up texture information, Yang and Yang [14] instead propose to improve the decoded motion field by considering causal neighbour blocks as additional motion candidates, and select the one that has the smallest prediction residual; the resulting (block) motion field is then used as input for a traditional TFI method.

C. Optical Flow (OF) in Video Compression

This paper is concerned exclusively with the post-processing of already coded video, in order to recover optical flow information for subsequent tasks. Nonetheless, there are some similarities between our approach and flow estimation schemes that have been proposed for use in the coding process itself. We take the opportunity to point out these connections here.

The conventional wisdom is that OF fields are expensive to compress, and hence not competitive with a finely tuned block-based motion model. However, several recent works show that by optimizing for both the residual energy and spatial smoothness in the motion estimation process, competitive results can be obtained ([30], [31]). In [31], the authors efficiently compress the piecewise smooth motion fields by coding them using a modified version of the 3D-HEVC software, which is able to efficiently code motion boundaries. In contrast, our method is applied at the decoder only, and we use decoded texture information to obtain an estimate of motion boundaries.

Rather than changing the motion estimation strategy of HEVC, Alshin and Alshina [32] propose to apply a bidirectional optical flow (BIO) as a post-processing step after standard block-matching. They observe that misalignments between the textures of the forward and backward motion-compensated frames exist, and propose to apply optical flow at a pixel level to align the texture within a ±1 radius. While shown advantageous in an RD-sense, the motion fields after the OF refinement can be expected to be quite noisy, as the optimization is performed individually per pixel; therefore, these motion fields may be less suitable for video enhancement and analysis tasks.

The method we propose is similar to BIO in that it also is applied as a post-processing step on block motion. However, rather than improving the motion-compensated prediction, our primary objective is to obtain "physical" motion that is suitable for video enhancement tasks. In other words, we want to obtain a high quality motion flow in both the forward and backward direction, as opposed to minimizing the bidirectional, weighted prediction residual. We leave the interesting investigation on the suitability of HEVC-EPIC for MCP for future work.

Motion Estimation Objectives in Video Compression and Optical Flow

Motion estimation plays a key role in both video compression and computer vision. In this section, we summarize the optimization objectives for both, and highlight similarities and differences between the two. In a video compression system, the objective is to get the minimum distortion in the motion-compensated frame(s) subject to an upper bound on the overall bit-rate. In (variational) optical flow, the objective is to obtain a pixel-wise motion description subject to a smoothness constraint. In both cases, motion estimation involves minimizing an unconstrained Lagrangian cost function $$J = D + \lambda R, \quad (1)$$

where in video compression, D is the overall distortion (typically measured as mean squared error), R is the overall rate (measured in bits), and $\lambda > 0$ determines the constraint for which the solution is optimal. Essentially, $\lambda$ larger puts more weight on the rate, which results in lower bit-rate at the cost of higher distortion. In optical flow, D is the data term, R is the regularisation or smoothness term, and $\lambda > 0$ is used to impose spatial smoothness in the motion field. We now have a closer look at the two terms of (1) used in variational optical flow estimation and in video compression systems.

A. Motion Estimation Using Variational Optical Flow

The aim of optical flow is to find for each pixel in frame $f_b$ a motion vector $u = (u, v)$ that describes its displacement with respect to another frame $f_a$. Many modern optical flow methods follow a variational model proposed by Horn and Schunck [25], and pose the motion estimation problem as an energy minimization problem, where the energy function consists of a data and a regularization term, as shown in (1). A popular choice of the data term is:

$$D(M) = \Sigma_x (f_a(x + M(x)) - f_b(x))^2, \quad (2)$$

where M denotes the motion field holding a collection of motion vectors u. The regularization term is typically designed to be edge-preserving [32], [34]:

$$R(M) = \Sigma_x \omega(x) \|\Delta M(x)\|, \quad (3)$$

where $\|\Delta M(x)\|$ is the total variation (TV) regulariser, and $\omega(x) = \exp(-\|\Delta f_b\|)$ is a structure adaptive map, which encourages motion discontinuities to align with image edges.

B. Motion Estimation in Video Compression Systems

Existing video codecs find the solution to (1) on a per-block basis. HEVC [8] introduces the concept of coding tree blocks (CTBs), which are further split up into coding blocks (CBs), whose size is adaptively chosen using a quadtree partitioning. Each CB can be further split up into prediction blocks (PBs), which all have their own prediction parameters. For each CTB, the partitioning into PBs with their associated prediction modes is found by minimizing (1). The two main prediction modes are "inter-frame prediction" (i.e., Inter mode), where already decoded frames are used as prediction references for motion-compensated prediction of the target frame, as well as "intra-frame prediction" (i.e., Intra), where only spatial redundancies within a frame are exploited.

Finding the minimum to (1) is infeasible since it involves all blocks of all frames of the video sequence to be compressed. A widely accepted strategy is to first find the motion vectors for each CTB, using $$B = \underset{B \in S}{\arg\min} \{D(B) + \lambda_{mv} R_{mv}(B)\}, \quad (4)$$

where S is the set of all possible partitions of the CTBs that are allowed by the standard. HEVC considers a large variety of inter-PB sizes, starting from 64×64, going all the way down to 8×4 pixels [8]. In addition, a powerful tool called "leaf merging" is employed, whereby motion vectors can be predicted from neighboring PBs [35]; it is worth noting that leaf merging implicitly favours smoothness in the motion field, even across CTBs. The block distortion measure in (4), D(B), is computed as in (2), but instead of allowing different motion vectors for each pixel, the block motion field B is partitioned into a set of disjoint blocks. The associated rate for the Inter mode, R(B), is the sum of the rates for the motion vectors, transform coefficients, and mode signaling information.

For any PB, the encoder also considers the Intra mode, where the PB is predicted only from already decoded spatial neighboring blocks; for intra-coded PBs, no motion information is communicated, and the associated rate is the rate for the texture residual after entropy coding.

C. Problems with Block Motion for Visual Enhancement Tasks

We conclude this section with a list of "issues" that arise from the opportunistic nature of motion vectors that are obtained in existing video compression systems, which make such motion ill-suited for video analysis and enhancement tasks (see FIG. 17):

1) Blocks only describe translational motion;
2) Blocks are unable to accurately describe (moving) object boundaries;
3) Artificial discontinuities are created at block boundaries;

The motion field contains "holes" for PBs that are either Intra or uni-directionally predicted (white and black regions in FIG. 17b).

It is worth noting that the first point can be mitigated by employing higher order motion models (e.g., affine [36]). Furthermore, research on segmentation-based block partitioning to better describe motion around object boundaries [37] will reduce the second issue of the above list. The latter two points, on the other hand, are an integral part of the opportunistic nature of hybrid video codecs.

HEVC-EPIC

HEVC-EPIC aims at mitigating the issues with decoded block motion for video enhancement tasks mentioned above. Before we begin the detailed description of the method, we find it useful to highlight the fact that the idea of deriving seeds from decoded motion can be applied to motion coded using any block-based video codec (e.g., H.264 and earlier). The quality of the motion fields that can be estimated by HEVC-EPIC (HE) depends on the quality of the input seeds, and slightly worse performance should be expected for older video codecs. By the same token, recent advances in incorporating higher order motion models into HEVC (e.g., affine motion [36]) would most likely lead to motion that is even better suited for HE.

We now present the main elements of the proposed HE, which takes as input decoded frame texture and (HEVC) block motion $B_{i \to j}$; here, $B_{i \to j}$ denotes the decoded block motion field, which is used by the decoder to perform motion-compensated prediction of frame $f_i$ from frame $f_j$. A second, more "motion-centric" interpretation of $B_{i \to j}$ is that it approximates the displacement of each pixel in frame $f_i$ to frame $f_j$. In this paper, we take the second interpretation, and the aim of the proposed HE is to estimate a dense motion field $M_{i \to j}$ that is much closer to the apparent "physical" motion than $B_{i \to j}$.

FIG. 1 shows a high-level overview of the proposed method and a possible application. Input to HE is decoded block motion from a standard HEVC codec using the random-access profile, as well as the reconstructed frame texture data. In particular, for each B-frame $f_k$, a backward and a forward block motion field, $B_{k \to k-1}$ and $B_{k \to k+1}$, is decoded. Rather than applying the same motion vector to the entire block, we use the decoded block motion vectors to create one or multiple motion "seeds" within each inter-PB, and then use an edge-preserving, locally-weighted affine interpolator to create a dense motion field.

The resulting motion field is piecewise-smooth, with discontinuous jumps around moving objects, which is much closer description of the underlying scene motion, and can be used for a wide variety of video enhancement and analysis tasks, such as framerate upsampling (see right-hand side of FIG. 1, as well as below).

A. Edge-Preserving Affine Interpolation of Motion Vectors

We now describe how a dense motion field that preserves motion discontinuities can be obtained from a sparse set of motion "seeds". The following description applies to all motion seed anchoring and weighting strategies presented in Sect. V. We use K to denote the number of motion "seeds" that are derived from the decoded block motion field $B_{k \to j}$. As mentioned earlier, these K motion seeds are drive an edge-preserving affine motion interpolation. In this process, interpolated motion u is derived at location s from a collection of nearest neighbours $\{u_n\}$ at locations $s_n$, where $n \in \{1, N\}$. The dense motion is obtained by interpolating each location s of the motion field $M_{i \to j}$ using a locally-weighted affine estimator, $$M_{k \to j}[s] = A_s \bar{s}. \quad (5)$$

In the equation above, $A_s$ is a 2×3 matrix that describes the affine transform, and we used $\bar{s}$ to denote the homogeneous extension of s (i.e., $\bar{s} = (s_1, s_2, 1)^t$. While we need at least the three points $s_n$ in frame $f_k$ that are closest to s, more seeds are typically considered for increased robustness. Next, we compute the least-squares solution of the following overdetermined system $$A_s = \underset{A}{\operatorname{argmin}} \sum_{n=1}^{N} g_n \|A\bar{s}_n - u_n\|^2, \quad (6)$$

where $g_n = d(s_n, s)^{-1}$, and $d(s_n, s)$ is a distance measure between the points $s_n$ and s. When N>3, the affine model puts more importance on fitting points $s_n$ that are "closer" to the location s of the point we seek to interpolate; we come back to the notion of "closer" at the end of Sect. IV-B.

Bidirectional Motion Vector Completion: Holes in the decoded block motion field are exasperated in the case of B-frames, where in addition to intra-coded PBs, unidirectionally predicted PBs lead to additional holes. As proposed in [9], a bidirectional motion vector completion (BMVC) can be applied whereby information from unidirectionally predicted PBs is negated in order to create a motion seed for the motion field that refers to the other reference frame. In practice, we find that this step is always beneficial, and hence it is applied in all variants of the proposed method.

2) Variational Optimization (VO): In order to increase the accuracy of the sparse-to-dense interpolation of EPIC flow, Revaud et al. [4] propose a variational energy minimization step, similar to the one described in Sect. III-A. They initialize the solution with the output of the sparse-to-dense interpolation presented in the previous section, and use the approach proposed in [26] without coarse-to-fine refinement to perform the variational optimization (VO). This step is particularly important for the original EPIC flow, as the motion vector seeds are estimated only with integer precision. Since the decoded motion vectors from HEVC are communicated at sub-pixel precision (i.e., ¼ pel), we consider the VO step as optional for the proposed HEVC-EPIC scheme; its impact on motion field quality is evaluated below.

B. Statistical Interpretation

It is helpful to reinterpret the weighted least squares optimization in (6) in terms of a statistical estimation problem. To do this, we suppose that the motion in the vicinity of location s satisfies an underlying affine model A, but the observed motions $u_n$ deviate from this affine model by an amount $\delta_n$, where each $\delta_n$ is a realization of an independent Gaussian distribution $\Delta_n$ with zero mean and correlation matrix $$R_n = \begin{pmatrix} \sigma_n^2 & 0 \\ 0 & \sigma_n^2 \end{pmatrix}$$

Then, for a given affine model A, the $u_n$ are realizations of independent random vectors $U_n$ with correlation matrix $R_n$ and mean $A\bar{s}_n$. The joint conditional PDF for these random vectors is $$f_{U_1, U_N | A}(u_1, \ldots, u_N, A) = \prod_{n=1}^{N} \frac{1}{2\pi\sigma_n^2} \exp\left[-\frac{1}{2}(u_n - A\bar{s}_n)^t R_n^{-1}(u_n - A\bar{s}_n)\right] \quad (7)$$

So the maximum likelihood estimate for A is $$\bar{A} = \operatorname*{argmin}_{A} \sum_{n=1}^{N} (u_n - A\bar{s}_n)^t R_n^{-1}(u_n - A\bar{s}_n) = \operatorname*{argmin}_{A} \sum_{n=1}^{N} \frac{1}{\sigma_n^2} \|u_n - A\bar{s}_n\|^2, \quad (8)$$

where the last equation holds since the correlation matrix of a distribution with zero mean is equal to its covariance matrix. This reveals the fact that the geodesic weights $g_n$ can be interpreted as the reciprocal of expected variance between the affine plane and the motion observed at location $s_n$. Specifically, we have $$g_n = \frac{\gamma}{\sigma_n^2} \quad (9)$$

for some positive constant $\gamma$. The value of $\gamma$ does not appear to be important, because the least square fitting procedure depends only upon the relative weights $g_n$. However, $\gamma$ will become important when we consider other sources of error (below). We see that the expected variance of the deviation between the affine model at s and the motion observed at location $s_n$ is considered to be proportional to $d(s, s_n)$. That is, $$g_n = \frac{1}{d(s, s_n)} \text{ with } \sigma_n^2 = \gamma \cdot d(s, s_n)$$

We now come back to the choice of distance measure. FIG. 3b shows a crop of a decoded HEVC motion field, and FIG. 3c shows the corresponding affine interpolation, where each location m was interpolated according to (6), with Euclidean distance as distance measure d(.,.). One can see how the motion is interpolated across moving object boundaries, which leads to wrong motion assignments—a smooth interpolation between foreground and background motion is never a good description of the underlying scene motion around moving objects. In EPIC [4], the weights $g_n$ are the reciprocals of geodesic distances d(s, $s_n$), which correspond to the distance between s and $s_n$ traversed over a surface that is distorted by edge fields (see FIG. 3d); that is, the crossing of edges is penalized, encouraging sharp transitions around (moving) objects. This assumption can be justified by considering deviations from the affine model at s to follow a "random walk" along the path from s to $s_n$ with an innovation power of y per unit of geodesic distance; the positive impact on preserving discontinuities is evidenced in FIG. 3e.

Motion Seed Anchoring and Weighting Strategies for Decoded HEVC Block Motion

In our initial explorations of HEVC-EPIC ([7], [9]), we created one motion seed $u_n$ for each Inter block, where the anchoring location $s_n$ was at the center of the block, with the same weight irrespective of the PB size (i.e., the size of the motion block). However, the lower the bit-rate (higher QP value), the smoother (i.e., less high frequency content) the texture of the reference frames, which results in larger PB sizes. As a result, one can observe that in general, fewer motion "seeds" are available for HEVC-EPIC than for higher QP values. As evidenced by our preliminary experimental results in [9], this results in an increasing performance gap compared to what the state-of-the-art EPIC flow [4] produces as the QP value increases.

In the following, we investigate alternate motion seed anchoring and weighting strategies in order to further improve the quality of the HEVC-EPIC motion fields.

A. Generalized Motion Seed Anchoring

In this section, we present a generalization of the motion seed anchoring strategy presented in our initial explorations of HE in [7], [9]. Rather than putting all the weight of each seed on the center of the prediction block, we consider the impact of distributing the weight across the block. To this end, we propose to sub-partition larger blocks by creating multiple seeds, and call the resulting method block motion sub-partitioning (BMS).

Clearly, creating one seed per pixel would result in too many seeds, and the output of HEVC-EPIC would be almost identical to the original HEVC block motion. We therefore define an upper bound on the maximum allowed block size, which we call $L_{max}$. The procedure for creating the seeds can be found in Algorithm 1; note how for the particular case of $L_{max}=64$ (i.e., the maximum PB size defined by HEVC), the algorithm simply creates one motion seed per PB, anchored at the center of each block.

FIG. 18b gives an example of the effect of BMS. Let us consider the center block in the figure, which is of size 64×64, and $L_{max}=16$. We create $$\frac{64}{16} \times \frac{64}{16} = 4 \times 4 \text{ seeds},$$

which are

---

Algorithm 1 Block Motion Sub-partitioning (BMS)

1: function SUB-PARTITION_BLOCK($B^{(k)}$, $L_{max}$)
2:     (x, y) ← top-left coordinate of block $B^{(k)}$
3:     w ← width of block $B^{(k)}$
4:     h ← height of block $B^{(k)}$
5:     u ← horizontal component of motion vector of block $B^{(k)}$
6:     v ← vertical component of motion vector of block $B^{(k)}$ 7:     $\text{sub\_w} \leftarrow \max\left(\frac{w}{L_{max}}, 1\right)$        ▷ # of horizontal sub-blocks 8:     $\text{sub\_h} \leftarrow \max\left(\frac{h}{L_{max}}, 1\right)$        ▷ # of vertical sub-blocks

| Algorithm 1 Block Motion Sub-partitioning (BMS) |
|---|
| 9:      for $i = y + \frac{h}{2 \cdot \text{sub\_h}}$ to h step $\frac{h}{\text{sub\_h}}$ do |
| 10:        for $j = x + \frac{w}{2 \cdot \text{sub\_w}}$ to w step $\frac{w}{\text{sub\_w}}$ do |
| 11:          Create seed centered at (j, i), with u = (u, v). |
| 12:        end for |
| 13:      end for |
| 14:   end function | placed at the center of each of the 16×16 pixel (sub-)blocks. One can see that motion seeds are created on both sides of the (moving) object. It is worth noting that even in the case of $L_{max}$=64 (i.e., when only one seed is created per PB), it can happen that the motion vector is anchored on the wrong side of the motion discontinuity. In Sect. V-C, we propose a way of weighting motion seeds based on their prediction performance, which alleviates this issue.

B. Block-Size Proportional Weighting (HE-W)

In case of HEVC motion, the block size varies significantly (e.g., a 64×64 block contains 256 times as many pixels as a 4×4 block); one might therefore consider increasing the weight of motion seeds created from larger blocks. This can be achieved by adding a weight to the formulation of the locally affine interpolator in (6), as follows:

$$A_s = \underset{A}{\operatorname{argmin}} \sum_{n=1}^{N} g_n^\omega \|A\bar{s}_n - u_n\|^2, \quad (10)$$

where $g_n^\omega = h \cdot \omega \cdot g_n$, with h and ω the height and width of the block (or sub-block).

FIG. 19 shows the average A-EPE (100 motion fields per method) on the Sintel dataset (see Table I for the sequence names), without variational optimization, for different values of $L_{max}$, at three different QP values; more details on the experiment can be found in Sect. VI. One can see that both the unweighted (i.e., HE) and HE weighted using block-size proportional weighting described in this section (HE-W), the performance improves with smaller block sizes, with largest improvements at higher QP values. The best performance at high to medium bit-rates (i.e., QP22 and QP27) is obtained for $L_{max}$=8, whereas at QP37, a slightly better performance is obtained for $L_{max}$=16.

C. Motion Confidence Based Weighting (HE-C)

While the motion seed weighting and anchoring strategies presented so far aimed at distributing and normalizing the importance of each motion seed, they have not considered the actual "quality" of the motion vector. In this section, our goal is to modify the affine interpolation scheme with additional information about the uncertainty in each motion estimate $u_n$. For this, we consider the error term $\delta_n$ (introduced in Sect. IV-B) to consist of two components:

1) a geodesic distance term $\delta_n^{(g)}$, with correlation matrix $$R_n^{(g)} = \begin{pmatrix} \gamma g_n^{-1} & 0 \\ 0 & \gamma g_n^{-1} \end{pmatrix},$$

which arises from the edge-dependent random walk discussed in Sect. IV-A; and 2) an HEVC error term $\delta_n^{(h)}$, with correlation matrix $R_n^{(h)}$, which arises from the fact that the HEVC block motion model may be a poor fit to the motion at individual seed locations within the block.

To be clear, each HEVC prediction block is partitioned into (potentially smaller) 4×4 blocks, whose centres correspond to the neighbouring motion locations $s_n$ used in the affine surface fitting of (6). The motion vector $u_n$ that we assign to each such 4×4 block is identical to the motion vector assigned by HEVC to the prediction block in which it resides. The HEVC error may be due to inaccuracies in the prediction block motion vector, including inaccuracies that arise from the limited ¼ pel precision of encoded motion vectors. However the HEVC error may be due to non-uniform motion over the prediction block, so that the true motion within individual 4×4 blocks cannot agree with any single motion vector that has been assigned to a larger containing prediction block.

If we are able to estimate $R_n^{(h)}$, the affine fitting problem stated in (8) can be modified to $$\bar{A} = \underset{A}{\operatorname{argmin}} \sum_{n=1}^{N} (u_n - A\bar{s}_n)^t \underbrace{(R_n^{(g)} + R_n^{(h)})^{-1}}_{\bar{R}_n}(u_n - A\bar{s}_n), \quad (11)$$

Assuming that the HEVC error involves IID errors with equal variance in each motion component[1], we can write

[1]Making this assumption allows us to preserve the original form of the EPIC interpolator.

$$\bar{R}_n = R_n^{(g)} + R_n^{(h)} = \begin{pmatrix} \gamma g_n^{-1} + h_n^{-1} & 0 \\ 0 & \gamma g_n^{-1} + h_n^{-1} \end{pmatrix}, \quad (12)$$

and the solution to (11) is $\bar{A}32\ US^{-1}$, with $$S = \sum_{n=1}^{N} \underbrace{\frac{g_n \gamma h_n}{g_n + \gamma h_n} \cdot \bar{s}_n \bar{s}_n^t}_{S_n} \text{ and } U = \sum_{n=1}^{N} \underbrace{\frac{g_n \gamma h_n}{g_n + \gamma h_n} \cdot u_n \bar{s}_n^t}_{U_n}.$$

We can think of the term $h_n$ above as the motion confidence; it is the reciprocal of the HEVC motion error variance. This is a scalar term, which can easily be used by replacing the geodesic weights $g_n$ in (6) with the harmonic mean of $g_n$ and $\gamma h_n$, i.e., $$g_n^{adj} = \frac{g_n \gamma h_n}{g_n + \gamma h_n} \quad (13)$$

In the next section, we describe a way of estimating the motion confidence $h_n$.

1) Estimating motion confidence on 4×4 blocks: We consider the problem of estimating the motion error covariance matrix $C_n^{(h)}$ for a given 4×4 block, whose estimated motion $u_n$ has been obtained directly from the relevant HEVC prediction block. Our estimate for $C_n^{(h)}$ uses the motion compensated source block $x_n$ and the target block $y_n$. If the motion used to produce $x_n$ is correct, and there is little noise (quantization and imaging noise), we expect $\|x_n - y_n\|^2$ to be much smaller than $\|x_n\|^2$ and $\|y_n\|^2$. Accordingly, we expect our estimator to take into account the magnitudes of these vectors (blocks) in one way or another, along with the expected level of noise, which will depend on quantization parameters, and hence QP value. The impact of errors in motion on the motion compensated residual $x_n-y_n$ depends on the frequency content of the underlying source block, since high frequency components of the residual are more sensitive to displacement than low frequency components. Accordingly, our estimate for $C_n^{(h)}$ should involve some form of frequency decomposition or power spectrum estimate.

With this in mind, we propose to take 2D FFT's of the two blocks $x_n$ and $y_n$ and use the magnitudes and phase errors of selected frequency components. A 4×4 FFT produces coefficients with frequencies $\omega \in \{0,\pm\pi/4, \pi\}^2$. Considering conjugate symmetry, and the fact that DC and Nyquist frequencies are less informative than others, we propose to use the coefficients $\hat{x}_n(\omega_i)$ and $\hat{y}_n(\omega_i)$ for $1 \le i \le 4$, with $$\omega_1 = \begin{pmatrix} 0 \\ \pi/4 \end{pmatrix}, \omega_2 = \begin{pmatrix} \pi/4 \\ 0 \end{pmatrix},$$
$$\omega_3 = \begin{pmatrix} \pi/4 \\ \pi/4 \end{pmatrix}, \omega_4 = \begin{pmatrix} \pi/4 \\ -\pi/4 \end{pmatrix}.$$

Let $\theta_{n,i}$ denote the angle between complex coefficients $\hat{x}_n(\omega_i)$ and $\hat{y}_n(\omega_i)$, i.e.

$$\theta_{n,i} = \angle \hat{y}_n(\omega_i) - \angle \hat{x}_n(\omega_i) \tag{14}$$

For small $\theta_{n,i}$, we can approximate $\theta_{n,i}$ using the imaginary part of $e^{j\theta_{n,i}}$, i.e., $$\theta_{n,i} \approx \beta_{n,i} = \Im\left( \frac{\hat{y}_n(\omega_i) \cdot \hat{x}_n^*(\omega_i)}{|\hat{y}_n(\omega_i)| \cdot |\hat{x}_n^*(\omega_i)|} \right), \tag{15}$$

where $(\cdot)^*$ denotes complex conjugation.

If the motion is correct and there is no noise, we would expect to find that $\theta_{n,i}=0$. With a motion error of $\delta_n$, we would expect to find that $$\beta_{n,i} \approx \theta_{n,i} = \omega_i^t \delta_n^{est}, \tag{16}$$

Now suppose the underlying sample values are corrupted by additive IID Gaussian noise, with variance $\sigma_x^2$. From Parseval's theorem, it follows that the real and imaginary components of each Fourier coefficient $\hat{x}_n(\omega_i)$ and $\hat{y}_n(\omega_i)$ are also corrupted by additive IID Gaussian noise, with variance $8\sigma_x^2$. We can consider this additive Gaussian noise to introduce angular noise into each of $\angle \hat{x}_n(\omega_i)$ and $\angle \hat{y}_n(\omega_i)$ that is approximately additive and Gaussian with variance $8\sigma_x^2/|\hat{x}_n(\omega_i)|^2$ and $8\sigma_x^2/|\hat{y}_n(\omega_i)|^2$, respectively, so long as these terms are much less than 1. Based on the foregoing discussion, we model $\omega_i^t \delta_n^{est}$ as an independent Gaussian random variable with mean $\beta_{n,i}$ and variance $$\sigma_{\theta_{n,i}}^2 = \frac{8\sigma_x^2}{|\hat{x}_n(\omega_i)|^2} + \frac{8\sigma_x^2}{|\hat{y}_n(\omega_i)|^2} \tag{17}$$

for any given motion estimation error $\delta_n^{est}$. Then, in the absence of any prior bias, we can conclude that the conditional PDF of the underlying motion estimation error $\delta_n^{est}$, given the observed values of $\hat{x}_n(\omega_i)$ and $\hat{y}_n(\omega_i)$ for each $\omega_i$ must be proportional to $$\prod_{i=1}^{4} \exp\left[ -\frac{\|\omega_i^t \delta - \beta_{n,i}\|^2}{2\sigma_{\theta_{n,i}}^2} \right] \tag{18}$$

This is a Gaussian conditional PDF, with mean error $\mu_n$ and covariance matrix $C_n^{(h)}$, such that $$(\delta - \mu_n)^t C_n^{(h)-1} (\delta - \mu_n) = \sum_{i=1}^{4} \frac{\|\omega_i^t \delta - \beta_{n,i}\|^2}{\sigma_{\theta_{n,i}}^2} + ct \tag{19}$$

where "ct" refers to terms that do not depend on $\delta$. Equating the factors of the quadratic functions of $\delta$ on left and right hand sides of the above equation yields $$C_n^{(h)} = \left( \sum_{i=1}^{4} \frac{\omega_i \omega_i^t}{\sigma_{\theta_{n,i}}^2} \right)^{-1} \text{ and } \mu_n = C_n^{(h)} = \left( \sum_{i=1}^{4} \frac{\omega_i \beta_{n,i}}{\sigma_{\theta_{n,i}}^2} \right) \tag{20}$$

The approach above gives us a way to find both the mean motion estimation error $\mu_n$ and the error covariance matrix $C_n^{(h)}$. We then obtain the desired error correlation matrix as follows:

$$R_n^{(h)} = C_n^{(h)} + \mu_n^t \mu_n \tag{21}$$

While these estimates will not in general be scalar multiples of the 2×2 identity matrix, a reasonable way to extract a scalar motion confidence value $h_n$ from an estimate of $R_n^{(h)}$ is by averaging and reciprocating the two motion component variances (diagonal entries of $R_n^{(h)}$)—i.e., $$h_n \approx \frac{2}{tr\{R_n^{(h)}\}}, \tag{22}$$

To recapitulate, the motion confidence $h_n$ is used in (13) to obtain a new weight to drive the weighted affine interpolation in (6); we refer to HEVC-EPIC that uses these weights as HE-C.

The only question that remains is what value to choose for the parameter $\gamma$ in (13). Due to the somewhat ad-hoc model of the geodesic weights, we performed a parameter sweep to determine the impact of $\gamma$. FIG. 20 shows the average A-EPE (100 motion fields per method) on the Sintel dataset (see Table 7 for the sequence names), without variational optimization, at three different QP values; more details on the experimental setup can be found in Sect. VI. One can see that the performance improves for larger values of $\gamma$, which means that more weight is put on the proposed motion confidence measure than the geodesic weights.

Both geodesic weights and confidence values depend upon texture quality, and hence QP value. Since the geodesic model in EPIC is ultimately ad-hoc, one should not then expect to find a single $\gamma$ value that is universally optimal. Despite these natural concerns, the results presented in FIG. 20 provide good justification for choosing a single value of $\gamma=1000$ across all operating points. Lastly, it is worth noting that the motion confidence weight is applied only for weighting the closest seeds; the closest seeds are still determined using the geodesic weights.

Evaluation of Motion Field Quality

In this section, we evaluate the accuracy of the estimated motion fields the proposed HEVC-EPIC (HE) with various motion seed weighting and anchoring strategies produces.

In order to distinguish between the different motion anchoring and weighting strategies proposed in this paper, we use HE-X to refer to a specific strategy (or set of strategies). We use "-W" to indicate that the proportional PB weighting described in Sect. V-B was used, and "-C" to indicate that the motion confidence based weighting described in Sect. V-C was employed. In addition, we use "-$L_{max}$" to specify the block motion sub-partitioning size (see Sect. V-A). For example, HE-W8 refers to HEVC-EPIC with proportional PB weighting, and a block motion sub-partitioning size of 8.

We start with a description of the experimental setting, followed by a comparison of the different motion seed weighting and anchoring strategies. We then compare the performance of HE with the state-of-the-art EPIC flow algorithm. We also briefly discuss the impact of the variational optimization step. Lastly, we compare the computational complexity of the proposed HE with EPIC flow.

A. Experimental Setup

For each sequence, we encode the first 21 frames using HEVC in an IBPB structure. We use the HEVC reference software HM 16.12, using the default Random Access coding settings; the only modification is that for simplicity, the GOP size was reduced to 2 frames (IBPB structure), with a QP offset of 2 for B-frames. The motion search range was kept at 64 pixels, with quarter pixel precision; we note here that in the selected subsequences, no motion vector exceeds 64 pixels. In order to have a meaningful anchor point for assessing the optical flow performance, we use the original EPIC flow [4] with the default parameters; the only change is that we limit the search radius of the deep matching [24] to 64 pixels,[2] so as to match the motion search range used by HEVC. At the decoder, we reconstruct the frames, and estimate an edge probability map (using SED [15] on each of the B-frames, as shown in FIG. 1). For HEVC-EPIC, we create motion seeds directly from the decoded HEVC block motion. For EPIC flow [4], our reference method, we estimate seeds using the deep-matching strategy on the decoded frames [15]. In both HEVC-EPIC and EPIC flow, the seeds are then interpolated using the edge-preserving affine interpolation strategy presented above.

[2]This significantly reduces the coputational complexity of deep matching.

1) Dataset: Since the motion field is not known for natural sequences, we use the popular Sintel dataset [17] to assess the quality of the estimated motion fields. This dataset consists of a number of highly challenging computer-generated sequences, for which 1-hop forward ground truth motion is known. Therefore, while HEVC-EPIC estimates both forward and backward motion fields $M_{\to k+1}$ and $M_{k\to k-1}$, respectively, which are useful for interpolating extra frames and other tasks, we can only measure the quality of the forward motion fields $M_{k \to k+1}$.

2) Quality Measure: We use the average end-point-error (A-EPE) of the motion fields as quality measure. The A-EPE for a motion field of dimensions H·W is computed as $$A - EPE = \frac{\sum_x \sqrt{(\hat{M}_u[x] - M_u[x])^2 + (\hat{M}_v[x] - M_v[x])^2}}{H \cdot W} \quad (23)$$

Where $\hat{M}=(\hat{M}_u, \hat{M}_v)$ and $M=(M_u, M_v)$ denote the estimated and the ground truth motion fields, respectively.

B. Impact of Motion Seed Weighting and Anchoring Strategies

We now compare different motion seed weighting and anchoring strategies; we leave the comparison with EPIC flow for the next section. FIG. 21 shows the average A-EPE (100 motion fields per method) on the Sintel dataset (see Table I for the sequence names), without variational optimization. We assess the performance of HE, HE-W, and HE-C, for different block motion sub-partition sizes $L_{max}$; for HE-C, we (empirically) set the value of γ=1000, as this value of γ resulted in the best results across the tested bit-rates (see FIG. 20). The experiments were conducted for three QP values, corresponding to high (QP22), medium (QP27), and low (QP37) bit-rate scenarios.

TABLE 7

Comparison of average A-EPE for different QP values, without, varational optimization. We compare the proposed HEVC-EPIC (HE) with various motion anchoring and weighing strategies, as well as EPIC flow [4]. In the last row, we show the overall average without variatioal optimization (VO).

| | QP = 22 | | | | QP = 27 | |
|---|---|---|---|---|---|---|
| Sequence | EPIC | HE-64 | HE-W8 | HE-C | EPIC | HE-64 |
| alley_1 | 0.73 (+0.37) | 0.46 (−0.10) | 0.37 (+0.01) | 0.36 | 0.75 (−0.35) | 0.54 (−0.14) |
| alley_2 | 0.69 (+0.33) | 0.45 (−0.09) | 0.37 (+0.01) | 0.36 | 0.68 (+0.26) | 0.57 (−0.15) |
| bamboo_1 | 0.79 (+0.39) | 0.43 (−0.03) | 0.40 (+0.00) | 0.40 | 0.80 (−0.38) | 0.47 (−0.05) |
| bamboo_2 | 0.71 (+0.31) | 0.43 (−0.03) | 0.41 (+0.01) | 0.40 | 0.71 (−0.31) | 0.45 (−0.05) |
| bandage_1 | 0.93 (+0.00) | 1.24 (−0.31) | 0.99 (+0.06) | 0.93 | 1.04 (−0.06) | 1.47 (−0.37) |
| bandage_2 | 0.47 (+0.06) | 0.53 (−0.12) | 0.40 (−0.01) | 0.41 | 0.50 (−0.04) | 0.60 (−0.14) |
| shaman_2 | 0.43 (+0.14) | 0.35 (+0.06) | 0.29 (+0.00) | 0.29 | 0.46 (−0.11) | 0.39 (−0.04) |
| shaman_3 | 0.67 (+0.37) | 0.33 (−0.03) | 0.32 (+0.02) | 0.30 | 0.67 (−0.29) | 0.45 (+0.07) |
| temple_2 | 1.20 (+0.33) | 1.10 (−0.23) | 0.93 (+0.06) | 0.87 | 1.27 (−0.26) | 1.26 (−0.25) |
| market_2 | 1.51 (+0.41) | 1.38 (−0.28) | 1.19 (+0.09) | 1.10 | 1.56 (−0.40) | 1.52 (−0.36) |
| Average | 0.81 (+0.27) | 0.67 (−0.13) | 0.57 (+0.03) | 0.54 | 0.84 (−0.23) | 0.77 (+0.16) |
| Average (VO) | 0.43 (+0.04) | 0.41 (−0.02) | 0.40 (+0.01) | 0.39 | 0.48 (+0.03) | 0.48 (+0.03) |

| | QP = 27 | | QP = 37 | | | |
|---|---|---|---|---|---|---|
| Sequence | HE-W8 | HE-C | EPIC | HE-64 | HE-W8 | HE-C |
| alley_1 | 0.41 (+0.01) | 0.40 | 0.87 (−0.19) | 0.92 (−0.24) | 0.72 (−0.04) | 0.68 |
| alley_2 | 0.44 (−0.02) | 0.42 | 0.73 (+0.07) | 0.77 (−0.11) | 0.70 (−0.04) | 0.66 |
| bamboo_1 | 0.42 (−0.00) | 0.42 | 0.80 (+0.28) | 0.61 (−0.09) | 0.53 (+0.01) | 0.52 |

TABLE 7-continued

Comparison of average A-EPE for different QP values, without, varational optimization. We compare the proposed HEVC-EPIC (HE) with various motion anchoring and weighing strategies, as well as EPIC flow [4]. In the last row, we show the overall average without variatioal optimization (VO).

| | | | | | | |
|---|---|---|---|---|---|---|
| bamboo_2 | 0.41 (−0.01) | 0.40 | 0.71 (+0.26) | 0.54 (−0.90) | 0.47 (−0.02) | 0.45 |
| bandage_1 | 1.14 (−0.04) | 1.10 | 1.43 (−0.14) | 1.85 (−0.28) | 1.67 (−0.10) | 1.57 |
| bandage_2 | 0.50 (−0.04) | 0.46 | 0.73 (−0.07) | 1.02 (−0.22) | 0.83 (+0.03) | 0.80 |
| shaman_2 | 0.35 (+0.00) | 0.35 | 0.59 (−0.02) | 0.62 (−0.01) | 0.61 (+0.00) | 0.61 |
| shaman_3 | 0.41 (−0.03) | 0.38 | 0.79 (−0.01) | 0.89 (−0.09) | 0.83 (+0.03) | 0.80 |
| temple_2 | 1.06 (−0.05) | 1.01 | 1.53 (−0.08) | 2.07 (−0.46) | 1.74 (−0.13) | 1.61 |
| market_2 | 1.27 (−0.11) | 1.16 | 1.71 (+0.32) | 2.02 (−0.63) | 1.59 (+0.20) | 1.39 |
| Average | 0.64 (+0.03) | 0.61 | 0.99 (+0.08) | 1.13 (−0.22) | 0.97 (+0.06) | 0.91 |
| Average (VO) | 0.46 (+0.01) | 0.45 | 0.71 (+0.00) | 0.76 (+0.05) | 0.74 (+0.03) | 0.71 |

The blue (dotted "x") curve (HE-64) in FIG. 21 shows the performance reported in [9], where one (unweighted) seed is created per PB. As mentioned before, this leads to relatively few motion seeds, resulting in the fact that the N closest seeds in the affine fitting of (6) are potentially quite far away, which negatively affects performance. By increasing the weight of larger prediction blocks (i.e., HE-W, see above), this problem can be significantly mitigated, as evidenced by the large gap between HE-64 and HE-W64 (dotted triangle curve). Distributing the weight across the block rather than putting all the weight on the center also has a positive impact on the quality of the motion fields. As shown in FIG. 19S, we observe improved performance for distributing the weight across larger blocks, with best performance for $L_m=8$. Lastly, incorporating the motion-confidence based weighting (HE-C, see above) leads to further improved performance across all tested QP values, in particular at QP37.

C. Comparison with EPIC Flow

In Table 7I, we present per-sequence results for various motion seed anchoring and weighting strategies, as well as comparative results for EPIC flow, which uses a (computationally expensive) deepmatching strategy [24] to find motion seeds; as before, we disabled the variational optimization step. As mentioned earlier, the deepmatches are integer-precision, as is the case with most feature estimators. We note that the interpolated motion vectors, being a weighted average of a number of motion vectors, are sub-pixel precision. Nonetheless, this results in significant performance drops especially at higher bit-rates compared to the proposed HE, which uses quarter-pixel precision motion vector seeds. In the last row, we show the overall average in the variational optimization is enabled, where one can see that the impact of the different motion seed weighting and anchoring strategies becomes less important. It is also worth noting that this is a reasonably efficient way to obtain subpixel precision matches from the integer-precision deepmatches employed by EPIC flow.

On average, the performance of the proposed HE-C is slightly better compared to EPIC flow across the tested bit-rates, evidencing the effectiveness of HEVC-EPIC to create a dense motion field from decoded HEVC motion.

1) Processing Times: One of the main advantages of HE over other seed-based optical flow methods (e.g., EPIC flow [4]) is that it saves the computationally expensive estimation of seeds, as it directly employs decoded HEVC motion. In FIG. 22, we compare the average processing times (on one core 3.2 Ghz) to estimate motion using EPIC flow (with deepmatching) and the proposed HE at different frame resolutions, both with and without variational optimization step. One can see that HE is significantly faster than EPIC flow, as it "skips" the expensive feature matching stage (yellow) by deriving motion seeds from the decoded motion vectors. As mentioned before, for fairness we limited the search radius of deepmatching to 64 pixels (i.e., same search range as used for HEVC motion estimation). It is worth mentioning that increasing the search range will come at a significant increase in computational complexity of EPIC flow, whereas increasing the search range has no impact on the proposed HEVC-EPIC. On average, HE is around 5 times faster with variational optimization (VO), and around 12 times faster if no variational optimization is performed. As can be seen, for HE, the variational optimization step accounts for roughly two thirds of the total processing time.

TABLE 8

Comparison of TFI performance (Y-PSNR) when EPIC flow [4] motion and the proposed HE-C motion (both with variational optimization enabled) is input to a state-of the art TFI scheme (BAM-TFI [1]); In addition, we show the performance of the bilateral. TFI scheme proposed by Veselov and Gilmutdinov [23]. We report results for three different QP values.

| | | | QP = 22 | | | QP = 27 | | | QP = 37 | | |
|---|---|---|---|---|---|---|---|---|---|---|---|
| | Sequence | Frame | Veselov [3] | EPIC | HE-C | Veselov [3] | EPIC | HE-C | Veselov [3] | EPIC | HE-C |
| 720 p | Mobcal HD | 460-480 | 33.62 (−0.60) | 34.15 (−0.06) | 34.22 | 33.26 (−0.76) | 33.87 (−0.15) | 34.01 | 31.33 (−0.50) | 31.54 (−0.29) | 31.83 |
| | Shields | 390-410 | 33.76 (−0.42) | 34.16 (−0.01) | 34.17 | 33.27 (−0.37) | 33.56 (−0.09) | 33.64 | 30.39 (−0.15) | 30.50 (−0.05) | 30.54 |
| | Stockholm | 460-480 | 33.69 (−0.02) | 33.67 (+0.01) | 33.66 | 33.34 (−0.04) | 33.37 (+0.00) | 33.37 | 30.36 (−0.04) | 30.39 (−0.00) | 30.40 |
| | Parkrun | 130-150 | 29.22 (−0.15) | 29.42 (+0.04) | 29.38 | 28.84 (−0.16) | 29.01 (+0.01) | 29.00 | 26.12 (−0.08) | 26.20 (−0.00) | 26.20 |
| 1080 p | BQTerrace | 200-220 | 33.21 (+0.25) | 32.44 (−0.52) | 32.97 | 33.36 (+0.22) | 32.57 (−0.57) | 33.14 | 32.01 (−0.19) | 31.67 (−0.15) | 31.82 |
| | Cactus | 001-021 | 31.87 (−1.15) | 31.19 (−0.16) | 33.02 | 31.64 (−1.18) | 32.85 (+0.03) | 32.82 | 30.19 (−0.79) | 30.99 (+0.01) | 30.98 |
| | Kimono | 001-021 | 32.69 (−0.42) | 33.12 (+0.01) | 33.10 | 32.60 (−0.43) | 33.01 (−0.03) | 33.04 | 31.69 (−0.24) | 31.96 (+0.03) | 31.93 |
| | ParkScene | 136-156 | 35.18 (−0.54) | 35.64 (−0.08) | 35.72 | 34.36 (−0.45) | 34.73 (−0.08) | 34.81 | 31.29 (−0.14) | 31.40 (−0.03) | 31.43 |

TABLE 8-continued

Comparison of TFI performance (Y-PSNR) when EPIC flow [4] motion and the proposed HE-C motion (both with variational optimization enabled) is input to a state-of the art TFI scheme (BAM-TFI [1]); In addition, we show the performance of the bilateral. TFI scheme proposed by Veselov and Gilmutdinov [23]. We report results for three different QP values.

| | | QP = 22 | | | QP = 27 | | | QP = 37 | | |
|---|---|---|---|---|---|---|---|---|---|---|
| Sequence | Frame | Veselov [3] | EPIC | HE-C | Veselov [3] | EPIC | HE-C | Veselov [3] | EPIC | HE-C |
| Rush Hour | 040-060 | 34.25 (+0.07) | 34.31 (+0.13) | 34.18 | 34.22 (+0.06) | 34.25 (+0.09) | 34.16 | 33.63 (+0.04) | 33.64 (+0.05) | 33.59 |
| Station 2 | 020-040 | 39.11 (+0.18) | 38.85 (−0.07) | 38.92 | 38.44 (+0.14) | 38.26 (−0.04) | 38.30 | 35.22 (−0.09) | 35.12 (−0.01) | 35.13 |
| Tractor | 090-110 | 28.61 (−2.36) | 30.81 (−0.16) | 30.97 | 28.64 (−2.15) | 30.75 (−0.04) | 30.79 | 28.21 (−1.49) | 29.63 (−0.06) | 29.69 |
| Average | — | 33.20 (−0.46) | 33.61 (−0.05) | 33.66 | 32.91 (−0.47) | 33.29 (−0.08) | 33.37 | 30.95 (−0.28) | 31.19 (−0.05) | 31.23 |

In the next section, we show on the application of temporal frame interpolation (TFI) that even without the VO step, HE motion can produce results that are on par with EPIC flow motion with VO enabled.

Application: Temporal Frame Interpolation

In this section, we turn our attention to a common application that benefits from high quality motion, namely temporal frame interpolation (TFI).

A. Experimental Setup

[2] This experiment is essentially the scenario that is depicted in FIG. 1. We choose sequences of 21 frames, then drop every second (odd) frame, and code the subsampled sequence using HEVC, with the same settings as in the previous experiment. At the decoder, we use motion fields estimated with EPIC flow and the proposed HEVC-EPIC as input to BAM-TFI [1] to interpolate the ten dropped (odd) frames. We report the average per-sequence Y-PSNR of the interpolated frames compared with the uncompressed odd frames.

The reason we use BAM-TFI is that unlike most existing TFI schemes which are block-based (e.g., [23]), it is designed to work with piecewise-smooth motion with discontinuities around moving objects. More precisely, BAM-TFI uses reasoning about motion discontinuities to identify foreground/background relationships around moving objects and resolve double mappings and handle disocclusion holes.

1) Dataset: We select subsets [3] of eleven commonly used natural test sequences (see Table 8 for the sequence names and selected frames) containing a variety of motion activities (e.g., translation, rotation, zoom).

[3] In an attempt to strike a reasonable balance between time to run experiments and expressiveness of the results, we decided to select subsequences that are an adequate representation of the overall sequence.

B. Quantitative Results

We quantitatively evaluate how well BAM-TFI works with motion fields estimated using the proposed HE, and compare it to the original EPIC flow; as a baseline, we further provide results for a state-of-the-art bilateral TFI scheme [23]. Table 8 gives per-sequence results for the tested sequences with variational optimization turned on. We observe that on average, across all tested QP values, BAM-TFI with HE-C motion is able produce slightly better interpolated frames (in terms of Y-PSNR); furthermore, BAM-TFI with either motion field performs better than [23]. Perhaps more interestingly, FIG. 23 compares the average Y-PSNR (110 frames) for the proposed HE with EPIC flow, both with and without variational optimization. One can observe that the results obtained using HE motion outperform the ones using EPIC flow both for VO enabled and disabled, at all three QP values tested.

Quite surprisingly, the proposed HE without variational optimization performs on par with EPIC flow motion with variational optimization at medium and low bit-rates. This is evidence for the high quality of the motion seeds that can be derived from HEVC block motion, as well as the effectiveness of the proposed HEVC-EPIC to create high quality optical flow fields.

C. Visual Results

We further provide some visual results of the TFI performance. In FIG. 24, we show results for three sequences, decoded at different QP values. The first row of the figure shows the decoded block motion field, overlaid with the edge information that was estimated on the decoded texture using SED [15]. The second row shows crops of the decoded block motion field, the motion field estimated using EPIC flow, as well as the proposed HE. One can see that the obtained motion fields from HE are very similar to the ones estimated using the state-of-the-art optical flow estimator. In particular, note how HEVC-EPIC is able to accurately estimate the affine (i.e., rotational) motion of the tractor wheels in FIG. 24d, from the decoded (translational) block motion vectors. We also observe that in a number of cases, HEVC-EPIC is able to have a better motion description around moving objects; an example of this is shown in FIG. 24d around the head of the woman. FIG. 24(e,g,i) show crops of the (interpolated) target frame; for each sequence, we show from left to right the uncompressed reference frame, followed by the interpolated frames, where we used motion estimated from EPIC flow and using motion from the proposed HE, respectively, as input motion to BAM-TFI [1]. As can be seen, BAM-TFI with HEVC-EPIC motion produces very similar results to BAM-TFI with EPIC flow as input, which serves as evidence of the suitability of the motion produced by HEVC-EPIC for video enhancement tasks.

Conclusions And Future Work

This paper is concerned with obtaining high quality "physical" motion fields from decoded (HEVC) block motion fields. In our preliminary works, we proposed to use each decoded block motion vector, anchored at the center of the block, as "seeds" to drive an edge-preserving affine interpolation strategy. However, at lower bit-rates, where blocks tend to be large, this resulted in relatively few motion seeds, which negatively affected the performance. In this paper, we propose alternate motion seed anchoring and weighting strategies, and experimentally show how the quality of the estimated motion fields can be further improved, especially at lower bit-rates. With the proposed motion confidence based weighting, the proposed HEVC-EPIC is able to estimate motion fields that are slightly better with a state-of-the-art optical flow estimation scheme, while running an order of magnitude faster. In order to show the applicability of the proposed method for visual enhancement tasks, we use the HEVC-EPIC motion as input to a state-of-the-art framerate upsampling scheme, and show that it outperforms the results obtained with EPIC flow motion. In future work, we plan to investigate the usefulness of HEVC-EPIC in a video compression system, i.e., use it to perform motion-compensated prediction.

Appendix A

In Table 9, the interested reader finds additional results on more commonly used test sequences. It is worth noting that the one sequence where TFI with the proposed HE-C performs worse than with the (much more expensive) EPIC motion (e.g., BasketballDrill), is heavily affected by motion blur (more than 100 pixels wide); the TFI method we employ (and any TFI method we are aware of) is unable to handle such large amounts of motion blur properly.

TABLE 9

Additional results of TFI performance (Y-PSNR) when EPIC flow [4] motion and the proposed HE-C motion (both with variational optimization enabled) is input to state-of-the-art TFI scheme (BAM-TFI [1]); we report results for three different QP values.

| | | QP = 22 | | QP = 27 | | QP = 37 | |
|---|---|---|---|---|---|---|---|
| Sequence | Frames | EPIC | HE-C | EPIC | HE-C | EPIC | HE-C |
| BasketballPass | 052-072 | 29.18 (−0.45) | 29.63 | 29.16 (−0.47) | 29.63 | 28.58 (−0.80) | 29.38 |
| BQSquare | 084-104 | 35.12 (−0.01) | 35.13 | 33.61 (−0.00) | 33.62 | 29.03 (−0.00) | 29.03 |
| BasketballDrill | 026-046 | 29.09 (+0.32) | 28.77 | 28.97 (+0.03) | 28.94 | 28.07 (+0.04) | 28.04 |
| BQMall | 080-100 | 28.45 (−0.38) | 28.83 | 28.38 (−0.19) | 28.57 | 27.83 (−0.05) | 27.88 |
| RaceHorses | 170-190 | 26.95 (−0.01) | 26.96 | 26.89 (−0.07) | 26.95 | 26.64 (−0.05) | 26.69 |
| Average | — | 29.76 (−0.10) | 29.86 | 29.40 (−0.14) | 29.54 | 28.03 (−0.17) | 28.21 |

References

[1] D. Ruefenacht and D. Taubman, "Temporally Consistent High Frame-Rate Upsampling with Motion Sparsification," *IEEE Int. Work. Multimed. Signal Process.*, 2016.

[2] Q. Lu, N. Xu, and X. Fang, "Motion-Compensated Frame Interpolation With Multiframe Based Occlusion Handling," *J. Disp. Technol.*, vol. 11, no. 4, 2015.

[3] S. Jeong, C. Lee, and C. Kim, "Motion-compensated frame interpolation based on multihypothesis motion estimation and texture optimization," *IEEE Trans. Image Process.*, vol. 22, no. 11, pp. 4497-4509, 2013.

[4] J. Revaud, P. Weinzaepfel, Z. Harchaoui, C. Schmid, J. Revaud, P. Weinzaepfel, Z. Harchaoui, and C. S. E. Edge-, "EpicFlow: Edge-Preserving Interpolation of Correspondences for Optical Flow," in *Computer Vision and Pattern Recognition*, 2015.

[5] C. Bailer, B. Taetz, and D. Stricker, "Flow Fields: Dense Correspondence Fields for Highly Accurate Large Displacement Optical Flow Estimation," 2015.

[6] Q. Chen and V. Koltun, "Full Flow: Optical Flow Estimation By Global Optimization over Regular Grids," *Comput. Vis. Pattern Recognit.*, 2016.

[7] D. Ruefenacht and D. Taubman, "HEVC-EPIC: Edge-Preserving Interpolation of Coded HEVC Motion with Applications to Framerate Upsampling," *Int. Conf. Multimed. Expo*, 2017.

[8] G. J. Sullivan, J. Ohm, W. Han, and T. Wiegand, "Overview of the High Efficiency Video Coding," *IEEE Trans. Circuits Syst. Video Technol.*, vol. 22, no. 12, pp. 1649-1668, 2012.

[9] D. Ruefenacht and D. Taubman, "Leveraging Decoded HEVC Motion for Fast, High Quality Optical Flow Estimation," *IEEE Int. Work. Multimed. Signal Process.*, 2017.

[10] D. Ruefenacht, R. Mathew, and D. Taubman, "Higher-Order Motion Models for Temporal Frame Interpolation with Applications to Video Coding," *Pict. Coding Symp.*, 2016.

[11] D. Ruefenacht and D. Taubman, "HEVC-EPIC: Fast Optical Flow Estimation From Coded Video via Edge-Preserving Interpolation," *IEEE Trans. Image Processing*, vol. 28, no. 6, pp. 3100-3113, June 2018.

[12] Y.-K. Chen, A. Vetro, H. Sun, and S.-Y. Kung, "Frame-rate up-conversion using transmitted true motion vectors," *IEEE Int. Workshop on Mult. Sig. Proc.*, 1998.

[13] Y. Wu, M. N. S. Swamy, and M. Ahmad, "Error concealment for motion-compensated interpolation," *IET Image Proc.*, vol. 4, no. 3, pp. 195-210, 2010.

[14] S.-H. Yang and C.-C. Yang, "Fast frame rate up-conversion based on multiple input frames," *IEEE Int. Conf. on Mult. and Expo*, 2011.

[15] P. Dollár and C. L. Zitnick, "Fast edge detection using structured forests," *IEEE Trans. Patt. Anal. and Mach. Intell.*, vol. 37, no. 8, pp. 1558-1570, 2015.

[16] T. Wiegand, H. Schwarz, A. Joch, F. Kossentini, and G. J. Sullivan, "Rate-constrained Coder Control and Comparison of Video Coding Standards," *IEEE Trans. Circ. Syst. for Video Tech.*, vol. 13, no. 7, pp. 688-703, 2003.

[17] D. J. Butler, J. Wulff, G. B. Stanley, and M. J. Black, "A naturalistic open source movie for optical flow evaluation," *European Conf. on Comp. Vis.*, 2012.

[18] L. Xu, J. Jia, and Y. Matsushita, "Motion detail preserving optical flow estimation," *IEEE Trans. Patt. Anal. and Mach. Intell.*, pp. 1744-1757, 2012.

[19] M. Tao, J. Bai, P. Kohli, and S. Paris, "Simpleflow: A non-iterative, sublinear optical flow algorithm," *Computer Graphics Forum*, vol. 31, pp. 345-353, 2012.

[20] T. Kroeger, R. Timofte, D. Dai, and L. Van Gool, "Fast optical flow using dense inverse search," *arXiv preprint arXiv:1603.03590*, 2016.

[21] J. Revaud, P. Weinzaepfel, Z. Harchaoui, and C. Schmid, "Deepmatching: Hierarchical deformable dense matching," *Int. J. of Comp. Vis.*, vol. 120, no. 3, pp. 300-323, 2016.

[22] H. Schwarz, D. Marpe, and T. Wiegand, "Analysis of Hierarchical B-Pictures and MCTF," *IEEE Int. Conf. on Mult. and Expo*, pp. 1929-1932, 2006.

[23] A. Veselov and M. Gilmutdinov, "Iterative Hierarchical True Motion Estimation for Temporal Frame Interpolation," *IEEE Int. Workshop on Mult. Sig. Proc.*, 2014.

[24] P. Weinzaepfel, J. Revaud, Z. Harchaoui, and C. Schmid, "DeepFlow: Large displacement optical flow with deep matching," *Int. Conf. on Comp. Vis.*, 2013.

[25] B. K. Horn and B. G. Schunck, "Determining Optical Flow," *Artificial Intell.*, pp. 185-203, 1981.

[26] T. Brox, A. Bruhn, N. Papenberg, and J. Weickert, "High Accuracy Optical Flow Estimation based on a Theory for Warping," *European Conf. on Comp. Vis.*, pp. 25-36, 2004.

[27] J. D. Sun, S. Roth, and M. J. Black, "A quantitative analysis of current practices in optical flow estimation and the principles behind them," *Int. on Comp. Vis.*, vol. 106, no. 2, pp. 115-137, 2014.

[28] T. Brox, C. Bregler, and J. Malik, "Large displacement optical flow," *IEEE Conf. Comp. Vis. and Patt. Rec.*, 2009.

[29] X. Li, J. Chen, and M. Karczewicz, "Frame rate up-conversion based motion vector derivation for hybrid video coding," *Proc. IEEE Data Compression Conf.*, 2017.

[30] G. Ottaviano and P. Kohli, "Compressible Motion Fields," *IEEE Conf. Comp. Vis. and Patt. Rec.*, 2013.

[31] A. Zheng, Y. Yuan, H. Zhang, H. Yang, P. Wan, and 0. C. Au, "Motion vector fields based video coding," *IEEE Int. Conf. Image Proc.*, 2015.

[32] A. Alshin, E. Alshina, and T. Lee, "Bi-directional optical flow for improving motion compensation," *Pict. Cod. Symp.*, pp. 422-425, 2010.

[33] D. Sun, S. Roth, J. Lewis, and M. J. Black, "Learning Optical Flow," *European Conf. on Comp. Vis.*, pp. 83-97, 2008.

[34] A. Wedel, D. Cremers, T. Pock, and H. Bischof, "Structure- and Motion-Adaptive Regularization for High Accuracy Optic Flow," *Int. Conf. on Comp. Vis.*, pp. 1663-1668, 2009.

[35] P. Helle, S. Oudin, B. Bross, D. Marpe, M. O. Bici, K. Ugur, J. Jung, Clare, and T. Wiegand, "Block merging for quadtree-based partitioning in hevc," *IEEE Trans. Circ. Syst. for Video Tech.*, vol. 22, no. 12, pp. 1720-1731, 2012.

[36] C. Heithausen and J. H. Vorwerk, "Motion compensation with higher order motion models for hevc," *IEEE Int. Conf. Acoust. Speech and Sig. Proc.*, 2015.

[37] M. Blaser, C. Heithausen, and M. Wien, "Segmentation-based Partitioning for Motion Compensated Prediction in Video Coding," *Pict. Cod. Symp.*, 2016.

The invention claimed is:

1. A method for processing encoded video data using coded block motion, said coded block motion being originally determined by a video encoder and recovered by decoding the encoded video data, the method comprising:
deriving edge information from a decoded reference frame;
determining motion seeds from the coded block motion to provide a sparse motion description; and
performing an edge-sensitive interpolation of the motion seeds, to obtain a dense motion description.

2. The method of claim 1, where motion seed locations are identified on a target frame, each motion seed carrying motion derived from the coded block motion, and the interpolation process results in the dense motion description that is formed at the target frame.

3. The method of claim 2, where the dense motion description consists of P=1 motion vector for each interpolated location, describing correspondences between the target frame at that location and a reference frame.

4. The method of claim 2, where the interpolation method is the one used in the edge-preserving interpolation of correspondences (EPIC), furthermore where the edge information is estimated using a structured edge detector (SED), and a locally affine interpolation method that is driven by "geodesic" weights that arise from the edge information.

5. The method of claim 3, where said coded block is sub-partitioned into multiple smaller blocks, each smaller block being assigned a motion vector from the original coded block motion, and where the resulting smaller blocks and their motion vectors are used to establish seed locations and the associated motion seeds for interpolation.

6. The method of claim 5, where weights are assigned to each motion seed and these weights are used to modify the contribution made by each motion seed in the motion interpolation process.

7. The method of claim 6, where the weights are proportional to the area of the block that is associated with the motion seed.

8. The method of claim 2, wherein the coded block motion consists of P>1 motion vectors for each interpolated location, describing correspondences between the target frame and a plurality of reference frames.

9. The method of claim 8, wherein if fewer than the P motion vectors from a coded block motion field are available for one or more motion seed locations, the method further comprises synthesizing one or more missing motion vectors using a motion completion step for the one or more motion seed locations.

10. The method of claim 8, wherein multiple motion vectors at each motion seed are used to obtain a higher order motion description between the target frame and the plurality of reference frames.

11. The method of claim 2, wherein the coded motion at the target frame is mapped to the reference frame, in order to establish seed locations and associated motion in the reference frame, and wherein the obtained dense motion description is formed at the reference frame.

12. The method of claim 11, wherein the coded block motion consists of P=1 motion vector at each seed and each interpolated location on the reference frame, describing correspondences between the reference frame and the target frame.

13. The method of claim 11, wherein the coded block motion consists of P>1 motion vectors at each seed and each interpolated location on the reference frame, describing correspondences between said reference frame, the target frame, and other frames.

14. The method of claim 13, wherein if fewer that P motion vectors are available from a coded block motion field for one or more of the motion seed locations, the method further comprises, prior to mapping the seeds to the reference frame where the dense motion description is formed, synthesizing the missing motion vectors using a motion completion step for the one or more of the motion seed locations.

15. The method of claim 2, wherein coded motion vectors are sub-partitioned into multiple smaller blocks, being assigned motion vectors from the coded block motion, and wherein the resulting smaller blocks and their assigned motion vectors are used to establish the motion seed locations and the associated seed motion vectors for interpolation.

16. The method of claim 1, wherein weights are assigned to each motion seed and these weights are used to modify the contribution made by each motion seed in the motion interpolation process.

17. The method of claim 16, wherein the weights are proportional to the area of a block that is associated with the particular motion seed.

18. The method of claim 16, wherein the weights are derived based on a motion confidence value, which assesses the motion compensated prediction performance within each block.

19. The method of claim 18, wherein the weights are derived by a block-based frequency-domain analysis.

20. The method of claim 1, further comprising, after performing the edge-sensitive interpolation, applying a variational optimization step to the dense motion description.

21. An apparatus, comprising a processor arranged to implement a method in accordance with claim 1.

22. The apparatus in accordance with claim 21, further comprising a decoder.

\* \* \* \* \*